(12) United States Patent
DeVries et al.

(10) Patent No.: US 12,502,391 B2
(45) Date of Patent: *Dec. 23, 2025

(54) MULTI-KINASE INHIBITORS OF VEGF AND TGF BETA AND USES THEREOF

(71) Applicant: AIVIVA BIOPHARMA, INC., Las Vegas, NV (US)

(72) Inventors: Gerald Woodrow DeVries, San Clemente, CA (US); Diane Tang-Liu, Las Vegas, NV (US)

(73) Assignee: AIVIVA BIOPHARMA, INC., Las Vegas, NV (US)

( * ) Notice: Subject to any disclaimer, the term of this patent is extended or adjusted under 35 U.S.C. 154(b) by 516 days.

This patent is subject to a terminal disclaimer.

(21) Appl. No.: 17/267,938

(22) PCT Filed: Aug. 13, 2019

(86) PCT No.: PCT/US2019/046401
§ 371 (c)(1),
(2) Date: Feb. 11, 2021

(87) PCT Pub. No.: WO2020/036993
PCT Pub. Date: Feb. 20, 2020

(65) Prior Publication Data
US 2021/0330673 A1    Oct. 28, 2021

Related U.S. Application Data

(60) Provisional application No. 62/764,836, filed on Aug. 15, 2018.

(51) Int. Cl.
| | |
|---|---|
| *A61P 27/02* | (2006.01) |
| *A61K 31/404* | (2006.01) |
| *A61K 31/44* | (2006.01) |
| *A61K 31/4418* | (2006.01) |
| *A61K 31/4439* | (2006.01) |
| *A61K 31/47* | (2006.01) |
| *A61K 31/496* | (2006.01) |
| *A61K 31/501* | (2006.01) |
| *A61K 31/5025* | (2006.01) |
| *A61K 31/506* | (2006.01) |
| *A61P 15/00* | (2006.01) |
| *A61P 17/00* | (2006.01) |
| *A61P 19/04* | (2006.01) |
| *A61P 29/00* | (2006.01) |

(52) U.S. Cl.
CPC .......... *A61K 31/506* (2013.01); *A61K 31/404* (2013.01); *A61K 31/44* (2013.01); *A61K 31/4418* (2013.01); *A61K 31/4439* (2013.01); *A61K 31/47* (2013.01); *A61K 31/496* (2013.01); *A61K 31/501* (2013.01); *A61K 31/5025* (2013.01); *A61P 15/00* (2018.01); *A61P 17/00* (2018.01); *A61P 19/04* (2018.01); *A61P 27/02* (2018.01); *A61P 29/00* (2018.01)

(58) Field of Classification Search
CPC .............................. A61K 31/47; A61P 27/02
See application file for complete search history.

(56) References Cited

U.S. PATENT DOCUMENTS

| | | | |
|---|---|---|---|
| 4,861,760 A | 8/1989 | Mazuel et al. | |
| 5,252,318 A | 10/1993 | Joshi et al. | |
| 5,441,732 A | 8/1995 | Hoeg et al. | |
| 2006/0142373 A1 | 6/2006 | Park et al. | |
| 2008/0003219 A1 | 1/2008 | Peyman | |
| 2011/0190282 A1 | 8/2011 | Felding et al. | |
| 2013/0210733 A1 | 8/2013 | Morgans, Jr. et al. | |
| 2014/0323579 A1 | 10/2014 | Sheikh et al. | |
| 2016/0000890 A1 | 1/2016 | Yu et al. | |
| 2016/0060328 A1 | 3/2016 | Wojciak et al. | |
| 2016/0082115 A1 | 3/2016 | Friberg et al. | |
| 2016/0331738 A1* | 11/2016 | Jarrett .................. | A61K 31/517 |
| 2017/0121323 A1 | 5/2017 | Liu et al. | |
| 2018/0222960 A1 | 8/2018 | Dubowchik et al. | |
| 2018/0228903 A1 | 8/2018 | Kohane et al. | |
| 2019/0255054 A1 | 8/2019 | Saiyed et al. | |
| 2019/0365737 A1 | 12/2019 | Haniuda et al. | |
| 2021/0077481 A1 | 3/2021 | Haniuda et al. | |

(Continued)

FOREIGN PATENT DOCUMENTS

| | | |
|---|---|---|
| CA | 3001489 A1 | 4/2017 |
| CA | 3031457 A1 | 2/2018 |
| CN | 100430069 C | 11/2008 |

(Continued)

OTHER PUBLICATIONS

Stehle et al.; "Reduced Immunosuppressive Properties of Axitinib in Comparison with Other Tyrosine Kinase Inhibitors"; 2013; The Journal of Biological Chemistry; 288(23): 16334-16347; DOI 10.1074/jbc.M112.437962 (Year: 2013).*

Wei et al.; "Efficacy of Lenvatinib, a multitargeted tyrosine kinase inhibitor, on laser-induced CNV mouse model of neovascular AMD"; 2018; Experimental Eye Research; 168: 2-11; published Dec. 25, 2017 (Year: 2017).*

Yamada; "Phase I Dose-Escalation Study and Biomarker Analysis of E7080 in Patients with Advanced Solid Tumors"; 2011; Clin. Cancer Res .; 17(8); 2528-2537 (Year: 2011).*

Eisai Inc.; "LENVIMA: Highlights of Prescribing Information"; 2015; www.accessdata.fda.gov/drugsatfda_docs/label/2018/206947s007lbl.pdf; accessed Sep. 19, 2024 (Year: 2015).*

(Continued)

*Primary Examiner* — Timothy P Thomas
(74) *Attorney, Agent, or Firm* — Procopio, Cory, Hargreaves & Savitch LLP; Brent Johnson

(57) ABSTRACT

A pharmaceutical composition for prevention or treatment of a disease or disorder characterized by chronic inflammation, associated with angiogenesis and fibrosis. The pharmaceutical composition includes a multi-target inhibitor, multi-phase modulator, or multi-kinase inhibitor, such as axitinib, nintedanib, pirfenidone, riociguat, sorafenib, sunitinib, lenvatinib, regorafenib, ponatinib, or pazopanib.

4 Claims, 17 Drawing Sheets

(56) References Cited

U.S. PATENT DOCUMENTS

| | | | |
|---|---|---|---|
| 2022/0339148 | A1* | 10/2022 | DeVries .................. A61P 17/02 |

FOREIGN PATENT DOCUMENTS

| | | | | |
|---|---|---|---|---|
| CN | 101701051 | A1 | 5/2010 | |
| CN | 102209543 | A | 10/2011 | |
| CN | 104379129 | A | 2/2015 | |
| CN | 104379133 | A | 2/2015 | |
| CN | 107019697 | A | 8/2017 | |
| CN | 108030783 | A | 5/2018 | |
| CN | 108367165 | A | 8/2018 | |
| EP | 1568359 | A1 | 8/2005 | |
| JP | 2008525370 | A | 7/2008 | |
| JP | 2013525398 | A | 6/2013 | |
| JP | 2013531067 | A | 8/2013 | |
| JP | 6328860 | B1 | 5/2018 | |
| JP | 6877058 | B2 | 5/2021 | |
| KR | 1020130069603 | | 6/2013 | |
| WO | 0040227 | A2 | 7/2000 | |
| WO | 2001002369 | A2 | 1/2001 | |
| WO | 2006067165 | A2 | 6/2006 | |
| WO | 2007053573 | A2 | 5/2007 | |
| WO | 2009137660 | A2 | 11/2009 | |
| WO | 2010054294 | A1 | 5/2010 | |
| WO | 2011035264 | A1 | 3/2011 | |
| WO | 2011134898 | A1 | 3/2011 | |
| WO | 2011060079 | A1 | 5/2011 | |
| WO | 2011064657 | A2 | 6/2011 | |
| WO | 2011147810 | A1 | 12/2011 | |
| WO | 2012012404 | A1 | 1/2012 | |
| WO | 2013188273 | A1 | 12/2013 | |
| WO | 2014028595 | A1 | 2/2014 | |
| WO | 2014078637 | A1 | 5/2014 | |
| WO | 2014086102 | A1 | 6/2014 | |
| WO | 2015005985 | A1 | 1/2015 | |
| WO | 2016087680 | A1 | 6/2016 | |
| WO | 2017062694 | A1 | 4/2017 | |
| WO | 2017210132 | A1 | 12/2017 | |
| WO | WO-2018022437 | A2 * | 2/2018 | ........... A61K 31/438 |
| WO | 2018052053 | A1 | 3/2018 | |
| WO | 2018053010 | A1 | 3/2018 | |
| WO | 2018148653 | A1 | 8/2018 | |
| WO | 2018218116 | A1 | 11/2018 | |
| WO | 2019036367 | A1 | 2/2019 | |
| WO | 2019133022 | A1 | 7/2019 | |
| WO | WO-2019144060 | A1 * | 7/2019 | ........... A61K 31/404 |
| WO | 2020036993 | A1 | 2/2020 | |
| WO | 2020112655 | A1 | 6/2020 | |

OTHER PUBLICATIONS

Varga, J. et al., "Systemic sclerosis: a prototypic multisystem fibrotic disorder," The Journal of Clinical Investigation, 117(3), 557-567, Mar. 2007.
International Search Report and Written Opinion, PCT/US2019/63044, mailed Feb. 6, 2020.
Shang, Z. et al., "Temperature Sensitive Gel Study in China: Retrospect and Prospect," Apr. 2014; contains English abstract.
Xu, S. et al., "Research Progress of Hydrogels in the Field of Antitumor Gels," Chin J Mod Appl Pharm, vol. 33, No. 5, 676-682, May 2016; contains English abstract.
Extended European Search Report for European Application No. 19891180, dated Nov. 12, 2021.
Mir-Bonafe, J.M. et al., "Improvement of actinic keratosis associated with sunitinib therapy for metastatic renal cell carcinoma," International Journal of Dermatology, 52(11), 1445-1447, Nov. 2013.
Williams, V.L. et al., "Sorafenib-induced premalignant and malignant skin lesions," International Journal of Dermatology, 50(4), 396-402, Apr. 2011.
Extended European Search Report for European Application No. 19850041.5, dated Apr. 11, 2022.
Liu, G. et al., "Dynamic Contrast-Enhanced Magnetic Resonance Imaging As a Pharmacodynamic Measure of Response After Acute Dosing of AG-013736, an Oral Angiogenesis Inhibitor, in Patients With Advanced Solid Tumors: Results From a Phase I Study," Journal of Clinical Oncology, 23(24), 5464-5473, Aug. 2005.
Wei, X. et al., "Efficacy of Lenvatinib, a multitargeted tyrosine kinase inhibitor, on laser-induced CNV mouse model of neovascular AMD," Experimental Eye Research (2018) vol. 168, pp. 2-11, (available online Dec. 25, 2017).
JAX Mice and Services, "Body Weight Information For C57BL/6J (000664)," Available online: URL: https://www.jax.org/jax-mice-and-services/strain-data-sheet-pages/body-weight-chart-000664, Accessed Aug. 19, 2022.
Enston-Newall, S., M21 Patient Stories: The Use of Novel Anti-Fibrotics, Pirfenidone and Nintedanib, in the Management of Idiopathic Pulmonary Fibrosis, IPF, Thorax, 72(Suppl 3), A247-A248, 2017.
Giddabasappa, A. et al., Axitinib inhibits retinal and choroidal neovascularization in in vitro and in vivo models, Experimental Eye Research, 145, 373-379, Apr. 2016.
International Search Report & Written Opinion, PCT/US2019/046401, mailed Nov. 15, 2019.
European Medicines Agency, Public Summary of Opinion on Orphan Designation, Riociguat for the Treatment of Systemic Sclerosis, Science Medicines Health, Aug. 2014.
Geschka, S. et al., Soluble Guanylate Cyclase Stimulation Prevents Fibrotic Tissue Remodeling and Improves Survival in Salt-Sensitive Dahl Rats, PLos One, vol. 6, Issue 7, e21853, 1-10, Jul. 2011.
International Search Report & Written Opinion, PCT/US2016/055865, mailed Dec. 20, 2016.
Kavian, N. et al., Sunitinib Inhibits the Phosphorylation of Platelet-Derived Growth Factor Receptor Beta in the Skin of Mice with Scleroderma-like Features and Prevents the Development of the Disease, Arthritis & Rheumatism, vol. 64, No. 6, 1990-2000, Jun. 2012.
Huang, J. et al., Nintedanib Ameliorates Fibrotic and Vascular Manisfestations in Preclinical Models of Systemic Sclerosis, Abstract No. 2153, Arthritis & Rheumatology, 67, 2584-2585, Oct. 2015.
Ota, Y. et al., Pirfenidone and BIBF1120 Suppress Collagen Synthesis in Skin Fibroblast from Patients with Systemic Sclerosis, Abstract No. 652, Arthritis & Rheumatism, 65, Oct. 2013.
European Search Report, Application No. 16854374.2, dated Jul. 24, 2019.
Kelly, R.J. et al., Axitinib—a selective inhibitor of the vascular endothelial growth factor (VEGF) receptor, Targeted Oncology, 4(4), 297-305, Dec. 2009.
Gerber, P.A. et al., Rosacea: the Cytokine and Chemokine Network, Journal of Investigative Dermatology Symposium Proceedings, 15(1), 40-47, Elsevier, Dec. 2011.
Gomaa, A.H.A. et al., Lymphangiogenesis and angiogenesis in non-phymatous rosacea, Journal of Cutaneous Pathology, 34(10), 748-753, Oct. 2007.
Ferrari, G. et al., Transforming Growth Factor-Beta 1 (TGF-Beta 1) Induces Angiogenesis Through Vascular Endothelial Growth Factor (VEGF)-Mediated Apoptosis, Journal of Cellular Physiology, 219(2), 449-458, May 2009.
Liu, Z. et al., VEGF and inhibitors of TGF Beta type-I receptor kinase synergistically promote blood-vessel formation by inducing alpha5-integrin expression, Journal of Cell Science, 122(18), 3294-3302, Sep. 2009.
Mikami, N. et al., Calcitonin gene-related peptide enhances experimental autoimmune encephalomyelitis by promoting Th17-cell functions. International Immunology, 24(11), 681-691, Nov. 2012.
Buhl, T. et al., Molecular and Morphological Characterization of Inflammatory Infiltrate in Rosacea Reveals Activation of Th1/Th17 Pathways, Journal of Investigative Dermatology, 135(9), 2198-2208, Sep. 2015.
Holmes, A.D. et al., Integrative concepts of rosacea pathophysiology, clinical presentation and new therapeutics, Experimental Dermatology, 26(8), 659-667, Aug. 2017.
Ferguson, M.W.J., et al., Scar-free healing: from embryonic mechanisms to adult therapeutic intervention, Phil Trans R Soc London B, 359, 839-850, 2004.

(56) References Cited

OTHER PUBLICATIONS

Han, G. et al., A Role for TGFBeta Signaling in the Pathogenesis of Psoriasis, J. Invest. Dermatol., 130, 371-377, 2010.

International Search Report & Written Opinion, PCT/US2018/017810, mailed May 8, 2018.

Johnson, A.K. et al., A quantitative real-time RT-PCR assay to measure TGF-Beta mRNA and its correlation with hematologic, plasma chemistry and organo-somatic indices responses in triamcinolone-treated Atlantic menhadden, Brevoortia tyrannus, Dev. Comp. Immunol., 30(5), 473-484, 2006.

Kim, M. et al., Recombinant erythroid differentiation regulator 1 inhibits both inflammation and angiogenesis in a mouse model of rosacea, Experimental Dermatology, 24, 680-685, 2015.

Lan, C.-C.E. et al., Tacrolimus abrogates TGF-Beta1-induced type I collagen production in normal human fibroblasts through suppressing p38MAPK signalling pathway: implications on treatment of chronic atopic dermatitis lesions, J. Eur. Acad. Dermatol. Venereol., 28, 204-215, 2014.

Pakyari, M. et al., Critical Role of Transforming Growth Factor Beta in Different Phases of Wound Healing, Advances In Wound Care, 2(5), 215-224, 2013.

Roskoski, Jr., R., Classification of small molecule protein kinase inhibitors based upon the structures of their drug-enzyme complexes, Pharmacological Research, Jan. 2016, Epub Oct. 31, 2015, vol. 103, pp. 26-48; Tables 1, 3, and 5.

Sakuma, M. et al., TGF-beta type I receptor kinase inhibitor down-regulates rheumatoid synoviocytes and prevents the arthritis induced by type II collagen antibody, International Immunology, Feb. 2007, Epub Nov. 29, 2006, vol. 19, No. 2, pp. 117-126.

Smith, J. R. et al., Expression of vascular endothelial growth factor and its receptors in rosacea, Br. J. Ophthalmol., 91, 226-229, 2007.

Yamasaki, K. et al., Increased serine protease activity and cathelicidin promotes skin inflammation in rosacea, Nature Medicine, 13, 975-980, 2007.

Yamasaki, K. et al., The molecular pathology of rosacea, J Dermatol Sci., 55(2), 77-81, 2009.

Antoniou, E.A. et al., Remission of psoriasis in a patient with hepatocellular carcinoma treated with sorafenib, in vivo, 30(5),677-680, Sep. 2016.

Ortiz-Ibanez, K. et al., Tofacitinib and other kinase inhibitors in the treatment of psoriasis, Actas Dermo-Sifiliográficas (English Edition), 104(4), 304-310, May 2013.

Kontzias, A. et al., Kinase inhibitors in the treatment of immune-mediated disease, F1000 Medicine Reports, 4, 2012.

Ng, C.Y. et al., Anticancer drugs induced severe adverse cutaneous drug reactions: an updated review on the risks associated with anticancer targeted therapy of immunotherapies, Journal of Immunology Research, Jan. 2018.

Lin, X. et al., New Anti-tumor Pharmacology, Jan. 2014.

Shi, Y. et al., Advances in Oncology in China, Oncologist Education in China, Jul. 2015.

Tsuzuki, T. et al., Tyrosine kinase inhibitor-induced vasculopathy in clear cell renal cell carcinoma: an unrecognized antitumour mechanism, Histopathology, 64(4), 484-493, Mar. 2014.

Jain, P. et al., Ponatinib as first-line treatment for patients with chronic myeloid leukaemia in chronic phase: a phase 2 study, The Lancet Haematology, 2(9), e376-e383, Sep. 2015.

European Search Report, Application No. 18751042.5, dated Nov. 17, 2020.

Yamaoka, H. et al., A novel small compound accelerates dermal wound healing by modifying infiltration, proliferation and migration of distinct cellular components in mice, Journal of Dermatological Science, 74(3), 204-213, Jun. 2014.

Weidemann, A.K. et al., Vascular endothelial growth factor inhibitors: investigational therapies for the treatment of psoriasis, Clinical, Cosmetic and Investigational Dermatology, 6, 233-244, 2013.

Sumiyoshi, K. et al., Transforming growth factor-beta1 suppresses atopic dermatitis-like skin lesions in NC/Nga mice, Clinical & Experimental Allergy, 32(2), 309-314, Feb. 2002.

Woo, Y.R. et al., Rosacea: Molecular Mechanisms and Management of a Chronic Cutaneous Inflammatory Condition, International Journal of Molecular Sciences, 17(9), 1562, Sep. 2016.

U.S. Appl. No. 16/920,278, filed Jul. 2, 2020 First named Inventor: Diane Tang-Liu Assignee: AiViva BioPharma, Inc.

U.S. Appl. No. 17/137,195, filed Dec. 29, 2020 First named Inventor: Diane Tang-Liu Assignee: AiViva BioPharma, Inc.

Vaajanen, A. et al., "A Single Drop in the Eye—Effects on the Whole Body?" The Open Ophthalmology Journal, 11, 305-314, 2017.

Office Action in Korean Patent Application No. 10-2024-7028975 dated Oct. 20, 2024, with English translation, 7 pgs.

\* cited by examiner

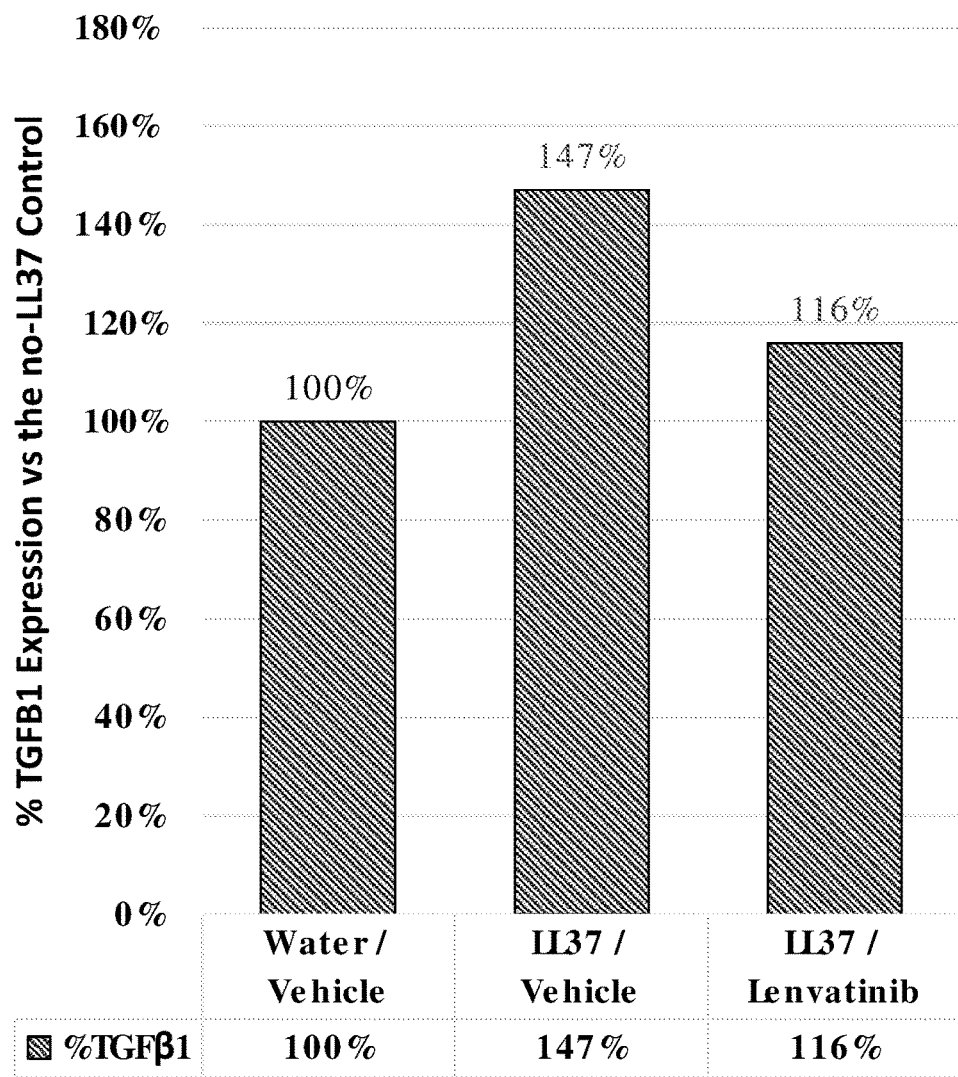
FIG. 1. Percent TGFb1 mRNA Expression for Mice Treated with Water and Vehicle, Mice Induced with LL37 and Vehicle, and Mice Induced with LL37 and Treated with Lenvatinib.

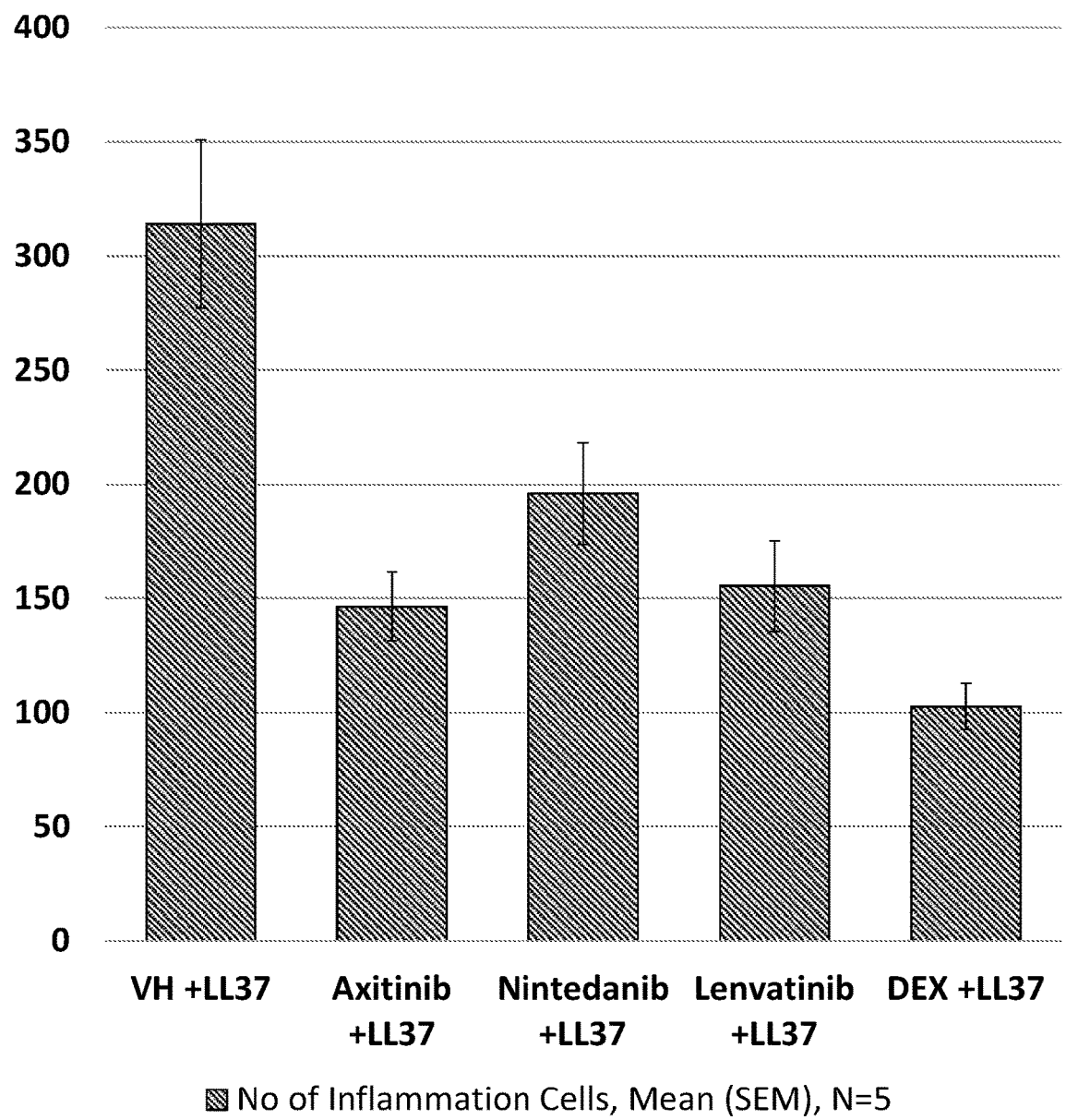
*FIG 2.* Inflammation Scores of Treatment Groups with Intradermal LL37 Induction in Mice.

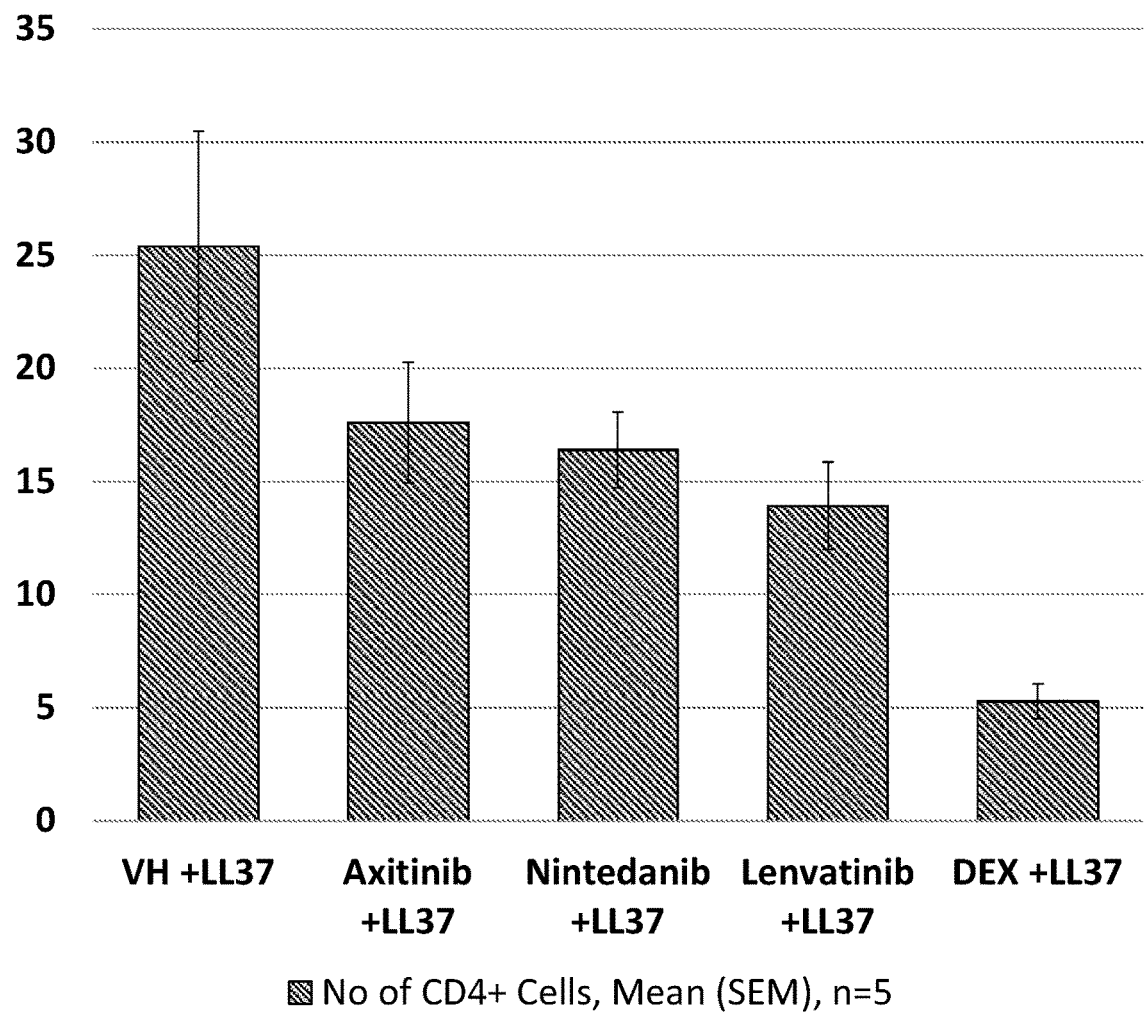
FIG 3. CD4 Lymphocyte Scores of Treatment Groups with Intradermal LL37 Induction in Mice.

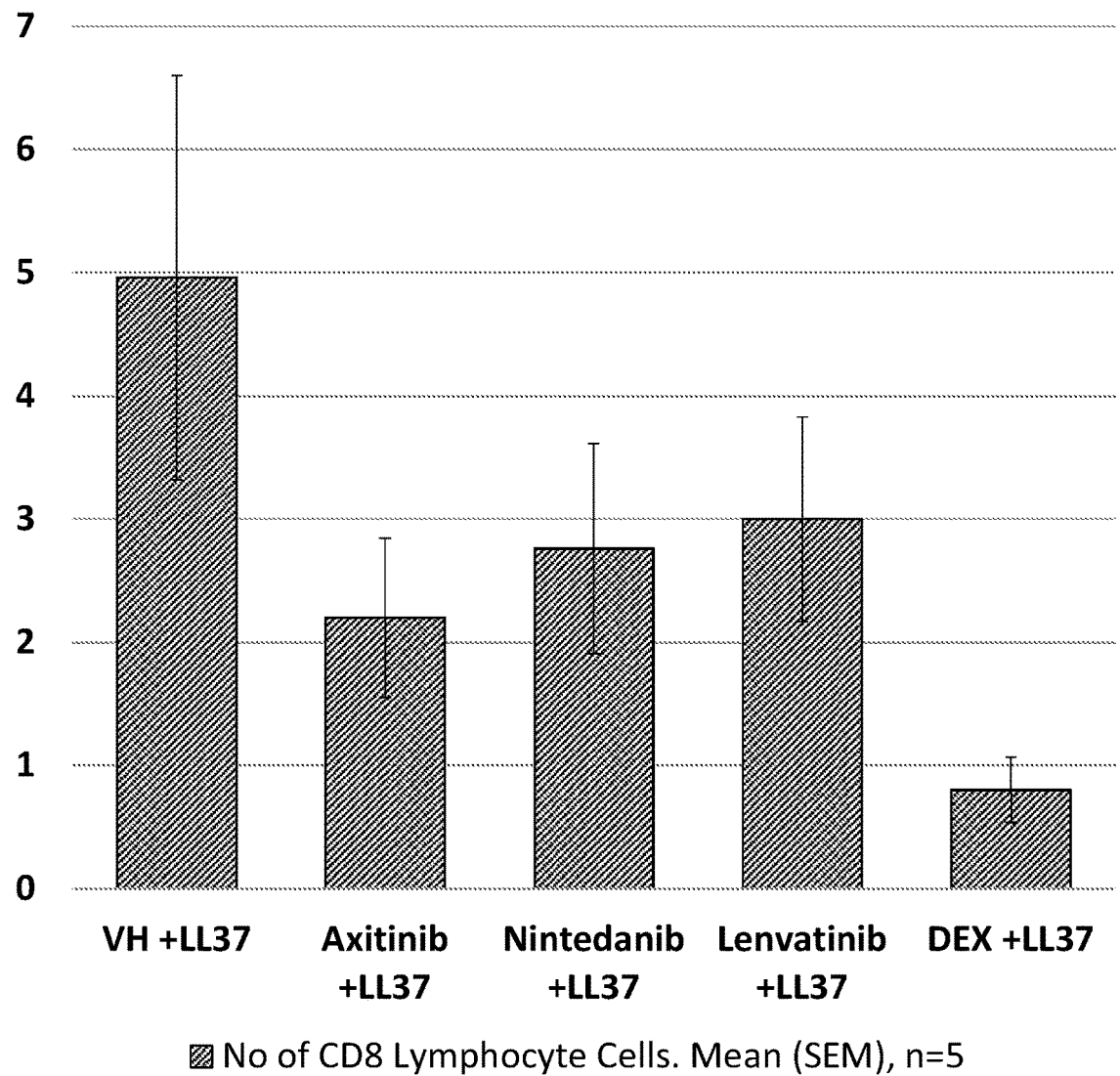
FIG 4. CD8 Lymphocyte Scores of Treatment Groups with Intradermal LL37 Induction in Mice.

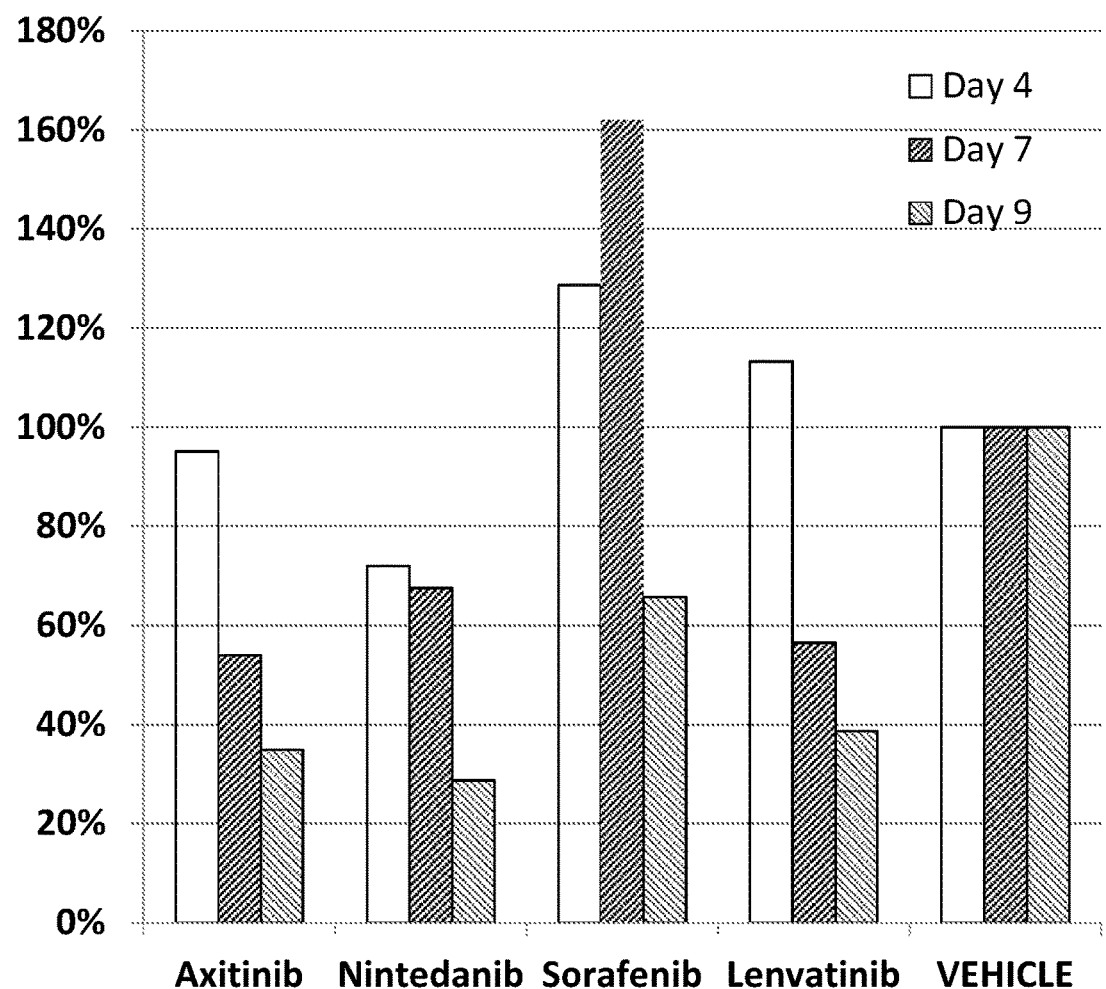
FIG 5. The effect of compounds on TGFb1 over time following the wounding and drug treatment.

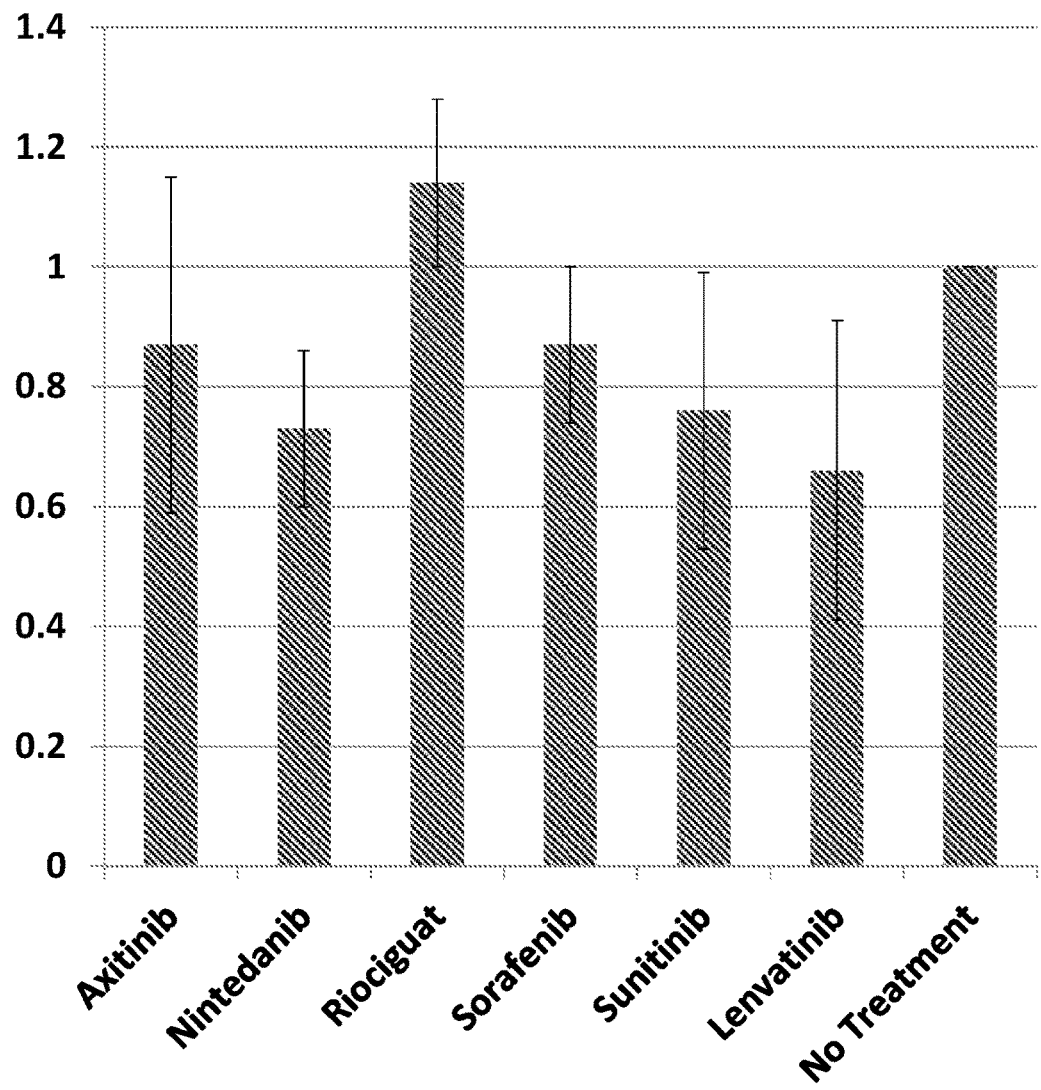
*FIG 6*. Folds of TGF-β1 mRNA expression in rabbit ear wound sites after intradermal treatments as compared to the untreated wound.

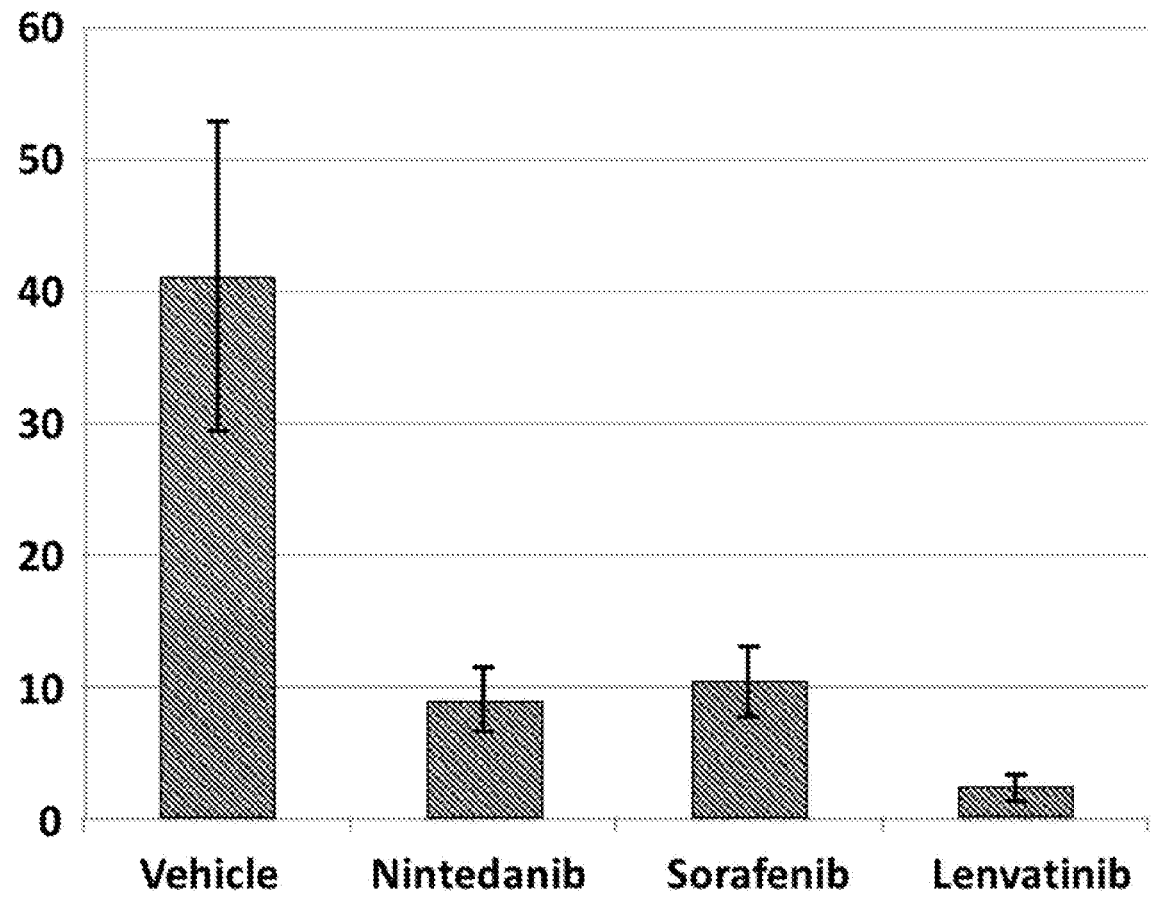
FIG. 7 Total Corneal Vessel Area (mm²)

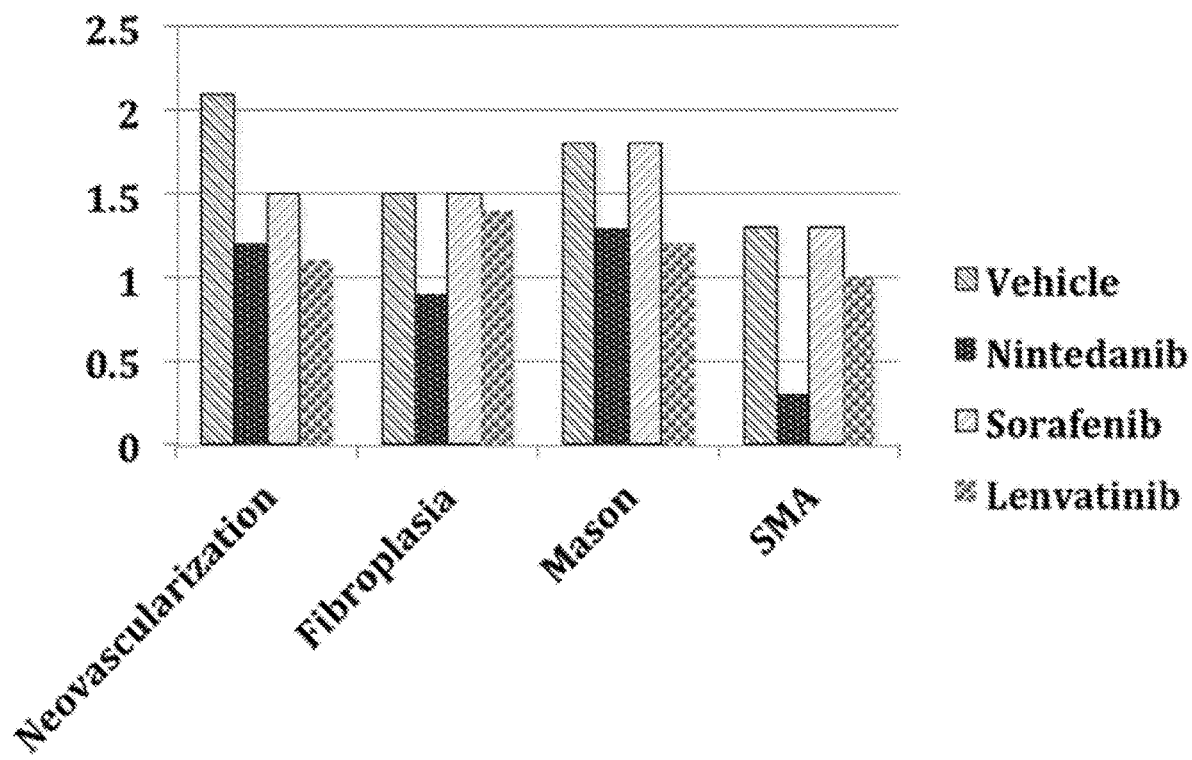
*FIG. 8* Histological Findings Corneal Suture Fibrosis Model

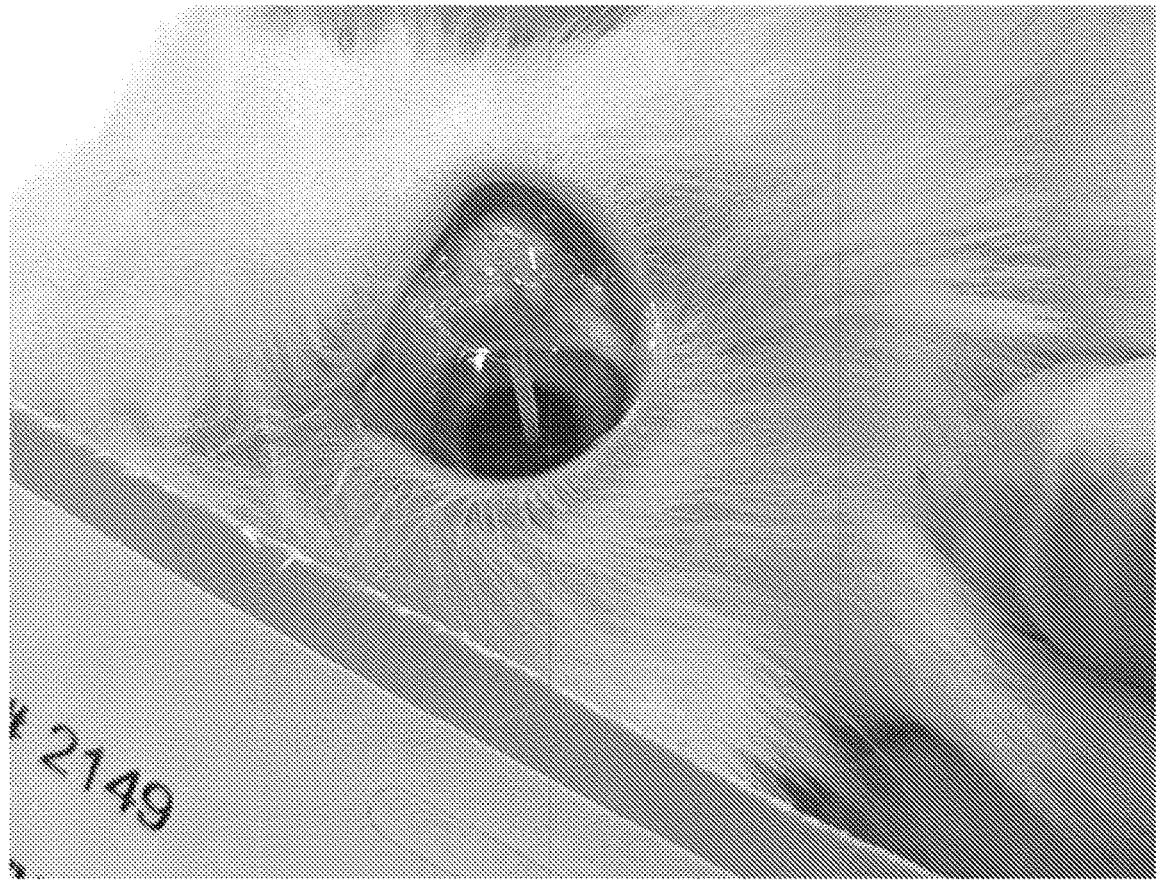
*Fig. 9* A representative bleb treated with sorafenib on Day 4.

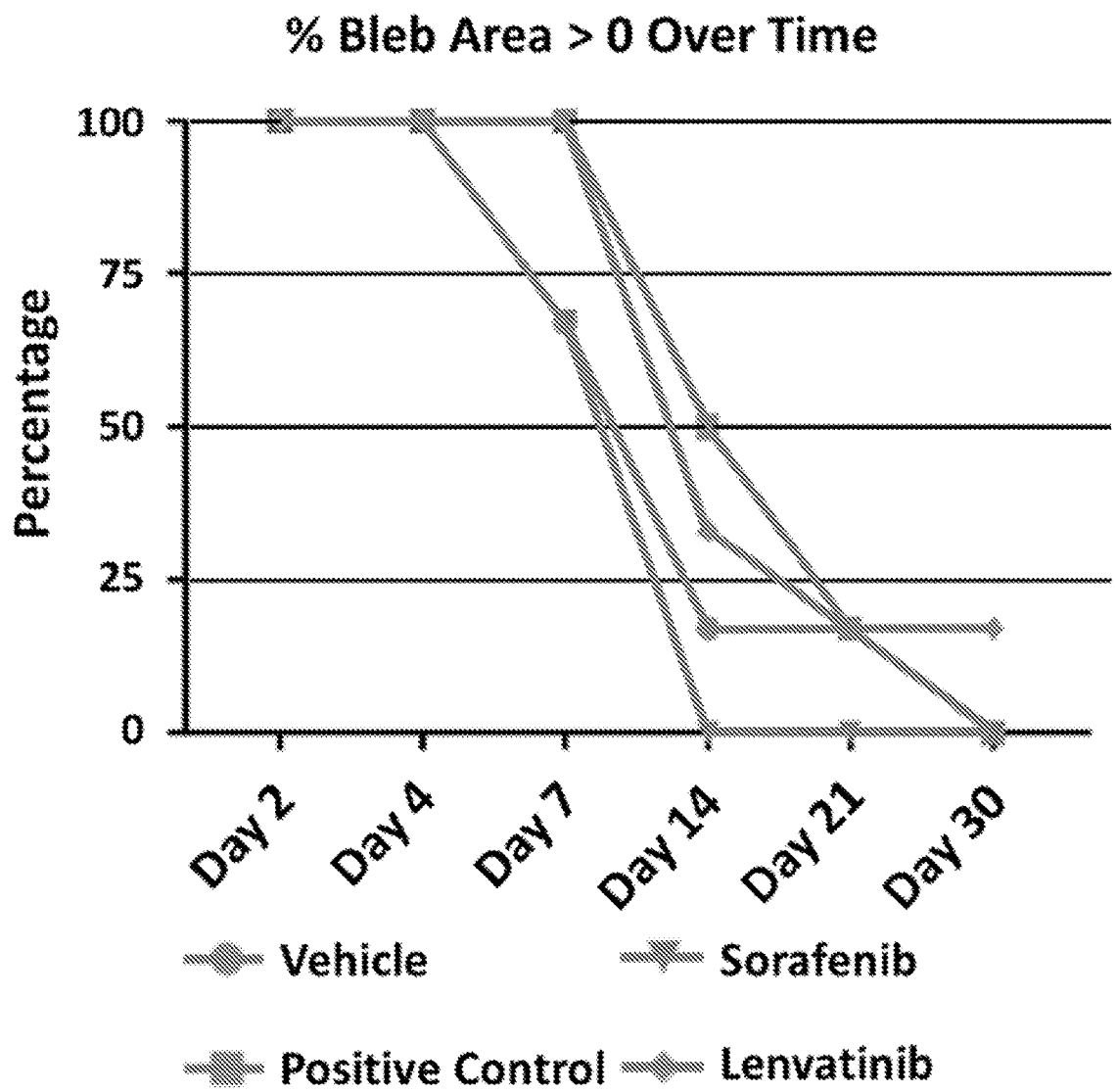
FIG 10. Treatment Effect on Bleb Survival for 30 Days after Glaucoma Filtration Surgery in Rabbits.

A. Fluorescein fundus angiography.
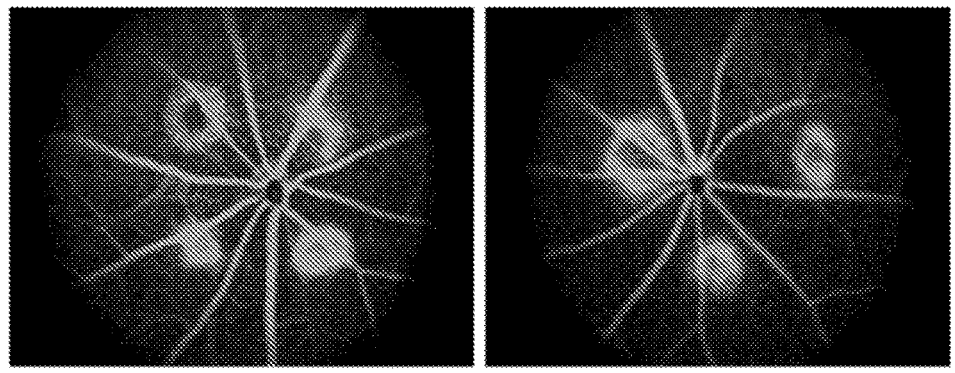
B. Isolectin B4
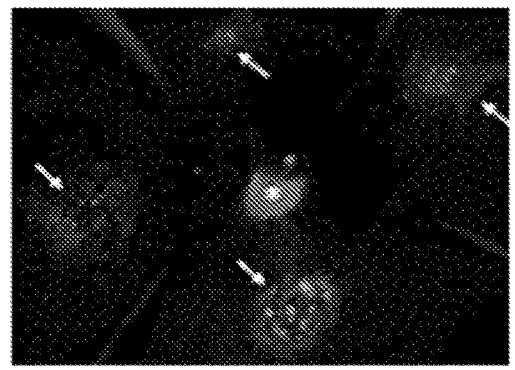
C. Isolectin B4/DAPI
*FIG 11.* Representative images of two weeks post laser in mice.

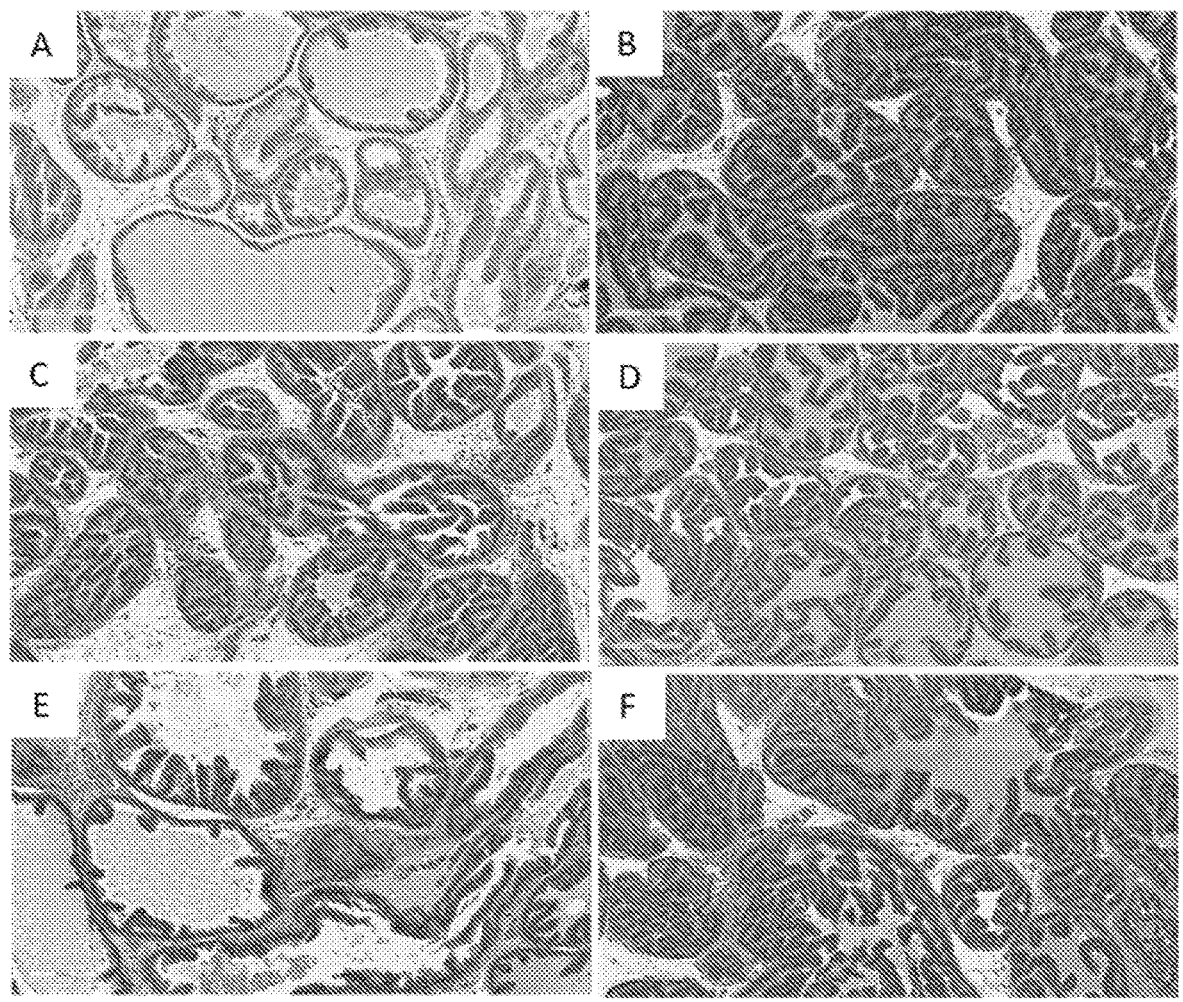
*FIG. 12* Shows microscope images of glandular hyperplasia in rat dorsolateral prostate at 100x magnifications.

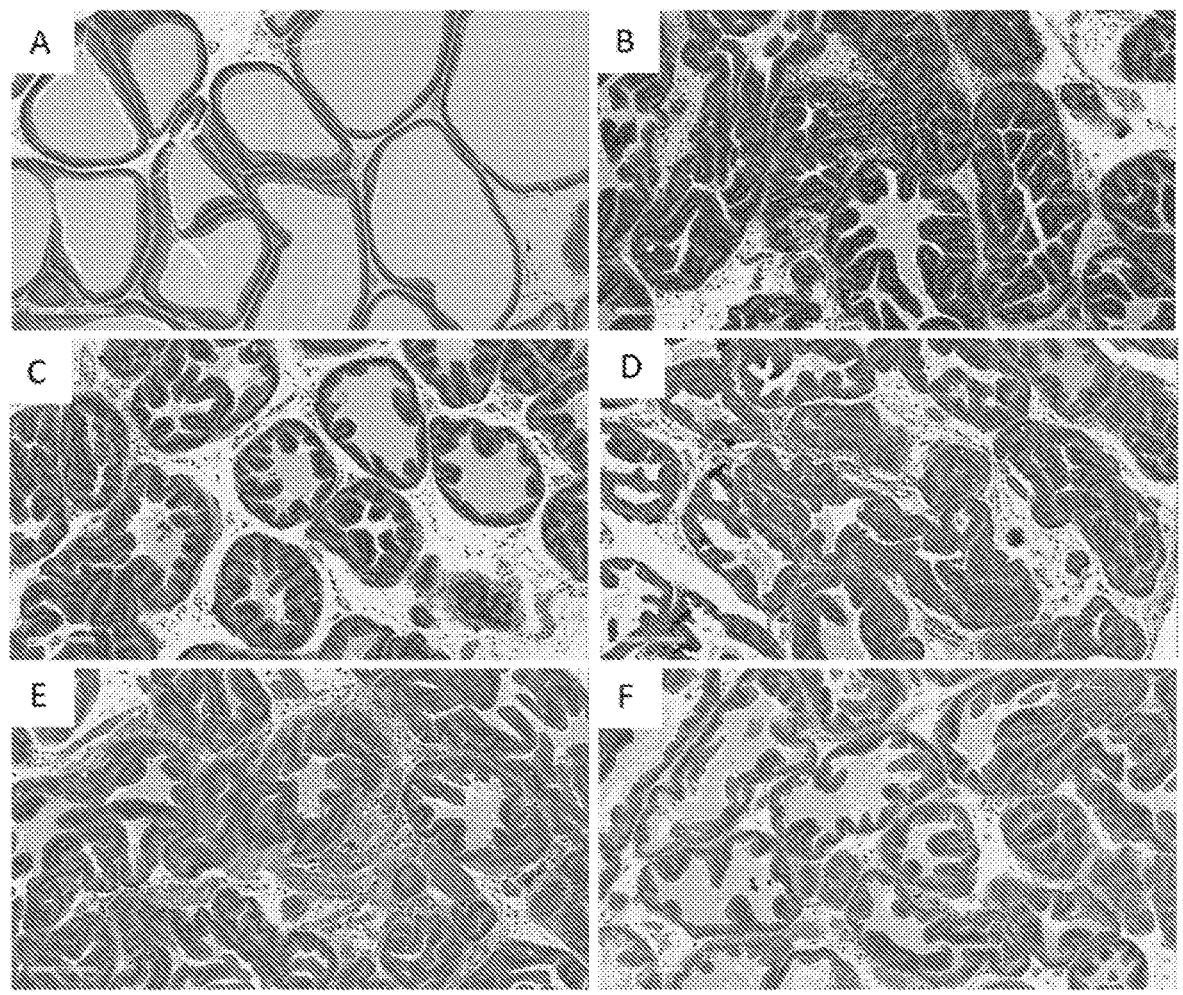
*FIG. 13* Shows representative images from ventral prostate at 100x magnification

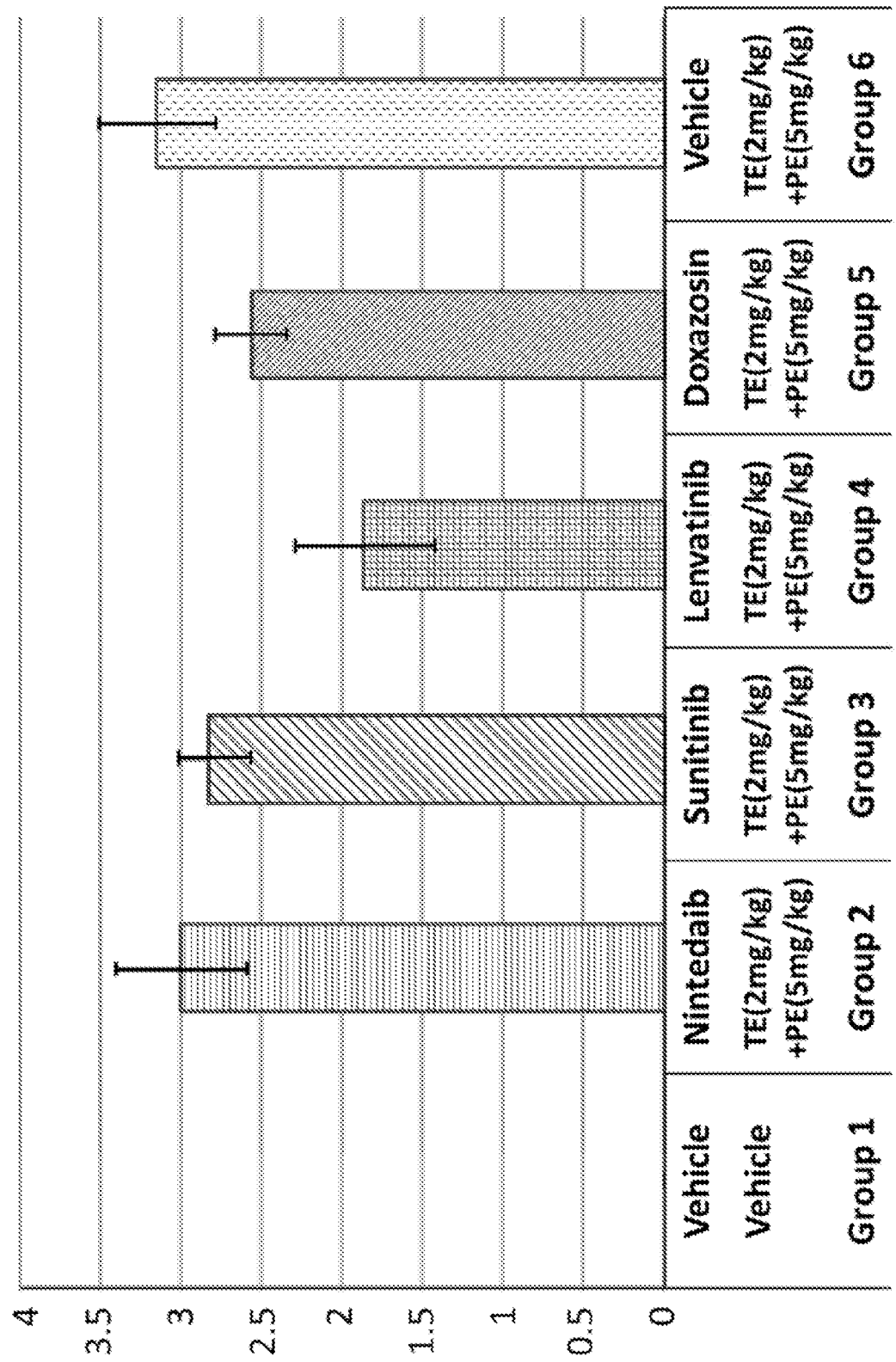
FIG. 14 Shows glandular hyperplasia mean scores in dorsolateral prostate for the experiments described in FIG. 12.

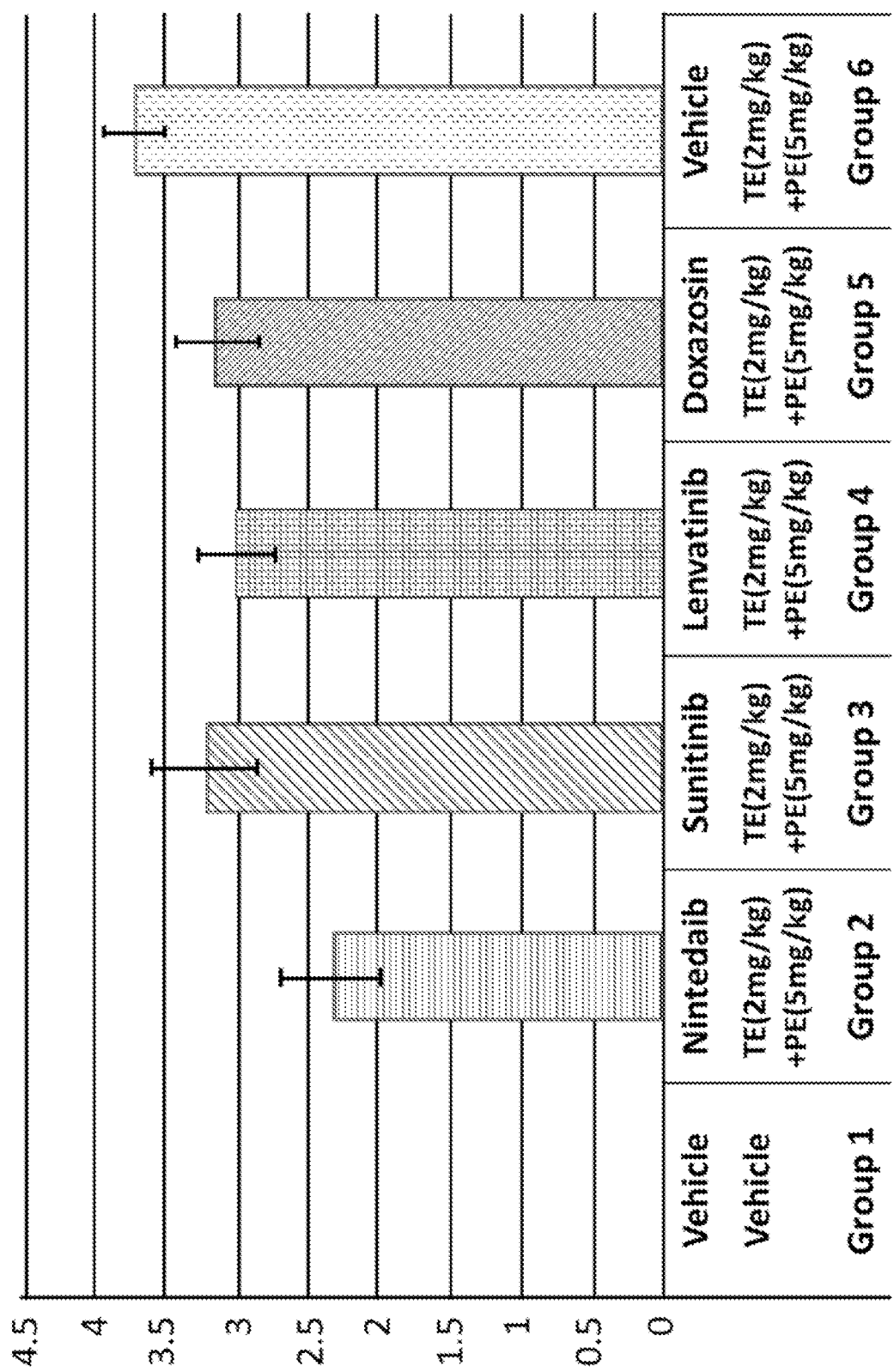
FIG. 15 shows glandular hyperplasia mean scores in ventral prostate for the experiment described in FIG. 13.

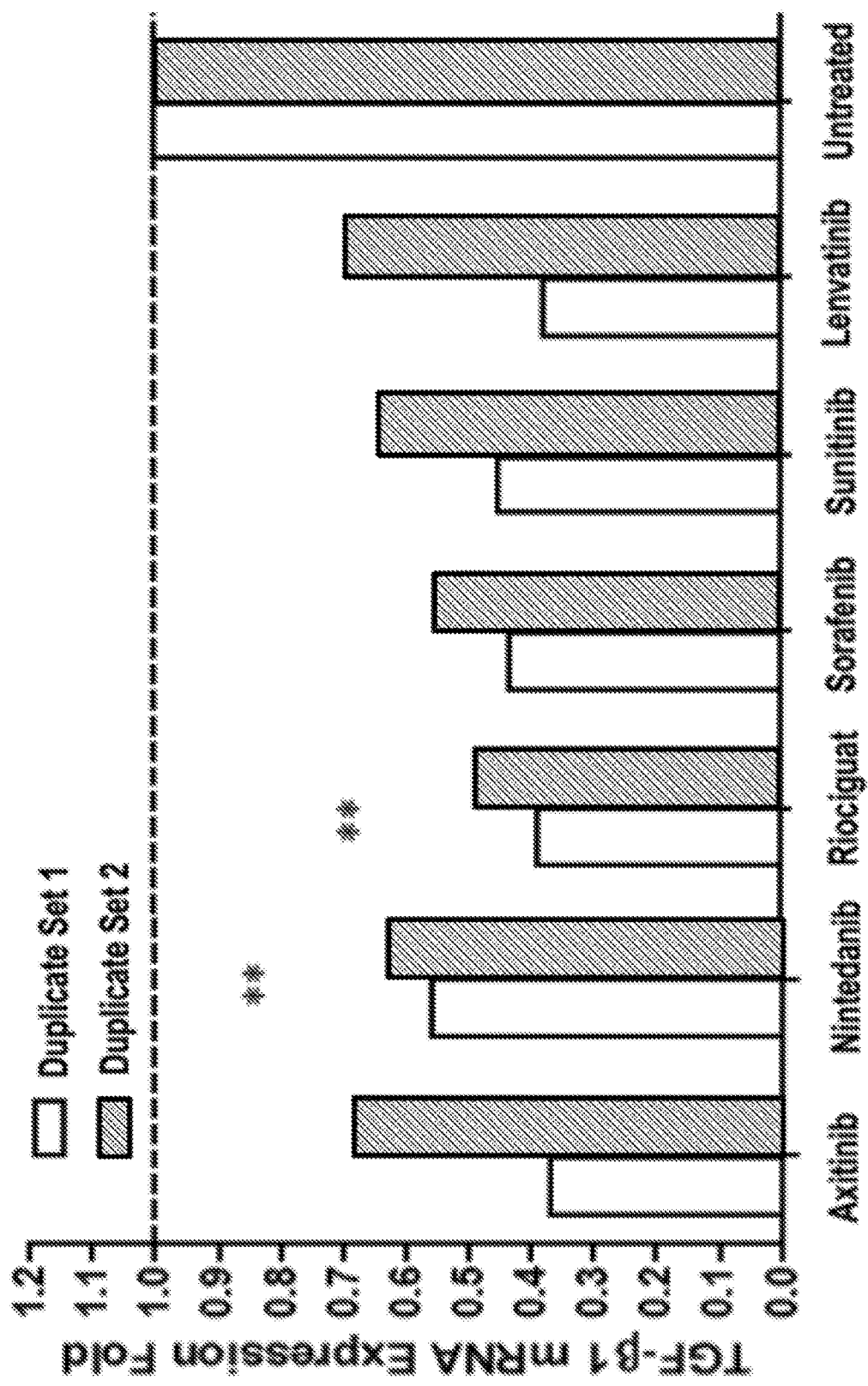
*FIG. 16* TGF-β1 mRNA expression levels in wound sites treated with compounds of the invention relative to those in an untreated unwounded site on the dorsum of pigs

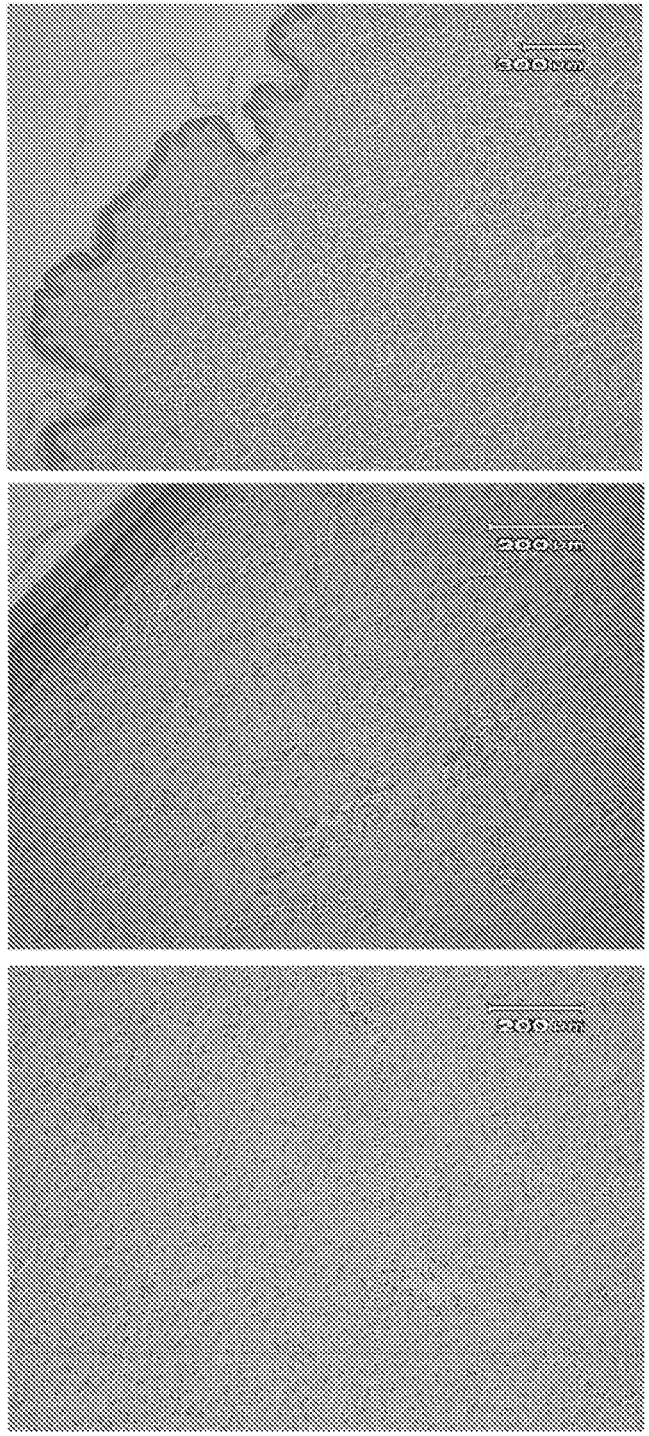
*FIG. 17* shows images of pig dermal tissues from histologic slides after hematoxylin and eosin staining.

MULTI-KINASE INHIBITORS OF VEGF AND TGF BETA AND USES THEREOF

CROSS-REFERENCE TO RELATED APPLICATIONS

This application is a national phase application of PCT/US2019/046401 filed on Aug. 13, 2019, which claims priority to U.S. Provisional Application No. 62/764,836, filed on Aug. 15, 2018, both of which are incorporated by reference in their entirety.

FIELD

This disclosure relates to methods of prevention and treatment of diseases or disorders characterized by chronic inflammation, associated with angiogenesis and fibrosis, such as psoriasis, rosacea, erythema multiforme, bullous pemphigoid, hereditary hemorrhagic telangiectasia, rheumatoid arthritis, atopic dermatitis, and dermal wound healing.

BACKGROUND

Chronic inflammation, associated with angiogenesis and fibrosis, is a characteristic of many diseases, such as psoriasis, rheumatoid arthritis and rosacea. Although these broad pathologies are contributing factors, the underlying causes of such diseases are often not clear.

For example, the cause of rosacea, which is characterized by facial redness, dilated blood vessels on facial skin, papules, pustules, and swelling, remains unknown. What is known is that whatever triggers episodes of flushing and blushing may play a part in the development of rosacea.

Similarly, psoriasis is an autoimmune disease characterized by patches of abnormal skin, which are typically red, itchy, and scaly. Such patches arise from abnormal, excessive growths of the skin. In psoriasis, skin cells are replaced every 3-5 days instead of every 28-30 days under normal conditions. These changes are believed to stem from the premature maturation of keratinocytes induced by an inflammatory cascade in the dermis. It is believed that these processes involve dendritic cells, macrophages, and T cells.

Because the pathophysiology of these diseases is complex and not completely understood, available treatment strategies are often not satisfactory. Kinase inhibitors, such as panatinib, pazopanib, regorafenib, could be candidates as treatment agents for these diseases.

SUMMARY

Some pharmaceutical compositions may be used for prevention or treatment of a disease or disorder characterized by chronic inflammation, with associated angiogenesis and fibrosis. In some embodiments, the disease or disorder include dermal-related disorders, benign prostate hyperplasia related disorders, eye-related disorders, rosacea-related disorders, uterine fibroids and related disorders, and adhesion-related disorders. In some embodiments, a pharmaceutical composition may include at least one compound as a multi-target inhibitor or multi-phase modulator (such as a multi-kinase inhibitor) such as axitinib, nintedanib, pirfenidone, riociguat, sorafenib, sunitinib, lenvatinib, regorafenib, ponatinib, or pazopanib.

Some embodiments include methods of prevention and treatment of a disease or disorder characterized by chronic inflammation, with associated angiogenesis and fibrosis. Some embodiments include a method comprising administering an effective amount of a multi-target inhibitor or multi-phase modulator (such a multi-kinase inhibitor) to a subject in need thereof. Useful multi-target inhibitors, multi-phase modulators, or multi-kinase inhibitors include axitinib, nintedanib, pirfenidone, riociguat, sorafenib, sunitinib, lenvatinib, regorafenib, ponatinib, or pazopanib. The disease or disorder can include dermal-related disorders, benign prostate hyperplasia related disorders, eye-related disorders, rosacea-related disorders, uterine fibroids and related disorders, and adhesion-related disorders.

In some embodiments, the administering is by a topical formulation, intralesional injection, paralesional injection, or by intra-tissue injection. The topical formulation is selected from a cream, an ointment, a solution, an emulsion, a medical plaster, or a local delivery form.

Other embodiments are apparent with the following detailed description and the attached drawings.

BRIEF DESCRIPTION OF THE DRAWINGS

FIG. 1 shows TGFb1 mRNA Expression for Mice Treated with Water and Vehicle, Mice Induced with LL37 and Vehicle, and Mice Induced with LL37 and Treated with Lenvatinib.

FIG. 2 shows inflammation Scores of Treatment Groups with Intradermal LL37 Induction in mice.

FIG. 3 shows CD4+ Lymphocyte Scores after treatments with multi-kinase inhibitors in intradermal LL37 injection-induced inflammation model in mice.

FIG. 4 shows CD8+ Lymphocyte Scores after treatments with multi-kinase inhibitors in intradermal LL37 injection-induced inflammation model in mice.

FIG. 5 shows the effects of some multi-kinase inhibitors on TGFb1 expressions over time following wounding and drug treatments.

FIG. 6 shows folds of TGF-$\beta$1 mRNA expressions in rabbit ear wound sites after intradermal treatments with multi-kinase inhibitors, as compared to the untreated wound site.

FIG. 7 shows inhibition of corneal neovascularization in a rabbit corneal suture model by nintedanib, sorafenib, and lenvatinib in accordance with embodiments of the present disclosure.

FIG. 8 shows inhibition of fibroplasia, collagen density, and alpha SMA (smooth muscle actin) in a rabbit corneal suture-induced fibrosis model by nintedanib and lenvatinib, but not by sorafenib.

FIG. 9 shows a representative conjunctival bleb formation in a rabbit model of glaucoma filtration surgery.

FIG. 10 shows treatment effect of multikinase inhibitors on bleb survival in a rabbit model of glaucoma filtration surgery.

FIG. 11 shows representative images of eyes two weeks post laser treatment. (A) Fluorescein fundus angiography; (B) Isolectin B4; and (C) Isolectin B4/DAPI.

FIG. 12 shows microscope images of glandular hyperplasia in rat dorsolateral prostate at 100× magnifications.

FIG. 13 shows representative images from ventral prostate at 100× magnification.

FIG. 14 shows glandular hyperplasia mean scores in dorsolateral prostate for the experiments described in FIG. 12.

FIG. 15 shows glandular hyperplasia mean scores in ventral prostate for the experiment described in FIG. 13.

FIG. 16 shows TGF-β1 mRNA expression levels in wound sites treated with compounds of the present disclosure relative to those in an untreated unwounded site on the dorsum of pigs.

FIG. 17 shows images of pig dermal tissues from histologic slides after hematoxylin and eosin staining.

DETAILED DESCRIPTION

Some embodiments include compounds, compositions and methods for the treatment or prevention of diseases or disorders associated with chronic inflammation, which is often accompanied with angiogenesis and/or fibrosis. In particular, some embodiments relate to the prevention, or treatment, of rosacea in humans. Compounds having a certain spectrum of multi-target inhibitors or multi-kinase inhibition activities (i.e., these multi-kinase inhibitors can inhibit multiple kinases) can affect certain growth factor and cytokine signaling pathways, such as vascular endothelial growth factor (VEGF), transforming growth factor beta (TGF beta), platelet-derived growth factor (PDGF), and fibroblast growth factor (FGF).

Many diseases (e.g., psoriasis, rheumatoid arthritis, and rosacea) are associated with chronic inflammation and angiogenesis. However, the mechanisms responsible for many of these diseases are complex and not well understood. As a result, treatments of these diseases often are not satisfactory.

Rosacea affects approximately 5-10% of the adult population in the United States. Pharmacological agents currently approved for topical treatments of rosacea include sodium sulfacetamide, azelaic acid, metronidazole, and the alpha-adrenergic agonist brimonidine. Off-label uses of topical retinoids, calcineurin inhibitors, macrolides, benzoyl peroxide, permethrin or ivermectin has also been shown to be somewhat beneficial. The need for new pharmaceutical strategies, however, is clear and the development of emerging therapies is ongoing.

Regulation of inflammation and angiogenesis in these diseases is dependent on a complex network of growth factors and cytokines, and their signaling pathways. Vascular endothelial growth factor (VEGF) is a major stimulator of angiogenesis and has inflammatory activities. It has been reported that VEGF and its receptors VEGFR-1 and VEGFR-2 are upregulated in rosacea. Furthermore, TGF beta has been shown to be an important regulator of chronic inflammation in diseases such as psoriasis and atopic dermatitis. These findings indicate that compounds that can modulate multiple regulatory factors may be more effective for the treatments of such diseases.

Inventors of the present disclosure have found that compounds having multi-kinase inhibitor activities with a selective profile can serve as novel agents for the prevention, treatment and modulation of rosacea and other skin diseases characterized by chronic inflammation and angiogenesis. Tests of these multi-target inhibitors (such as multi-kinase inhibitors) reveal that these compounds indeed are effective in the treatment and control of these diseases that involve inflammation, and associated angiogenesis and/or fibrosis.

In accordance with an embodiment, a method may involve administering a multi-kinase inhibitor to a subject in need of treatments or prevention of diseases associated with angiogenesis, inflammation and/or fibrosis. The multi-target inhibitors or multi-phase modulators may include, but are not limited to, axitinib, nintedanib, pirfenidone, riociguat, sorafenib, sunitinib, lenvatinib, regorafenib, ponatinib, pazopanib, lenvatinib, or a stereoisomer, tautomer, prodrug, free base, analog, metabolite, pharmaceutically acceptable salt, solvate or solvate of a salt thereof.

The term "treating" or "treatment" broadly includes any kind of treatment activity, including the diagnosis, cure, mitigation, or prevention of disease in human beings or other mammals, or any activity that otherwise affects the structure or any function of the body of human beings or other mammals. In some embodiments, administering a multi-target inhibitor, multi-phase modulator, or multi-kinase inhibitor, such as axitinib, nintedanib, pirfenidone, riociguat, sorafenib, sunitinib, lenvatinib, regorafenib, ponatinib, or pazopanib, is effective in mitigating or reducing a sign, symptom, or pathology, or reducing some other indicator of a disease or condition, by at least about 1%, at least about 5%, at least about 10%, at least about 20%, at least about 30%, at least about 40%, at least about 50%, at least about 60%, at least about 70%, at least about 80%, at least about 90%, at least about 95%, at least about 98%, or at least about 99%.

Unless otherwise indicated, any reference to a compound such as a multi-target inhibitor, multi-phase modulator, or a multi-kinase inhibitor, e.g. axitinib, nintedanib, pirfenidone, riociguat, sorafenib, sunitinib, lenvatinib, regorafenib, ponatinib, pazopanib, etc. includes pharmaceutically acceptable salts; prodrugs; alternate solid forms, such as polymorphs, solvates, hydrates, etc.; tautomers; or any other chemical species that may rapidly convert to a compound described herein under conditions in which the compounds are used as described herein.

In some embodiments, the diseases or disorders characterized by inflammation, such as chronic inflammation, with associated angiogenesis and fibrosis, which may be treated by multi-target inhibitors, multi-phase modulators, or multi-kinase inhibitors, e.g. axitinib, nintedanib, pirfenidone, riociguat, sorafenib, sunitinib, lenvatinib, regorafenib, ponatinib, or pazopanib, include but are not limited to dermal-related disorders, benign prostate hyperplasia related disorders, eye-related disorders, rosacea-related disorders, uterine fibroids and related disorders, and adhesion-related disorders.

Dermal related disorders that may be treated by multi-target inhibitors, multi-phase modulators, or multi-kinase inhibitors include, but are not limited to: acne scar, skin scar, wrinkle, cellulite and dermal neoplastic fibrosis, scarring alopecia, vasculopathy, vasculitis, wound healing, exuberant burn wound healing, diabetic foot syndrome, scleroderma, arthrofibrosis, Peyronie's disease, Dupuytren's contracture, adhesive capsulitis, wart, melasma, actinic keratosis, non-melanoma skin cancers, melanoma, Bowen disease, moles, seborrheic keratoses, hemangiomas, keratoacanthomas, basal cell carcinoma, squamous cell carcinoma (SCC, SCC can occur in any organ having squamous epithelium, e.g., lung, biliary tract, bone, cervix, endometrium, eye, genital tract, large intestine, oesophagus, ovary, salivary gland, skin, stomach, thymus, upper aerodigestive tract, urinary tract, bladder, prostate, penis, cervix, vagina, vulva, etc.) etc.

Multi-target inhibitors (such as multi-kinase inhibitors) may also be used to treat benign prostate hyperplasia and related disorders, such as its associated lower urinary tract symptoms, fibrosis of ureters and renal pelvis, prostate adenoma, prostatic intraepithelial neoplasia, etc.

Eye-related disorders that may be treated by multi-target inhibitors (such as multi-kinase inhibitors) include, but are not limited to: uveitis, corneal transparency, corneal scar formation, secondary cataract formation, glaucoma filtration surgery, ocular surgical procedures and implants, photorefractive keratectomy, laser in situ keratomileusis, formation and contraction of pre- and epiretinal membranes, proliferative vitreoretinopathy, proliferative diabetic retinopathy, diabetic macular edema, subretinal fibrosis/scarring, retinal gliosis, and formation of choroidal membranes, wet age-related macular degeneration, atrophic or dry age-related macular degeneration, retinal vein occlusion, etc.

Multi-target inhibitors (such as multi-kinase inhibitors) may also be used to treat rosacea and related disorders, such as rosacea, psoriasis, erythema multiforme, bullous pemphigoid, hereditary hemorrhagic telangiectasia, rheumatoid arthritis, atopic dermatitis and dermal wound healing.

Multi-target inhibitors (such as multi-kinase inhibitors) may also be used to treat uterine fibroids and related disorders such as uterine myomas (uterine parasitic myomas), primary sclerosing cholangitis, intra uterine surgery, intra uterine synechiae, Asherman's syndrome (also known as intrauterine adhesions, intrauterine synechiae), biliary duct fibrosis, biliary duct sclerosis, primary biliary cirrhosis, fibrosis of ureters and renal pelvis, retroperitoneal fibrosis, adenomyosis, uterine fibromyoma, uterine fibroleiomyoma, intrauterine adhesions, intrauterine synachiae, uterine fibroma, intramural fibroids, subserosal fibroids, submucosal fibroids, pedunculated fibroids, uterine leiomyomas, cervical fibroids, uterine synechiae, etc.

Multi-target inhibitors (such as multi-kinase inhibitors) may also be used to treat adhesion-related disorders such as post-surgical adhesion, peritendinous adhesion, carpal tunnel surgery, Asherman's syndrome, intrauterine adhesion, frozen shoulder, adhesive capsulitis, chronic transplant rejection, fistula formation, Dupuytren's contracture, Grave's disease, Grave's hyperthyroidism, chronic graft versus host disease, Sjogren's syndrome, systemic sclerosis, systemic scleroderma, etc.

In some embodiments, axitinib is administered to a mammal, particularly a human being, to treat a dermal-related disorder. In some embodiments, axitinib is administered to a mammal, particularly a human being, to treat a scar. In some embodiments, axitinib is administered to a mammal, particularly a human being, to treat a skin scar. In some embodiments, axitinib is administered to a mammal, particularly a human being, to treat a wrinkle. In some embodiments, axitinib is administered to a mammal, particularly a human being, to treat cellulite. In some embodiments, axitinib is administered to a mammal, particularly a human being, to treat dermal neoplastic fibrosis. In some embodiments, axitinib is administered to a mammal, particularly a human being, to treat scarring alopecia. In some embodiments, axitinib is administered to a mammal, particularly a human being, to treat vasculopathy. In some embodiments, axitinib is administered to a mammal, particularly a human being, to treat vasculitis. In some embodiments, axitinib is administered to a mammal, particularly a human being, for wound healing. In some embodiments, axitinib is administered to a mammal, particularly a human being, for exuberant burn wound healing. In some embodiments, axitinib is administered to a mammal, particularly a human being, to treat diabetic foot syndrome. In some embodiments, axitinib is administered to a mammal, particularly a human being, to treat scleroderma. In some embodiments, axitinib is administered to a mammal, particularly a human being, to treat arthrofibrosis. In some embodiments, axitinib is administered to a mammal, particularly a human being, to treat Peyronie's disease. In some embodiments, axitinib is administered to a mammal, particularly a human being, to treat Dupuytren's contracture. In some embodiments, axitinib is administered to a mammal, particularly a human being, to treat adhesive capsulitis. In some embodiments, axitinib is administered to a mammal, particularly a human being, to treat non-melanoma skin cancers. In some embodiments, axitinib is administered to a mammal, particularly a human being, to treat melanoma. In some embodiments, axitinib is administered to a mammal, particularly a human being, to treat actinic keratosis. In some embodiments, axitinib is administered to a mammal, particularly a human being, to treat basal cell carcinoma. In some embodiments, axitinib is administered to a mammal, particularly a human being, to treat squamous-cell carcinoma.

In some embodiments, axitinib is administered to a mammal, particularly a human being, to treat benign prostate hyperplasia and/or its associated lower urinary tract symptoms. In some embodiments, axitinib is administered to a mammal, particularly a human being, to treat fibrosis of ureters and/or of renal pelvis. In some embodiments, axitinib is administered to a mammal, particularly a human being, to treat prostate adenoma. In some embodiments, axitinib is administered to a mammal, particularly a human being, to treat to treat prostatic intraepithelial neoplasia.

In some embodiments, axitinib is administered to a mammal, particularly a human being, to treat an eye-related disorder. In some embodiments, axitinib is administered to a mammal, particularly a human being, to treat uveitis. In some embodiments, axitinib is administered to a mammal, particularly a human being, to treat corneal transparency. In some embodiments, axitinib is administered to a mammal, particularly a human being, to treat corneal scar formation. In some embodiments, axitinib is administered to a mammal, particularly a human being, to treat secondary cataract formation. In some embodiments, axitinib is administered to a mammal, particularly a human being, in conjunction with glaucoma filtration surgery. In some embodiments, axitinib is administered to a mammal, particularly a human being, to treat ocular surgical procedures and implants. In some embodiments, axitinib is administered to a mammal, particularly a human being, in conjunction with photorefractive keratectomy. In some embodiments, axitinib is administered to a mammal, particularly a human being, in conjunction with laser in situ keratomileusis. In some embodiments, axitinib is administered to a mammal, particularly a human being, to treat formation and contraction of pre- and epiretinal membranes. In some embodiments, axitinib is administered to a mammal, particularly a human being, to treat proliferative vitreoretinopathy. In some embodiments, axitinib is administered to a mammal, particularly a human being, to treat proliferative diabetic retinopathy. In some embodiments, axitinib is administered to a mammal, particularly a human being, to treat diabetic macular edema. In some embodiments, axitinib is administered to a mammal, particularly a human being, to treat subretinal fibrosis/scarring. In some embodiments, axitinib is administered to a mammal, particularly a human being, to treat retinal gliosis. In some embodiments, axitinib is administered to a mammal, particularly a human being, to treat and formation of choroidal membranes. In some embodiments, axitinib is administered to a mammal, particularly a human being, to treat wet age-related macular degeneration. In some embodiments, axitinib is administered to a mammal, particularly a human being, to treat atrophic or dry age-related macular degeneration. In some embodiments, axitinib is administered to a mammal, particularly a human being, to treat retinal vein occlusion.

In some embodiments, axitinib is administered to a mammal, particularly a human being, to treat rosacea. In some embodiments, axitinib is administered to a mammal, particularly a human being, to treat psoriasis. In some embodiments, axitinib is administered to a mammal, particularly a human being, to treat erythema multiforme. In some embodiments, axitinib is administered to a mammal, particularly a human being, to treat bullous pemphigoid. In some embodiments, axitinib is administered to a mammal, particularly a human being, to treat hereditary hemorrhagic telangiectasia. In some embodiments, axitinib is administered to a mammal, particularly a human being, to treat rheumatoid arthritis. In some embodiments, axitinib is administered to a mammal, particularly a human being, to treat atopic dermatitis. In some embodiments, axitinib is administered to a mammal, particularly a human being, for dermal wound healing.

In some embodiments, axitinib is administered to a mammal, particularly a human being, to treat uterine fibroids. In some embodiments, axitinib is administered to a mammal, particularly a human being, to treat a uterine myoma. In some embodiments, axitinib is administered to a mammal, particularly a human being, to treat a uterine parasitic myoma. In some embodiments, axitinib is administered to a mammal, particularly a human being, to treat primary sclerosing cholangitis. In some embodiments, axitinib is administered to a mammal, particularly a human being, for intra uterine surgery. In some embodiments, axitinib is administered to a mammal, particularly a human being, to treat intra uterine synechiae. In some embodiments, axitinib is administered to a mammal, particularly a human being, to treat Asherman's syndrome. In some embodiments, axitinib is administered to a mammal, particularly a human being, to treat intrauterine adhesions. In some embodiments, axitinib is administered to a mammal, particularly a human being, to treat intrauterine synechiae. In some embodiments, axitinib is administered to a mammal, particularly a human being, to treat biliary duct fibrosis. In some embodiments, axitinib is administered to a mammal, particularly a human being, to treat biliary duct sclerosis. In some embodiments, axitinib is administered to a mammal, particularly a human being, to treat primary biliary cirrhosis. In some embodiments, axitinib is administered to a mammal, particularly a human being, to treat fibrosis of ureters and/or renal pelvis. In some embodiments, axitinib is administered to a mammal, particularly a human being, to treat retroperitoneal fibrosis. In some embodiments, axitinib is administered to a mammal, particularly a human being, to treat adenomyosis. In some embodiments, axitinib is administered to a mammal, particularly a human being, to treat uterine fibromyoma. In some embodiments, axitinib is administered to a mammal, particularly a human being, to treat uterine fibroleiomyoma. In some embodiments, axitinib is administered to a mammal, particularly a human being, to treat intrauterine adhesions. In some embodiments, axitinib is administered to a mammal, particularly a human being, to treat intrauterine synachiae. In some embodiments, axitinib is administered to a mammal, particularly a human being, to treat uterine fibroma, intramural fibroids. In some embodiments, axitinib is administered to a mammal, particularly a human being, to treat subserosal fibroids. In some embodiments, axitinib is administered to a mammal, particularly a human being, to treat submucosal fibroids. In some embodiments, axitinib is administered to a mammal, particularly a human being, to treat pedunculated fibroids. In some embodiments, axitinib is administered to a mammal, particularly a human being, to treat uterine leiomyomas. In some embodiments, axitinib is administered to a mammal, particularly a human being, to treat cervical fibroids. In some embodiments, axitinib is administered to a mammal, particularly a human being, to treat uterine synechiae.

In some embodiments, axitinib is administered to a mammal, particularly a human being, to treat adhesion-related disorders. In some embodiments, axitinib is administered to a mammal, particularly a human being, to treat post-surgical adhesion. In some embodiments, axitinib is administered to a mammal, particularly a human being, to treat peritendinous adhesion. In some embodiments, axitinib is administered to a mammal, particularly a human being, to treat carpal tunnel surgery. In some embodiments, axitinib is administered to a mammal, particularly a human being, to treat intrauterine adhesion. In some embodiments, axitinib is administered to a mammal, particularly a human being, to treat frozen shoulder. In some embodiments, axitinib is administered to a mammal, particularly a human being, to treat adhesive capsulitis. In some embodiments, axitinib is administered to a mammal, particularly a human being, to treat chronic transplant rejection. In some embodiments, axitinib is administered to a mammal, particularly a human being, to treat fistula formation. In some embodiments, axitinib is administered to a mammal, particularly a human being, to treat Dupuytren's contracture. In some embodiments, axitinib is administered to a mammal, particularly a human being, to treat Grave's disease. In some embodiments, axitinib is administered to a mammal, particularly a human being, to treat Grave's hyperthyroidism. In some embodiments, axitinib is administered to a mammal, particularly a human being, to treat chronic graft versus host disease. In some embodiments, axitinib is administered to a mammal, particularly a human being, to treat Sjogren's syndrome. In some embodiments, axitinib is administered to a mammal, particularly a human being, to treat systemic sclerosis. In some embodiments, axitinib is administered to a mammal, particularly a human being, to treat systemic scleroderma.

In some embodiments, nintedanib is administered to a mammal, particularly a human being, to treat a dermal-related disorder. In some embodiments, nintedanib is administered to a mammal, particularly a human being, to treat a scar. In some embodiments, nintedanib is administered to a mammal, particularly a human being, to treat a skin scar. In some embodiments, nintedanib is administered to a mammal, particularly a human being, to treat a wrinkle. In some embodiments, nintedanib is administered to a mammal, particularly a human being, to treat cellulite. In some embodiments, nintedanib is administered to a mammal, particularly a human being, to treat dermal neoplastic fibrosis. In some embodiments, nintedanib is administered to a mammal, particularly a human being, to treat scarring alopecia. In some embodiments, nintedanib is administered to a mammal, particularly a human being, to treat vasculopathy. In some embodiments, nintedanib is administered to a mammal, particularly a human being, to treat vasculitis. In some embodiments, nintedanib is administered to a mammal, particularly a human being, for wound healing. In some embodiments, nintedanib is administered to a mammal, particularly a human being, for exuberant burn wound healing. In some embodiments, nintedanib is administered to a mammal, particularly a human being, to treat diabetic foot syndrome. In some embodiments, nintedanib is administered to a mammal, particularly a human being, to treat scleroderma. In some embodiments, nintedanib is administered to a mammal, particularly a human being, to treat arthrofibrosis. In some embodiments, nintedanib is administered to a mammal, particularly a human being, to treat Peyronie's disease. In some embodiments, nintedanib is administered to a mammal, particularly a human being, to treat Dupuytren's contracture. In some embodiments, nintedanib is administered to a mammal, particularly a human being, to treat adhesive capsulitis. In some embodiments, nintedanib is administered to a mammal, particularly a human being, to treat non-melanoma skin cancers. In some embodiments, nintedanib is administered to a mammal, particularly a human being, to treat melanoma. In some embodiments, nintedanib is administered to a mammal, particularly a human being, to treat actinic keratosis. In some embodiments, nintedanib is administered to a mammal, particularly a human being, to treat basal cell carcinoma. In some embodiments, nintedanib is administered to a mammal, particularly a human being, to treat squamous-cell carcinoma.

In some embodiments, nintedanib is administered to a mammal, particularly a human being, to treat benign prostate hyperplasia and/or its associated lower urinary tract symptoms. In some embodiments, nintedanib is administered to a mammal, particularly a human being, to treat fibrosis of ureters and/or of renal pelvis. In some embodiments, nintedanib is administered to a mammal, particularly a human being, to treat prostate adenoma. In some embodiments, nintedanib is administered to a mammal, particularly a human being, to treat to treat prostatic intraepithelial neoplasia.

In some embodiments, nintedanib is administered to a mammal, particularly a human being, to treat an eye-related disorder. In some embodiments, nintedanib is administered to a mammal, particularly a human being, to treat uveitis. In some embodiments, nintedanib is administered to a mammal, particularly a human being, to treat corneal transparency. In some embodiments, nintedanib is administered to a mammal, particularly a human being, to treat corneal scar formation. In some embodiments, nintedanib is administered to a mammal, particularly a human being, to treat secondary cataract formation. In some embodiments, nintedanib is administered to a mammal, particularly a human being, in conjunction with glaucoma filtration surgery. In some embodiments, nintedanib is administered to a mammal, particularly a human being, to treat ocular surgical procedures and implants. In some embodiments, nintedanib is administered to a mammal, particularly a human being, in conjunction with photorefractive keratectomy. In some embodiments, nintedanib is administered to a mammal, particularly a human being, in conjunction with laser in situ keratomileusis. In some embodiments, nintedanib is administered to a mammal, particularly a human being, to treat formation and contraction of pre- and epiretinal membranes. In some embodiments, nintedanib is administered to a mammal, particularly a human being, to treat proliferative vitreoretinopathy. In some embodiments, nintedanib is administered to a mammal, particularly a human being, to treat proliferative diabetic retinopathy. In some embodiments, nintedanib is administered to a mammal, particularly a human being, to treat diabetic macular edema. In some embodiments, nintedanib is administered to a mammal, particularly a human being, to treat subretinal fibrosis/scarring. In some embodiments, nintedanib is administered to a mammal, particularly a human being, to treat retinal gliosis. In some embodiments, nintedanib is administered to a mammal, particularly a human being, to treat and formation of choroidal membranes. In some embodiments, nintedanib is administered to a mammal, particularly a human being, to treat wet age-related macular degeneration. In some embodiments, nintedanib is administered to a mammal, particularly a human being, to treat atrophic or dry age-related macular degeneration. In some embodiments, nintedanib is administered to a mammal, particularly a human being, to treat retinal vein occlusion.

In some embodiments, nintedanib is administered to a mammal, particularly a human being, to treat rosacea. In some embodiments, nintedanib is administered to a mammal, particularly a human being, to treat psoriasis. In some embodiments, nintedanib is administered to a mammal, particularly a human being, to treat erythema multiforme. In some embodiments, nintedanib is administered to a mammal, particularly a human being, to treat bullous pemphigoid. In some embodiments, nintedanib is administered to a mammal, particularly a human being, to treat hereditary hemorrhagic telangiectasia. In some embodiments, nintedanib is administered to a mammal, particularly a human being, to treat rheumatoid arthritis. In some embodiments, nintedanib is administered to a mammal, particularly a human being, to treat atopic dermatitis. In some embodiments, nintedanib is administered to a mammal, particularly a human being, for dermal wound healing.

In some embodiments, nintedanib is administered to a mammal, particularly a human being, to treat uterine fibroids. In some embodiments, nintedanib is administered to a mammal, particularly a human being, to treat a uterine myoma. In some embodiments, nintedanib is administered to a mammal, particularly a human being, to treat a uterine parasitic myoma. In some embodiments, nintedanib is administered to a mammal, particularly a human being, to treat primary sclerosing cholangitis. In some embodiments, nintedanib is administered to a mammal, particularly a human being, for intra uterine surgery. In some embodiments, nintedanib is administered to a mammal, particularly a human being, to treat intra uterine synechiae. In some embodiments, nintedanib is administered to a mammal, particularly a human being, to treat Asherman's syndrome. In some embodiments, nintedanib is administered to a mammal, particularly a human being, to treat intrauterine adhesions. In some embodiments, nintedanib is administered to a mammal, particularly a human being, to treat intrauterine synechiae. In some embodiments, nintedanib is administered to a mammal, particularly a human being, to treat biliary duct fibrosis. In some embodiments, nintedanib is administered to a mammal, particularly a human being, to treat biliary duct sclerosis. In some embodiments, nintedanib is administered to a mammal, particularly a human being, to treat primary biliary cirrhosis. In some embodiments, nintedanib is administered to a mammal, particularly a human being, to treat fibrosis of ureters and/or renal pelvis. In some embodiments, nintedanib is administered to a mammal, particularly a human being, to treat retroperitoneal fibrosis. In some embodiments, nintedanib is administered to a mammal, particularly a human being, to treat adenomyosis. In some embodiments, nintedanib is administered to a mammal, particularly a human being, to treat uterine fibromyoma. In some embodiments, nintedanib is administered to a mammal, particularly a human being, to treat uterine fibroleiomyoma. In some embodiments, nintedanib is administered to a mammal, particularly a human being, to treat intrauterine adhesions. In some embodiments, nintedanib is administered to a mammal, particularly a human being, to treat intrauterine synachiae. In some embodiments, nintedanib is administered to a mammal, particularly a human being, to treat uterine fibroma, intramural fibroids. In some embodiments, nintedanib is administered to a mammal, particularly a human being, to treat subserosal fibroids. In some embodiments, nintedanib is administered to a mammal, particularly a human being, to treat submucosal fibroids. In some embodiments, nintedanib is administered to a mammal, particularly a human being, to treat pedunculated fibroids. In some embodiments, nintedanib is administered to a mammal, particularly a human being, to treat uterine leiomyomas. In some embodiments, nintedanib is administered to a mammal, particularly a human being, to treat cervical fibroids. In some embodiments, nintedanib is administered to a mammal, particularly a human being, to treat uterine synechiae.

In some embodiments, nintedanib is administered to a mammal, particularly a human being, to treat adhesion-related disorders. In some embodiments, nintedanib is administered to a mammal, particularly a human being, to treat post-surgical adhesion. In some embodiments, nintedanib is administered to a mammal, particularly a human being, to treat peritendinous adhesion. In some embodiments, nintedanib is administered to a mammal, particularly a human being, to treat carpal tunnel surgery. In some embodiments, nintedanib is administered to a mammal, particularly a human being, to treat intrauterine adhesion. In some embodiments, nintedanib is administered to a mammal, particularly a human being, to treat frozen shoulder. In some embodiments, nintedanib is administered to a mammal, particularly a human being, to treat adhesive capsulitis. In some embodiments, nintedanib is administered to a mammal, particularly a human being, to treat chronic transplant rejection. In some embodiments, nintedanib is administered to a mammal, particularly a human being, to treat fistula formation. In some embodiments, nintedanib is administered to a mammal, particularly a human being, to treat Dupuytren's contracture. In some embodiments, nintedanib is administered to a mammal, particularly a human being, to treat Grave's disease. In some embodiments, nintedanib is administered to a mammal, particularly a human being, to treat Grave's hyperthyroidism. In some embodiments, nintedanib is administered to a mammal, particularly a human being, to treat chronic graft versus host disease. In some embodiments, nintedanib is administered to a mammal, particularly a human being, to treat Sjogren's syndrome. In some embodiments, nintedanib is administered to a mammal, particularly a human being, to treat systemic sclerosis. In some embodiments, nintedanib is administered to a mammal, particularly a human being, to treat systemic scleroderma.

In some embodiments, pirfenidone is administered to a mammal, particularly a human being, to treat a dermal-related disorder. In some embodiments, pirfenidone is administered to a mammal, particularly a human being, to treat a scar. In some embodiments, pirfenidone is administered to a mammal, particularly a human being, to treat a skin scar. In some embodiments, pirfenidone is administered to a mammal, particularly a human being, to treat a wrinkle. In some embodiments, pirfenidone is administered to a mammal, particularly a human being, to treat cellulite. In some embodiments, pirfenidone is administered to a mammal, particularly a human being, to treat dermal neoplastic fibrosis. In some embodiments, pirfenidone is administered to a mammal, particularly a human being, to treat scarring alopecia. In some embodiments, pirfenidone is administered to a mammal, particularly a human being, to treat vasculopathy. In some embodiments, pirfenidone is administered to a mammal, particularly a human being, to treat vasculitis. In some embodiments, pirfenidone is administered to a mammal, particularly a human being, for wound healing. In some embodiments, pirfenidone is administered to a mammal, particularly a human being, for exuberant burn wound healing. In some embodiments, pirfenidone is administered to a mammal, particularly a human being, to treat diabetic foot syndrome. In some embodiments, pirfenidone is administered to a mammal, particularly a human being, to treat scleroderma. In some embodiments, pirfenidone is administered to a mammal, particularly a human being, to treat arthrofibrosis. In some embodiments, pirfenidone is administered to a mammal, particularly a human being, to treat Peyronie's disease. In some embodiments, pirfenidone is administered to a mammal, particularly a human being, to treat Dupuytren's contracture. In some embodiments, pirfenidone is administered to a mammal, particularly a human being, to treat adhesive capsulitis. In some embodiments, pirfenidone is administered to a mammal, particularly a human being, to treat non-melanoma skin cancers. In some embodiments, pirfenidone is administered to a mammal, particularly a human being, to treat melanoma. In some embodiments, pirfenidone is administered to a mammal, particularly a human being, to treat actinic keratosis. In some embodiments, pirfenidone is administered to a mammal, particularly a human being, to treat basal cell carcinoma. In some embodiments, pirfenidone is administered to a mammal, particularly a human being, to treat squamous-cell carcinoma.

In some embodiments, pirfenidone is administered to a mammal, particularly a human being, to treat benign prostate hyperplasia and/or its associated lower urinary tract symptoms. In some embodiments, pirfenidone is administered to a mammal, particularly a human being, to treat fibrosis of ureters and/or of renal pelvis. In some embodiments, pirfenidone is administered to a mammal, particularly a human being, to treat prostate adenoma. In some embodiments, pirfenidone is administered to a mammal, particularly a human being, to treat to treat prostatic intraepithelial neoplasia.

In some embodiments, pirfenidone is administered to a mammal, particularly a human being, to treat an eye-related disorder. In some embodiments, pirfenidone is administered to a mammal, particularly a human being, to treat uveitis. In some embodiments, pirfenidone is administered to a mammal, particularly a human being, to treat corneal transparency. In some embodiments, pirfenidone is administered to a mammal, particularly a human being, to treat corneal scar formation. In some embodiments, pirfenidone is administered to a mammal, particularly a human being, to treat secondary cataract formation. In some embodiments, pirfenidone is administered to a mammal, particularly a human being, in conjunction with glaucoma filtration surgery. In some embodiments, pirfenidone is administered to a mammal, particularly a human being, to treat ocular surgical procedures and implants. In some embodiments, pirfenidone is administered to a mammal, particularly a human being, in conjunction with photorefractive keratectomy. In some embodiments, pirfenidone is administered to a mammal, particularly a human being, in conjunction with laser in situ keratomileusis. In some embodiments, pirfenidone is administered to a mammal, particularly a human being, to treat formation and contraction of pre- and epiretinal membranes. In some embodiments, pirfenidone is administered to a mammal, particularly a human being, to treat proliferative vitreoretinopathy. In some embodiments, pirfenidone is administered to a mammal, particularly a human being, to treat proliferative diabetic retinopathy. In some embodiments, pirfenidone is administered to a mammal, particularly a human being, to treat diabetic macular edema. In some embodiments, pirfenidone is administered to a mammal, particularly a human being, to treat subretinal fibrosis/scarring. In some embodiments, pirfenidone is administered to a mammal, particularly a human being, to treat retinal gliosis. In some embodiments, pirfenidone is administered to a mammal, particularly a human being, to treat and formation of choroidal membranes. In some embodiments, pirfenidone is administered to a mammal, particularly a human being, to treat wet age-related macular degeneration. In some embodiments, pirfenidone is administered to a mammal, particularly a human being, to treat atrophic or dry age-related macular degeneration. In some embodiments, pirfenidone is administered to a mammal, particularly a human being, to treat retinal vein occlusion.

In some embodiments, pirfenidone is administered to a mammal, particularly a human being, to treat rosacea. In some embodiments, pirfenidone is administered to a mammal, particularly a human being, to treat psoriasis. In some embodiments, pirfenidone is administered to a mammal, particularly a human being, to treat erythema multiforme. In some embodiments, pirfenidone is administered to a mammal, particularly a human being, to treat bullous pemphigoid. In some embodiments, pirfenidone is administered to a mammal, particularly a human being, to treat hereditary hemorrhagic telangiectasia. In some embodiments, pirfenidone is administered to a mammal, particularly a human being, to treat rheumatoid arthritis. In some embodiments, pirfenidone is administered to a mammal, particularly a human being, to treat atopic dermatitis. In some embodiments, pirfenidone is administered to a mammal, particularly a human being, for dermal wound healing.

In some embodiments, pirfenidone is administered to a mammal, particularly a human being, to treat uterine fibroids. In some embodiments, pirfenidone is administered to a mammal, particularly a human being, to treat a uterine myoma. In some embodiments, pirfenidone is administered to a mammal, particularly a human being, to treat a uterine parasitic myoma. In some embodiments, pirfenidone is administered to a mammal, particularly a human being, to treat primary sclerosing cholangitis. In some embodiments, pirfenidone is administered to a mammal, particularly a human being, for intra uterine surgery. In some embodiments, pirfenidone is administered to a mammal, particularly a human being, to treat intra uterine synechiae. In some embodiments, pirfenidone is administered to a mammal, particularly a human being, to treat Asherman's syndrome. In some embodiments, pirfenidone is administered to a mammal, particularly a human being, to treat intrauterine adhesions. In some embodiments, pirfenidone is administered to a mammal, particularly a human being, to treat intrauterine synechiae. In some embodiments, pirfenidone is administered to a mammal, particularly a human being, to treat biliary duct fibrosis. In some embodiments, pirfenidone is administered to a mammal, particularly a human being, to treat biliary duct sclerosis. In some embodiments, pirfenidone is administered to a mammal, particularly a human being, to treat primary biliary cirrhosis. In some embodiments, pirfenidone is administered to a mammal, particularly a human being, to treat fibrosis of ureters and/or renal pelvis. In some embodiments, pirfenidone is administered to a mammal, particularly a human being, to treat retroperitoneal fibrosis. In some embodiments, pirfenidone is administered to a mammal, particularly a human being, to treat adenomyosis. In some embodiments, pirfenidone is administered to a mammal, particularly a human being, to treat uterine fibromyoma. In some embodiments, pirfenidone is administered to a mammal, particularly a human being, to treat uterine fibroleiomyoma. In some embodiments, pirfenidone is administered to a mammal, particularly a human being, to treat intrauterine adhesions. In some embodiments, pirfenidone is administered to a mammal, particularly a human being, to treat intrauterine synachiae. In some embodiments, pirfenidone is administered to a mammal, particularly a human being, to treat uterine fibroma, intramural fibroids. In some embodiments, pirfenidone is administered to a mammal, particularly a human being, to treat subserosal fibroids. In some embodiments, pirfenidone is administered to a mammal, particularly a human being, to treat submucosal fibroids. In some embodiments, pirfenidone is administered to a mammal, particularly a human being, to treat pedunculated fibroids. In some embodiments, pirfenidone is administered to a mammal, particularly a human being, to treat uterine leiomyomas. In some embodiments, pirfenidone is administered to a mammal, particularly a human being, to treat cervical fibroids. In some embodiments, pirfenidone is administered to a mammal, particularly a human being, to treat uterine synechiae.

In some embodiments, pirfenidone is administered to a mammal, particularly a human being, to treat adhesion-related disorders. In some embodiments, pirfenidone is administered to a mammal, particularly a human being, to treat post-surgical adhesion. In some embodiments, pirfenidone is administered to a mammal, particularly a human being, to treat peritendinous adhesion. In some embodiments, pirfenidone is administered to a mammal, particularly a human being, to treat carpal tunnel surgery. In some embodiments, pirfenidone is administered to a mammal, particularly a human being, to treat intrauterine adhesion. In some embodiments, pirfenidone is administered to a mammal, particularly a human being, to treat frozen shoulder. In some embodiments, pirfenidone is administered to a mammal, particularly a human being, to treat adhesive capsulitis. In some embodiments, pirfenidone is administered to a mammal, particularly a human being, to treat chronic transplant rejection. In some embodiments, pirfenidone is administered to a mammal, particularly a human being, to treat fistula formation. In some embodiments, pirfenidone is administered to a mammal, particularly a human being, to treat Dupuytren's contracture. In some embodiments, pirfenidone is administered to a mammal, particularly a human being, to treat Grave's disease. In some embodiments, pirfenidone is administered to a mammal, particularly a human being, to treat Grave's hyperthyroidism. In some embodiments, pirfenidone is administered to a mammal, particularly a human being, to treat chronic graft versus host disease. In some embodiments, pirfenidone is administered to a mammal, particularly a human being, to treat Sjogren's syndrome. In some embodiments, pirfenidone is administered to a mammal, particularly a human being, to treat systemic sclerosis. In some embodiments, pirfenidone is administered to a mammal, particularly a human being, to treat systemic scleroderma.

In some embodiments, riociguat is administered to a mammal, particularly a human being, to treat a dermal-related disorder. In some embodiments, riociguat is administered to a mammal, particularly a human being, to treat a scar. In some embodiments, riociguat is administered to a mammal, particularly a human being, to treat a skin scar. In some embodiments, riociguat is administered to a mammal, particularly a human being, to treat a wrinkle. In some embodiments, riociguat is administered to a mammal, particularly a human being, to treat cellulite. In some embodiments, riociguat is administered to a mammal, particularly a human being, to treat dermal neoplastic fibrosis. In some embodiments, riociguat is administered to a mammal, particularly a human being, to treat scarring alopecia. In some embodiments, riociguat is administered to a mammal, particularly a human being, to treat vasculopathy. In some embodiments, riociguat is administered to a mammal, particularly a human being, to treat vasculitis. In some embodiments, riociguat is administered to a mammal, particularly a human being, for wound healing. In some embodiments, riociguat is administered to a mammal, particularly a human being, for exuberant burn wound healing. In some embodiments, riociguat is administered to a mammal, particularly a human being, to treat diabetic foot syndrome. In some embodiments, riociguat is administered to a mammal, particularly a human being, to treat scleroderma. In some embodiments, riociguat is administered to a mammal, particularly a human being, to treat arthrofibrosis. In some embodiments, riociguat is administered to a mammal, particularly a human being, to treat Peyronie's disease. In some embodiments, riociguat is administered to a mammal, particularly a human being, to treat Dupuytren's contracture. In some embodiments, riociguat is administered to a mammal, particularly a human being, to treat adhesive capsulitis. In some embodiments, riociguat is administered to a mammal, particularly a human being, to treat non-melanoma skin cancers. In some embodiments, riociguat is administered to a mammal, particularly a human being, to treat melanoma. In some embodiments, riociguat is administered to a mammal, particularly a human being, to treat actinic keratosis. In some embodiments, riociguat is administered to a mammal, particularly a human being, to treat basal cell carcinoma. In some embodiments, riociguat is administered to a mammal, particularly a human being, to treat squamous-cell carcinoma.

In some embodiments, riociguat is administered to a mammal, particularly a human being, to treat benign prostate hyperplasia and/or its associated lower urinary tract symptoms. In some embodiments, riociguat is administered to a mammal, particularly a human being, to treat fibrosis of ureters and/or of renal pelvis. In some embodiments, riociguat is administered to a mammal, particularly a human being, to treat prostate adenoma. In some embodiments, riociguat is administered to a mammal, particularly a human being, to treat to treat prostatic intraepithelial neoplasia.

In some embodiments, riociguat is administered to a mammal, particularly a human being, to treat an eye-related disorder. In some embodiments, riociguat is administered to a mammal, particularly a human being, to treat uveitis. In some embodiments, riociguat is administered to a mammal, particularly a human being, to treat corneal transparency. In some embodiments, riociguat is administered to a mammal, particularly a human being, to treat corneal scar formation. In some embodiments, riociguat is administered to a mammal, particularly a human being, to treat secondary cataract formation. In some embodiments, riociguat is administered to a mammal, particularly a human being, in conjunction with glaucoma filtration surgery. In some embodiments, riociguat is administered to a mammal, particularly a human being, to treat ocular surgical procedures and implants. In some embodiments, riociguat is administered to a mammal, particularly a human being, in conjunction with photorefractive keratectomy. In some embodiments, riociguat is administered to a mammal, particularly a human being, in conjunction with laser in situ keratomileusis. In some embodiments, riociguat is administered to a mammal, particularly a human being, to treat formation and contraction of pre- and epiretinal membranes. In some embodiments, riociguat is administered to a mammal, particularly a human being, to treat proliferative vitreoretinopathy. In some embodiments, riociguat is administered to a mammal, particularly a human being, to treat proliferative diabetic retinopathy. In some embodiments, riociguat is administered to a mammal, particularly a human being, to treat diabetic macular edema. In some embodiments, riociguat is administered to a mammal, particularly a human being, to treat subretinal fibrosis/scarring. In some embodiments, riociguat is administered to a mammal, particularly a human being, to treat retinal gliosis. In some embodiments, riociguat is administered to a mammal, particularly a human being, to treat and formation of choroidal membranes. In some embodiments, riociguat is administered to a mammal, particularly a human being, to treat wet age-related macular degeneration. In some embodiments, riociguat is administered to a mammal, particularly a human being, to treat atrophic or dry age-related macular degeneration. In some embodiments, riociguat is administered to a mammal, particularly a human being, to treat retinal vein occlusion.

In some embodiments, riociguat is administered to a mammal, particularly a human being, to treat rosacea. In some embodiments, riociguat is administered to a mammal, particularly a human being, to treat psoriasis. In some embodiments, riociguat is administered to a mammal, particularly a human being, to treat erythema multiforme. In some embodiments, riociguat is administered to a mammal, particularly a human being, to treat bullous pemphigoid. In some embodiments, riociguat is administered to a mammal, particularly a human being, to treat hereditary hemorrhagic telangiectasia. In some embodiments, riociguat is administered to a mammal, particularly a human being, to treat rheumatoid arthritis. In some embodiments, riociguat is administered to a mammal, particularly a human being, to treat atopic dermatitis. In some embodiments, riociguat is administered to a mammal, particularly a human being, for dermal wound healing.

In some embodiments, riociguat is administered to a mammal, particularly a human being, to treat uterine fibroids. In some embodiments, riociguat is administered to a mammal, particularly a human being, to treat a uterine myoma. In some embodiments, riociguat is administered to a mammal, particularly a human being, to treat a uterine parasitic myoma. In some embodiments, riociguat is administered to a mammal, particularly a human being, to treat primary sclerosing cholangitis. In some embodiments, riociguat is administered to a mammal, particularly a human being, for intra uterine surgery. In some embodiments, riociguat is administered to a mammal, particularly a human being, to treat intra uterine synechiae. In some embodiments, riociguat is administered to a mammal, particularly a human being, to treat Asherman's syndrome. In some embodiments, riociguat is administered to a mammal, particularly a human being, to treat intrauterine adhesions. In some embodiments, riociguat is administered to a mammal, particularly a human being, to treat intrauterine synechiae. In some embodiments, riociguat is administered to a mammal, particularly a human being, to treat biliary duct fibrosis. In some embodiments, riociguat is administered to a mammal, particularly a human being, to treat biliary duct sclerosis. In some embodiments, riociguat is administered to a mammal, particularly a human being, to treat primary biliary cirrhosis. In some embodiments, riociguat is administered to a mammal, particularly a human being, to treat fibrosis of ureters and/or renal pelvis. In some embodiments, riociguat is administered to a mammal, particularly a human being, to treat retroperitoneal fibrosis. In some embodiments, riociguat is administered to a mammal, particularly a human being, to treat adenomyosis. In some embodiments, riociguat is administered to a mammal, particularly a human being, to treat uterine fibromyoma. In some embodiments, riociguat is administered to a mammal, particularly a human being, to treat uterine fibroleiomyoma. In some embodiments, riociguat is administered to a mammal, particularly a human being, to treat intrauterine adhesions. In some embodiments, riociguat is administered to a mammal, particularly a human being, to treat intrauterine synachiae. In some embodiments, riociguat is administered to a mammal, particularly a human being, to treat uterine fibroma, intramural fibroids. In some embodiments, riociguat is administered to a mammal, particularly a human being, to treat subserosal fibroids. In some embodiments, riociguat is administered to a mammal, particularly a human being, to treat submucosal fibroids. In some embodiments, riociguat is administered to a mammal, particularly a human being, to treat pedunculated fibroids. In some embodiments, riociguat is administered to a mammal, particularly a human being, to treat uterine leiomyomas. In some embodiments, riociguat is administered to a mammal, particularly a human being, to treat cervical fibroids. In some embodiments, riociguat is administered to a mammal, particularly a human being, to treat uterine synechiae.

In some embodiments, riociguat is administered to a mammal, particularly a human being, to treat adhesion-related disorders. In some embodiments, riociguat is administered to a mammal, particularly a human being, to treat post-surgical adhesion. In some embodiments, riociguat is administered to a mammal, particularly a human being, to treat peritendinous adhesion. In some embodiments, riociguat is administered to a mammal, particularly a human being, to treat carpal tunnel surgery. In some embodiments, riociguat is administered to a mammal, particularly a human being, to treat intrauterine adhesion. In some embodiments, riociguat is administered to a mammal, particularly a human being, to treat frozen shoulder. In some embodiments, riociguat is administered to a mammal, particularly a human being, to treat adhesive capsulitis. In some embodiments, riociguat is administered to a mammal, particularly a human being, to treat chronic transplant rejection. In some embodiments, riociguat is administered to a mammal, particularly a human being, to treat fistula formation. In some embodiments, riociguat is administered to a mammal, particularly a human being, to treat Dupuytren's contracture. In some embodiments, riociguat is administered to a mammal, particularly a human being, to treat Grave's disease. In some embodiments, riociguat is administered to a mammal, particularly a human being, to treat Grave's hyperthyroidism. In some embodiments, riociguat is administered to a mammal, particularly a human being, to treat chronic graft versus host disease. In some embodiments, riociguat is administered to a mammal, particularly a human being, to treat Sjogren's syndrome. In some embodiments, riociguat is administered to a mammal, particularly a human being, to treat systemic sclerosis. In some embodiments, riociguat is administered to a mammal, particularly a human being, to treat systemic scleroderma.

In some embodiments, sorafenib is administered to a mammal, particularly a human being, to treat a dermal-related disorder. In some embodiments, sorafenib is administered to a mammal, particularly a human being, to treat a scar. In some embodiments, sorafenib is administered to a mammal, particularly a human being, to treat a skin scar. In some embodiments, sorafenib is administered to a mammal, particularly a human being, to treat a wrinkle. In some embodiments, sorafenib is administered to a mammal, particularly a human being, to treat cellulite. In some embodiments, sorafenib is administered to a mammal, particularly a human being, to treat dermal neoplastic fibrosis. In some embodiments, sorafenib is administered to a mammal, particularly a human being, to treat scarring alopecia. In some embodiments, sorafenib is administered to a mammal, particularly a human being, to treat vasculopathy. In some embodiments, sorafenib is administered to a mammal, particularly a human being, to treat vasculitis. In some embodiments, sorafenib is administered to a mammal, particularly a human being, for wound healing. In some embodiments, sorafenib is administered to a mammal, particularly a human being, for exuberant burn wound healing. In some embodiments, sorafenib is administered to a mammal, particularly a human being, to treat diabetic foot syndrome. In some embodiments, sorafenib is administered to a mammal, particularly a human being, to treat scleroderma. In some embodiments, sorafenib is administered to a mammal, particularly a human being, to treat arthrofibrosis. In some embodiments, sorafenib is administered to a mammal, particularly a human being, to treat Peyronie's disease. In some embodiments, sorafenib is administered to a mammal, particularly a human being, to treat Dupuytren's contracture. In some embodiments, sorafenib is administered to a mammal, particularly a human being, to treat adhesive capsulitis. In some embodiments, sorafenib is administered to a mammal, particularly a human being, to treat non-melanoma skin cancers. In some embodiments, sorafenib is administered to a mammal, particularly a human being, to treat melanoma. In some embodiments, sorafenib is administered to a mammal, particularly a human being, to treat actinic keratosis. In some embodiments, sorafenib is administered to a mammal, particularly a human being, to treat basal cell carcinoma. In some embodiments, sorafenib is administered to a mammal, particularly a human being, to treat squamous-cell carcinoma.

In some embodiments, sorafenib is administered to a mammal, particularly a human being, to treat benign prostate hyperplasia and/or its associated lower urinary tract symptoms. In some embodiments, sorafenib is administered to a mammal, particularly a human being, to treat fibrosis of ureters and/or of renal pelvis. In some embodiments, sorafenib is administered to a mammal, particularly a human being, to treat prostate adenoma. In some embodiments, sorafenib is administered to a mammal, particularly a human being, to treat to treat prostatic intraepithelial neoplasia.

In some embodiments, sorafenib is administered to a mammal, particularly a human being, to treat an eye-related disorder. In some embodiments, sorafenib is administered to a mammal, particularly a human being, to treat uveitis. In some embodiments, sorafenib is administered to a mammal, particularly a human being, to treat corneal transparency. In some embodiments, sorafenib is administered to a mammal, particularly a human being, to treat corneal scar formation. In some embodiments, sorafenib is administered to a mammal, particularly a human being, to treat secondary cataract formation. In some embodiments, sorafenib is administered to a mammal, particularly a human being, in conjunction with glaucoma filtration surgery. In some embodiments, sorafenib is administered to a mammal, particularly a human being, to treat ocular surgical procedures and implants. In some embodiments, sorafenib is administered to a mammal, particularly a human being, in conjunction with photorefractive keratectomy. In some embodiments, sorafenib is administered to a mammal, particularly a human being, in conjunction with laser in situ keratomileusis. In some embodiments, sorafenib is administered to a mammal, particularly a human being, to treat formation and contraction of pre- and epiretinal membranes. In some embodiments, sorafenib is administered to a mammal, particularly a human being, to treat proliferative vitreoretinopathy. In some embodiments, sorafenib is administered to a mammal, particularly a human being, to treat proliferative diabetic retinopathy. In some embodiments, sorafenib is administered to a mammal, particularly a human being, to treat diabetic macular edema. In some embodiments, sorafenib is administered to a mammal, particularly a human being, to treat subretinal fibrosis/scarring. In some embodiments, sorafenib is administered to a mammal, particularly a human being, to treat retinal gliosis. In some embodiments, sorafenib is administered to a mammal, particularly a human being, to treat and formation of choroidal membranes. In some embodiments, sorafenib is administered to a mammal, particularly a human being, to treat wet age-related macular degeneration. In some embodiments, sorafenib is administered to a mammal, particularly a human being, to treat atrophic or dry age-related macular degeneration. In some embodiments, sorafenib is administered to a mammal, particularly a human being, to treat retinal vein occlusion.

In some embodiments, sorafenib is administered to a mammal, particularly a human being, to treat rosacea. In some embodiments, sorafenib is administered to a mammal, particularly a human being, to treat psoriasis. In some embodiments, sorafenib is administered to a mammal, particularly a human being, to treat erythema multiforme. In some embodiments, sorafenib is administered to a mammal, particularly a human being, to treat bullous pemphigoid. In some embodiments, sorafenib is administered to a mammal, particularly a human being, to treat hereditary hemorrhagic telangiectasia. In some embodiments, sorafenib is administered to a mammal, particularly a human being, to treat rheumatoid arthritis. In some embodiments, sorafenib is administered to a mammal, particularly a human being, to treat atopic dermatitis. In some embodiments, sorafenib is administered to a mammal, particularly a human being, for dermal wound healing.

In some embodiments, sorafenib is administered to a mammal, particularly a human being, to treat uterine fibroids. In some embodiments, sorafenib is administered to a mammal, particularly a human being, to treat a uterine myoma. In some embodiments, sorafenib is administered to a mammal, particularly a human being, to treat a uterine parasitic myoma. In some embodiments, sorafenib is administered to a mammal, particularly a human being, to treat primary sclerosing cholangitis. In some embodiments, sorafenib is administered to a mammal, particularly a human being, for intra uterine surgery. In some embodiments, sorafenib is administered to a mammal, particularly a human being, to treat intra uterine synechiae. In some embodiments, sorafenib is administered to a mammal, particularly a human being, to treat Asherman's syndrome. In some embodiments, sorafenib is administered to a mammal, particularly a human being, to treat intrauterine adhesions. In some embodiments, sorafenib is administered to a mammal, particularly a human being, to treat intrauterine synechiae. In some embodiments, sorafenib is administered to a mammal, particularly a human being, to treat biliary duct fibrosis. In some embodiments, sorafenib is administered to a mammal, particularly a human being, to treat biliary duct sclerosis. In some embodiments, sorafenib is administered to a mammal, particularly a human being, to treat primary biliary cirrhosis. In some embodiments, sorafenib is administered to a mammal, particularly a human being, to treat fibrosis of ureters and/or renal pelvis. In some embodiments, sorafenib is administered to a mammal, particularly a human being, to treat retroperitoneal fibrosis. In some embodiments, sorafenib is administered to a mammal, particularly a human being, to treat adenomyosis. In some embodiments, sorafenib is administered to a mammal, particularly a human being, to treat uterine fibromyoma. In some embodiments, sorafenib is administered to a mammal, particularly a human being, to treat uterine fibroleiomyoma. In some embodiments, sorafenib is administered to a mammal, particularly a human being, to treat intrauterine adhesions. In some embodiments, sorafenib is administered to a mammal, particularly a human being, to treat intrauterine synachiae. In some embodiments, sorafenib is administered to a mammal, particularly a human being, to treat uterine fibroma, intramural fibroids. In some embodiments, sorafenib is administered to a mammal, particularly a human being, to treat subserosal fibroids. In some embodiments, sorafenib is administered to a mammal, particularly a human being, to treat submucosal fibroids. In some embodiments, sorafenib is administered to a mammal, particularly a human being, to treat pedunculated fibroids. In some embodiments, sorafenib is administered to a mammal, particularly a human being, to treat uterine leiomyomas. In some embodiments, sorafenib is administered to a mammal, particularly a human being, to treat cervical fibroids. In some embodiments, sorafenib is administered to a mammal, particularly a human being, to treat uterine synechiae.

In some embodiments, sorafenib is administered to a mammal, particularly a human being, to treat adhesion-related disorders. In some embodiments, sorafenib is administered to a mammal, particularly a human being, to treat post-surgical adhesion. In some embodiments, sorafenib is administered to a mammal, particularly a human being, to treat peritendinous adhesion. In some embodiments, sorafenib is administered to a mammal, particularly a human being, to treat carpal tunnel surgery. In some embodiments, sorafenib is administered to a mammal, particularly a human being, to treat intrauterine adhesion. In some embodiments, sorafenib is administered to a mammal, particularly a human being, to treat frozen shoulder. In some embodiments, sorafenib is administered to a mammal, particularly a human being, to treat adhesive capsulitis. In some embodiments, sorafenib is administered to a mammal, particularly a human being, to treat chronic transplant rejection. In some embodiments, sorafenib is administered to a mammal, particularly a human being, to treat fistula formation. In some embodiments, sorafenib is administered to a mammal, particularly a human being, to treat Dupuytren's contracture. In some embodiments, sorafenib is administered to a mammal, particularly a human being, to treat Grave's disease. In some embodiments, sorafenib is administered to a mammal, particularly a human being, to treat Grave's hyperthyroidism. In some embodiments, sorafenib is administered to a mammal, particularly a human being, to treat chronic graft versus host disease. In some embodiments, sorafenib is administered to a mammal, particularly a human being, to treat Sjogren's syndrome. In some embodiments, sorafenib is administered to a mammal, particularly a human being, to treat systemic sclerosis. In some embodiments, sorafenib is administered to a mammal, particularly a human being, to treat systemic scleroderma.

In some embodiments, sunitinib is administered to a mammal, particularly a human being, to treat a dermal-related disorder. In some embodiments, sunitinib is administered to a mammal, particularly a human being, to treat a scar. In some embodiments, sunitinib is administered to a mammal, particularly a human being, to treat a skin scar. In some embodiments, sunitinib is administered to a mammal, particularly a human being, to treat a wrinkle. In some embodiments, sunitinib is administered to a mammal, particularly a human being, to treat cellulite. In some embodiments, sunitinib is administered to a mammal, particularly a human being, to treat dermal neoplastic fibrosis. In some embodiments, sunitinib is administered to a mammal, particularly a human being, to treat scarring alopecia. In some embodiments, sunitinib is administered to a mammal, particularly a human being, to treat vasculopathy. In some embodiments, sunitinib is administered to a mammal, particularly a human being, to treat vasculitis. In some embodiments, sunitinib is administered to a mammal, particularly a human being, for wound healing. In some embodiments, sunitinib is administered to a mammal, particularly a human being, for exuberant burn wound healing. In some embodiments, sunitinib is administered to a mammal, particularly a human being, to treat diabetic foot syndrome. In some embodiments, sunitinib is administered to a mammal, particularly a human being, to treat scleroderma. In some embodiments, sunitinib is administered to a mammal, particularly a human being, to treat arthrofibrosis. In some embodiments, sunitinib is administered to a mammal, particularly a human being, to treat Peyronie's disease. In some embodiments, sunitinib is administered to a mammal, particularly a human being, to treat Dupuytren's contracture. In some embodiments, sunitinib is administered to a mammal, particularly a human being, to treat adhesive capsulitis. In some embodiments, sunitinib is administered to a mammal, particularly a human being, to treat non-melanoma skin cancers. In some embodiments, sunitinib is administered to a mammal, particularly a human being, to treat melanoma. In some embodiments, sunitinib is administered to a mammal, particularly a human being, to treat actinic keratosis. In some embodiments, sunitinib is administered to a mammal, particularly a human being, to treat basal cell carcinoma. In some embodiments, sunitinib is administered to a mammal, particularly a human being, to treat squamous-cell carcinoma.

In some embodiments, sunitinib is administered to a mammal, particularly a human being, to treat benign prostate hyperplasia and/or its associated lower urinary tract symptoms. In some embodiments, sunitinib is administered to a mammal, particularly a human being, to treat fibrosis of ureters and/or of renal pelvis. In some embodiments, sunitinib is administered to a mammal, particularly a human being, to treat prostate adenoma. In some embodiments, sunitinib is administered to a mammal, particularly a human being, to treat to treat prostatic intraepithelial neoplasia.

In some embodiments, sunitinib is administered to a mammal, particularly a human being, to treat an eye-related disorder. In some embodiments, sunitinib is administered to a mammal, particularly a human being, to treat uveitis. In some embodiments, sunitinib is administered to a mammal, particularly a human being, to treat corneal transparency. In some embodiments, sunitinib is administered to a mammal, particularly a human being, to treat corneal scar formation. In some embodiments, sunitinib is administered to a mammal, particularly a human being, to treat secondary cataract formation. In some embodiments, sunitinib is administered to a mammal, particularly a human being, in conjunction with glaucoma filtration surgery. In some embodiments, sunitinib is administered to a mammal, particularly a human being, to treat ocular surgical procedures and implants. In some embodiments, sunitinib is administered to a mammal, particularly a human being, in conjunction with photorefractive keratectomy. In some embodiments, sunitinib is administered to a mammal, particularly a human being, in conjunction with laser in situ keratomileusis. In some embodiments, sunitinib is administered to a mammal, particularly a human being, to treat formation and contraction of pre- and epiretinal membranes. In some embodiments, sunitinib is administered to a mammal, particularly a human being, to treat proliferative vitreoretinopathy. In some embodiments, sunitinib is administered to a mammal, particularly a human being, to treat proliferative diabetic retinopathy. In some embodiments, sunitinib is administered to a mammal, particularly a human being, to treat diabetic macular edema. In some embodiments, sunitinib is administered to a mammal, particularly a human being, to treat subretinal fibrosis/scarring. In some embodiments, sunitinib is administered to a mammal, particularly a human being, to treat retinal gliosis. In some embodiments, sunitinib is administered to a mammal, particularly a human being, to treat and formation of choroidal membranes. In some embodiments, sunitinib is administered to a mammal, particularly a human being, to treat wet age-related macular degeneration. In some embodiments, sunitinib is administered to a mammal, particularly a human being, to treat atrophic or dry age-related macular degeneration. In some embodiments, sunitinib is administered to a mammal, particularly a human being, to treat retinal vein occlusion.

In some embodiments, sunitinib is administered to a mammal, particularly a human being, to treat rosacea. In some embodiments, sunitinib is administered to a mammal, particularly a human being, to treat psoriasis. In some embodiments, sunitinib is administered to a mammal, particularly a human being, to treat erythema multiforme. In some embodiments, sunitinib is administered to a mammal, particularly a human being, to treat bullous pemphigoid. In some embodiments, sunitinib is administered to a mammal, particularly a human being, to treat hereditary hemorrhagic telangiectasia. In some embodiments, sunitinib is administered to a mammal, particularly a human being, to treat rheumatoid arthritis. In some embodiments, sunitinib is administered to a mammal, particularly a human being, to treat atopic dermatitis. In some embodiments, sunitinib is administered to a mammal, particularly a human being, for dermal wound healing.

In some embodiments, sunitinib is administered to a mammal, particularly a human being, to treat uterine fibroids. In some embodiments, sunitinib is administered to a mammal, particularly a human being, to treat a uterine myoma. In some embodiments, sunitinib is administered to a mammal, particularly a human being, to treat a uterine parasitic myoma. In some embodiments, sunitinib is administered to a mammal, particularly a human being, to treat primary sclerosing cholangitis. In some embodiments, sunitinib is administered to a mammal, particularly a human being, for intra uterine surgery. In some embodiments, sunitinib is administered to a mammal, particularly a human being, to treat intra uterine synechiae. In some embodiments, sunitinib is administered to a mammal, particularly a human being, to treat Asherman's syndrome. In some embodiments, sunitinib is administered to a mammal, particularly a human being, to treat intrauterine adhesions. In some embodiments, sunitinib is administered to a mammal, particularly a human being, to treat intrauterine synechiae. In some embodiments, sunitinib is administered to a mammal, particularly a human being, to treat biliary duct fibrosis. In some embodiments, sunitinib is administered to a mammal, particularly a human being, to treat biliary duct sclerosis. In some embodiments, sunitinib is administered to a mammal, particularly a human being, to treat primary biliary cirrhosis. In some embodiments, sunitinib is administered to a mammal, particularly a human being, to treat fibrosis of ureters and/or renal pelvis. In some embodiments, sunitinib is administered to a mammal, particularly a human being, to treat retroperitoneal fibrosis. In some embodiments, sunitinib is administered to a mammal, particularly a human being, to treat adenomyosis. In some embodiments, sunitinib is administered to a mammal, particularly a human being, to treat uterine fibromyoma. In some embodiments, sunitinib is administered to a mammal, particularly a human being, to treat uterine fibroleiomyoma. In some embodiments, sunitinib is administered to a mammal, particularly a human being, to treat intrauterine adhesions. In some embodiments, sunitinib is administered to a mammal, particularly a human being, to treat intrauterine synachiae. In some embodiments, sunitinib is administered to a mammal, particularly a human being, to treat uterine fibroma, intramural fibroids. In some embodiments, sunitinib is administered to a mammal, particularly a human being, to treat subserosal fibroids. In some embodiments, sunitinib is administered to a mammal, particularly a human being, to treat submucosal fibroids. In some embodiments, sunitinib is administered to a mammal, particularly a human being, to treat pedunculated fibroids. In some embodiments, sunitinib is administered to a mammal, particularly a human being, to treat uterine leiomyomas. In some embodiments, sunitinib is administered to a mammal, particularly a human being, to treat cervical fibroids. In some embodiments, sunitinib is administered to a mammal, particularly a human being, to treat uterine synechiae.

In some embodiments, sunitinib is administered to a mammal, particularly a human being, to treat adhesion-related disorders. In some embodiments, sunitinib is administered to a mammal, particularly a human being, to treat post-surgical adhesion. In some embodiments, sunitinib is administered to a mammal, particularly a human being, to treat peritendinous adhesion. In some embodiments, sunitinib is administered to a mammal, particularly a human being, to treat carpal tunnel surgery. In some embodiments, sunitinib is administered to a mammal, particularly a human being, to treat intrauterine adhesion. In some embodiments, sunitinib is administered to a mammal, particularly a human being, to treat frozen shoulder. In some embodiments, sunitinib is administered to a mammal, particularly a human being, to treat adhesive capsulitis. In some embodiments, sunitinib is administered to a mammal, particularly a human being, to treat chronic transplant rejection. In some embodiments, sunitinib is administered to a mammal, particularly a human being, to treat fistula formation. In some embodiments, sunitinib is administered to a mammal, particularly a human being, to treat Dupuytren's contracture. In some embodiments, sunitinib is administered to a mammal, particularly a human being, to treat Grave's disease. In some embodiments, sunitinib is administered to a mammal, particularly a human being, to treat Grave's hyperthyroidism. In some embodiments, sunitinib is administered to a mammal, particularly a human being, to treat chronic graft versus host disease. In some embodiments, sunitinib is administered to a mammal, particularly a human being, to treat Sjogren's syndrome. In some embodiments, sunitinib is administered to a mammal, particularly a human being, to treat systemic sclerosis. In some embodiments, sunitinib is administered to a mammal, particularly a human being, to treat systemic scleroderma.

In some embodiments, lenvatinib is administered to a mammal, particularly a human being, to treat a dermal-related disorder. In some embodiments, lenvatinib is administered to a mammal, particularly a human being, to treat a scar. In some embodiments, lenvatinib is administered to a mammal, particularly a human being, to treat a skin scar. In some embodiments, lenvatinib is administered to a mammal, particularly a human being, to treat a wrinkle. In some embodiments, lenvatinib is administered to a mammal, particularly a human being, to treat cellulite. In some embodiments, lenvatinib is administered to a mammal, particularly a human being, to treat dermal neoplastic fibrosis. In some embodiments, lenvatinib is administered to a mammal, particularly a human being, to treat scarring alopecia. In some embodiments, lenvatinib is administered to a mammal, particularly a human being, to treat vasculopathy. In some embodiments, lenvatinib is administered to a mammal, particularly a human being, to treat vasculitis. In some embodiments, lenvatinib is administered to a mammal, particularly a human being, for wound healing. In some embodiments, lenvatinib is administered to a mammal, particularly a human being, for exuberant burn wound healing. In some embodiments, lenvatinib is administered to a mammal, particularly a human being, to treat diabetic foot syndrome. In some embodiments, lenvatinib is administered to a mammal, particularly a human being, to treat scleroderma. In some embodiments, lenvatinib is administered to a mammal, particularly a human being, to treat arthrofibrosis. In some embodiments, lenvatinib is administered to a mammal, particularly a human being, to treat Peyronie's disease. In some embodiments, lenvatinib is administered to a mammal, particularly a human being, to treat Dupuytren's contracture. In some embodiments, lenvatinib is administered to a mammal, particularly a human being, to treat adhesive capsulitis. In some embodiments, lenvatinib is administered to a mammal, particularly a human being, to treat non-melanoma skin cancers. In some embodiments, lenvatinib is administered to a mammal, particularly a human being, to treat melanoma. In some embodiments, lenvatinib is administered to a mammal, particularly a human being, to treat actinic keratosis. In some embodiments, lenvatinib is administered to a mammal, particularly a human being, to treat basal cell carcinoma. In some embodiments, lenvatinib is administered to a mammal, particularly a human being, to treat squamous-cell carcinoma.

In some embodiments, lenvatinib is administered to a mammal, particularly a human being, to treat benign prostate hyperplasia and/or its associated lower urinary tract symptoms. In some embodiments, lenvatinib is administered to a mammal, particularly a human being, to treat fibrosis of ureters and/or of renal pelvis. In some embodiments, lenvatinib is administered to a mammal, particularly a human being, to treat prostate adenoma. In some embodiments, lenvatinib is administered to a mammal, particularly a human being, to treat to treat prostatic intraepithelial neoplasia.

In some embodiments, lenvatinib is administered to a mammal, particularly a human being, to treat an eye-related disorder. In some embodiments, lenvatinib is administered to a mammal, particularly a human being, to treat uveitis. In some embodiments, lenvatinib is administered to a mammal, particularly a human being, to treat corneal transparency. In some embodiments, lenvatinib is administered to a mammal, particularly a human being, to treat corneal scar formation. In some embodiments, lenvatinib is administered to a mammal, particularly a human being, to treat secondary cataract formation. In some embodiments, lenvatinib is administered to a mammal, particularly a human being, in conjunction with glaucoma filtration surgery. In some embodiments, lenvatinib is administered to a mammal, particularly a human being, to treat ocular surgical procedures and implants. In some embodiments, lenvatinib is administered to a mammal, particularly a human being, in conjunction with photorefractive keratectomy. In some embodiments, lenvatinib is administered to a mammal, particularly a human being, in conjunction with laser in situ keratomileusis. In some embodiments, lenvatinib is administered to a mammal, particularly a human being, to treat formation and contraction of pre- and epiretinal membranes. In some embodiments, lenvatinib is administered to a mammal, particularly a human being, to treat proliferative vitreoretinopathy. In some embodiments, lenvatinib is administered to a mammal, particularly a human being, to treat proliferative diabetic retinopathy. In some embodiments, lenvatinib is administered to a mammal, particularly a human being, to treat diabetic macular edema. In some embodiments, lenvatinib is administered to a mammal, particularly a human being, to treat subretinal fibrosis/scarring. In some embodiments, lenvatinib is administered to a mammal, particularly a human being, to treat retinal gliosis. In some embodiments, lenvatinib is administered to a mammal, particularly a human being, to treat and formation of choroidal membranes. In some embodiments, lenvatinib is administered to a mammal, particularly a human being, to treat wet age-related macular degeneration. In some embodiments, lenvatinib is administered to a mammal, particularly a human being, to treat atrophic or dry age-related macular degeneration. In some embodiments, lenvatinib is administered to a mammal, particularly a human being, to treat retinal vein occlusion.

In some embodiments, lenvatinib is administered to a mammal, particularly a human being, to treat rosacea. In some embodiments, lenvatinib is administered to a mammal, particularly a human being, to treat psoriasis. In some embodiments, lenvatinib is administered to a mammal, particularly a human being, to treat erythema multiforme. In some embodiments, lenvatinib is administered to a mammal, particularly a human being, to treat bullous pemphigoid. In some embodiments, lenvatinib is administered to a mammal, particularly a human being, to treat hereditary hemorrhagic telangiectasia. In some embodiments, lenvatinib is administered to a mammal, particularly a human being, to treat rheumatoid arthritis. In some embodiments, lenvatinib is administered to a mammal, particularly a human being, to treat atopic dermatitis. In some embodiments, lenvatinib is administered to a mammal, particularly a human being, for dermal wound healing.

In some embodiments, lenvatinib is administered to a mammal, particularly a human being, to treat uterine fibroids. In some embodiments, lenvatinib is administered to a mammal, particularly a human being, to treat a uterine myoma. In some embodiments, lenvatinib is administered to a mammal, particularly a human being, to treat a uterine parasitic myoma. In some embodiments, lenvatinib is administered to a mammal, particularly a human being, to treat primary sclerosing cholangitis. In some embodiments, lenvatinib is administered to a mammal, particularly a human being, for intra uterine surgery. In some embodiments, lenvatinib is administered to a mammal, particularly a human being, to treat intra uterine synechiae. In some embodiments, lenvatinib is administered to a mammal, particularly a human being, to treat Asherman's syndrome. In some embodiments, lenvatinib is administered to a mammal, particularly a human being, to treat intrauterine adhesions. In some embodiments, lenvatinib is administered to a mammal, particularly a human being, to treat intrauterine synachiae. In some embodiments, lenvatinib is administered to a mammal, particularly a human being, to treat biliary duct fibrosis. In some embodiments, lenvatinib is administered to a mammal, particularly a human being, to treat biliary duct sclerosis. In some embodiments, lenvatinib is administered to a mammal, particularly a human being, to treat primary biliary cirrhosis. In some embodiments, lenvatinib is administered to a mammal, particularly a human being, to treat fibrosis of ureters and/or renal pelvis. In some embodiments, lenvatinib is administered to a mammal, particularly a human being, to treat retroperitoneal fibrosis. In some embodiments, lenvatinib is administered to a mammal, particularly a human being, to treat adenomyosis. In some embodiments, lenvatinib is administered to a mammal, particularly a human being, to treat uterine fibromyoma. In some embodiments, lenvatinib is administered to a mammal, particularly a human being, to treat uterine fibroleiomyoma. In some embodiments, lenvatinib is administered to a mammal, particularly a human being, to treat intrauterine adhesions. In some embodiments, lenvatinib is administered to a mammal, particularly a human being, to treat intrauterine synachiae. In some embodiments, lenvatinib is administered to a mammal, particularly a human being, to treat uterine fibroma, intramural fibroids. In some embodiments, lenvatinib is administered to a mammal, particularly a human being, to treat subserosal fibroids. In some embodiments, lenvatinib is administered to a mammal, particularly a human being, to treat submucosal fibroids. In some embodiments, lenvatinib is administered to a mammal, particularly a human being, to treat pedunculated fibroids. In some embodiments, lenvatinib is administered to a mammal, particularly a human being, to treat uterine leiomyomas. In some embodiments, lenvatinib is administered to a mammal, particularly a human being, to treat cervical fibroids. In some embodiments, lenvatinib is administered to a mammal, particularly a human being, to treat uterine synechiae.

In some embodiments, lenvatinib is administered to a mammal, particularly a human being, to treat adhesion-related disorders. In some embodiments, lenvatinib is administered to a mammal, particularly a human being, to treat post-surgical adhesion. In some embodiments, lenvatinib is administered to a mammal, particularly a human being, to treat peritendinous adhesion. In some embodiments, lenvatinib is administered to a mammal, particularly a human being, to treat carpal tunnel surgery. In some embodiments, lenvatinib is administered to a mammal, particularly a human being, to treat intrauterine adhesion. In some embodiments, lenvatinib is administered to a mammal, particularly a human being, to treat frozen shoulder. In some embodiments, lenvatinib is administered to a mammal, particularly a human being, to treat adhesive capsulitis. In some embodiments, lenvatinib is administered to a mammal, particularly a human being, to treat chronic transplant rejection. In some embodiments, lenvatinib is administered to a mammal, particularly a human being, to treat fistula formation. In some embodiments, lenvatinib is administered to a mammal, particularly a human being, to treat Dupuytren's contracture. In some embodiments, lenvatinib is administered to a mammal, particularly a human being, to treat Grave's disease. In some embodiments, lenvatinib is administered to a mammal, particularly a human being, to treat Grave's hyperthyroidism. In some embodiments, lenvatinib is administered to a mammal, particularly a human being, to treat chronic graft versus host disease. In some embodiments, lenvatinib is administered to a mammal, particularly a human being, to treat Sjogren's syndrome. In some embodiments, lenvatinib is administered to a mammal, particularly a human being, to treat systemic sclerosis. In some embodiments, lenvatinib is administered to a mammal, particularly a human being, to treat systemic scleroderma.

In some embodiments, regorafenib is administered to a mammal, particularly a human being, to treat a dermal-related disorder. In some embodiments, regorafenib is administered to a mammal, particularly a human being, to treat a scar. In some embodiments, regorafenib is administered to a mammal, particularly a human being, to treat a skin scar. In some embodiments, regorafenib is administered to a mammal, particularly a human being, to treat a wrinkle. In some embodiments, regorafenib is administered to a mammal, particularly a human being, to treat cellulite. In some embodiments, regorafenib is administered to a mammal, particularly a human being, to treat dermal neoplastic fibrosis. In some embodiments, regorafenib is administered to a mammal, particularly a human being, to treat scarring alopecia. In some embodiments, regorafenib is administered to a mammal, particularly a human being, to treat vasculopathy. In some embodiments, regorafenib is administered to a mammal, particularly a human being, to treat vasculitis. In some embodiments, regorafenib is administered to a mammal, particularly a human being, for wound healing. In some embodiments, regorafenib is administered to a mammal, particularly a human being, for exuberant burn wound healing. In some embodiments, regorafenib is administered to a mammal, particularly a human being, to treat diabetic foot syndrome. In some embodiments, regorafenib is administered to a mammal, particularly a human being, to treat scleroderma. In some embodiments, regorafenib is administered to a mammal, particularly a human being, to treat arthrofibrosis. In some embodiments, regorafenib is administered to a mammal, particularly a human being, to treat Peyronie's disease. In some embodiments, regorafenib is administered to a mammal, particularly a human being, to treat Dupuytren's contracture. In some embodiments, regorafenib is administered to a mammal, particularly a human being, to treat adhesive capsulitis. In some embodiments, regorafenib is administered to a mammal, particularly a human being, to treat non-melanoma skin cancers. In some embodiments, regorafenib is administered to a mammal, particularly a human being, to treat melanoma. In some embodiments, regorafenib is administered to a mammal, particularly a human being, to treat actinic keratosis. In some embodiments, regorafenib is administered to a mammal, particularly a human being, to treat basal cell carcinoma. In some embodiments, regorafenib is administered to a mammal, particularly a human being, to treat squamous-cell carcinoma.

In some embodiments, regorafenib is administered to a mammal, particularly a human being, to treat benign prostate hyperplasia and/or its associated lower urinary tract symptoms. In some embodiments, regorafenib is administered to a mammal, particularly a human being, to treat fibrosis of ureters and/or of renal pelvis. In some embodiments, regorafenib is administered to a mammal, particularly a human being, to treat prostate adenoma. In some embodiments, regorafenib is administered to a mammal, particularly a human being, to treat to treat prostatic intraepithelial neoplasia.

In some embodiments, regorafenib is administered to a mammal, particularly a human being, to treat an eye-related disorder. In some embodiments, regorafenib is administered to a mammal, particularly a human being, to treat uveitis. In some embodiments, regorafenib is administered to a mammal, particularly a human being, to treat corneal transparency. In some embodiments, regorafenib is administered to a mammal, particularly a human being, to treat corneal scar formation. In some embodiments, regorafenib is administered to a mammal, particularly a human being, to treat secondary cataract formation. In some embodiments, regorafenib is administered to a mammal, particularly a human being, in conjunction with glaucoma filtration surgery. In some embodiments, regorafenib is administered to a mammal, particularly a human being, to treat ocular surgical procedures and implants. In some embodiments, regorafenib is administered to a mammal, particularly a human being, in conjunction with photorefractive keratectomy. In some embodiments, regorafenib is administered to a mammal, particularly a human being, in conjunction with laser in situ keratomileusis. In some embodiments, regorafenib is administered to a mammal, particularly a human being, to treat formation and contraction of pre- and epiretinal membranes. In some embodiments, regorafenib is administered to a mammal, particularly a human being, to treat proliferative vitreoretinopathy. In some embodiments, regorafenib is administered to a mammal, particularly a human being, to treat proliferative diabetic retinopathy. In some embodiments, regorafenib is administered to a mammal, particularly a human being, to treat diabetic macular edema. In some embodiments, regorafenib is administered to a mammal, particularly a human being, to treat subretinal fibrosis/scarring. In some embodiments, regorafenib is administered to a mammal, particularly a human being, to treat retinal gliosis. In some embodiments, regorafenib is administered to a mammal, particularly a human being, to treat and formation of choroidal membranes. In some embodiments, regorafenib is administered to a mammal, particularly a human being, to treat wet age-related macular degeneration. In some embodiments, regorafenib is administered to a mammal, particularly a human being, to treat atrophic or dry age-related macular degeneration. In some embodiments, regorafenib is administered to a mammal, particularly a human being, to treat retinal vein occlusion.

In some embodiments, regorafenib is administered to a mammal, particularly a human being, to treat rosacea. In some embodiments, regorafenib is administered to a mammal, particularly a human being, to treat psoriasis. In some embodiments, regorafenib is administered to a mammal, particularly a human being, to treat erythema multiforme. In some embodiments, regorafenib is administered to a mammal, particularly a human being, to treat bullous pemphigoid. In some embodiments, regorafenib is administered to a mammal, particularly a human being, to treat hereditary hemorrhagic telangiectasia. In some embodiments, regorafenib is administered to a mammal, particularly a human being, to treat rheumatoid arthritis. In some embodiments, regorafenib is administered to a mammal, particularly a human being, to treat atopic dermatitis. In some embodiments, regorafenib is administered to a mammal, particularly a human being, for dermal wound healing.

In some embodiments, regorafenib is administered to a mammal, particularly a human being, to treat uterine fibroids. In some embodiments, regorafenib is administered to a mammal, particularly a human being, to treat a uterine myoma. In some embodiments, regorafenib is administered to a mammal, particularly a human being, to treat a uterine parasitic myoma. In some embodiments, regorafenib is administered to a mammal, particularly a human being, to treat primary sclerosing cholangitis. In some embodiments, regorafenib is administered to a mammal, particularly a human being, for intra uterine surgery. In some embodiments, regorafenib is administered to a mammal, particularly a human being, to treat intra uterine synechiae. In some embodiments, regorafenib is administered to a mammal, particularly a human being, to treat Asherman's syndrome. In some embodiments, regorafenib is administered to a mammal, particularly a human being, to treat intrauterine adhesions. In some embodiments, regorafenib is administered to a mammal, particularly a human being, to treat intrauterine synechiae. In some embodiments, regorafenib is administered to a mammal, particularly a human being, to treat biliary duct fibrosis. In some embodiments, regorafenib is administered to a mammal, particularly a human being, to treat biliary duct sclerosis. In some embodiments, regorafenib is administered to a mammal, particularly a human being, to treat primary biliary cirrhosis. In some embodiments, regorafenib is administered to a mammal, particularly a human being, to treat fibrosis of ureters and/or renal pelvis. In some embodiments, regorafenib is administered to a mammal, particularly a human being, to treat retroperitoneal fibrosis. In some embodiments, regorafenib is administered to a mammal, particularly a human being, to treat adenomyosis. In some embodiments, regorafenib is administered to a mammal, particularly a human being, to treat uterine fibromyoma. In some embodiments, regorafenib is administered to a mammal, particularly a human being, to treat uterine fibroleiomyoma. In some embodiments, regorafenib is administered to a mammal, particularly a human being, to treat intrauterine adhesions. In some embodiments, regorafenib is administered to a mammal, particularly a human being, to treat intrauterine synachiae. In some embodiments, regorafenib is administered to a mammal, particularly a human being, to treat uterine fibroma, intramural fibroids. In some embodiments, regorafenib is administered to a mammal, particularly a human being, to treat subserosal fibroids. In some embodiments, regorafenib is administered to a mammal, particularly a human being, to treat submucosal fibroids. In some embodiments, regorafenib is administered to a mammal, particularly a human being, to treat pedunculated fibroids. In some embodiments, regorafenib is administered to a mammal, particularly a human being, to treat uterine leiomyomas. In some embodiments, regorafenib is administered to a mammal, particularly a human being, to treat cervical fibroids. In some embodiments, regorafenib is administered to a mammal, particularly a human being, to treat uterine synechiae.

In some embodiments, regorafenib is administered to a mammal, particularly a human being, to treat adhesion-related disorders. In some embodiments, regorafenib is administered to a mammal, particularly a human being, to treat post-surgical adhesion. In some embodiments, regorafenib is administered to a mammal, particularly a human being, to treat peritendinous adhesion. In some embodiments, regorafenib is administered to a mammal, particularly a human being, to treat carpal tunnel surgery. In some embodiments, regorafenib is administered to a mammal, particularly a human being, to treat intrauterine adhesion. In some embodiments, regorafenib is administered to a mammal, particularly a human being, to treat frozen shoulder. In some embodiments, regorafenib is administered to a mammal, particularly a human being, to treat adhesive capsulitis. In some embodiments, regorafenib is administered to a mammal, particularly a human being, to treat chronic transplant rejection. In some embodiments, regorafenib is administered to a mammal, particularly a human being, to treat fistula formation. In some embodiments, regorafenib is administered to a mammal, particularly a human being, to treat Dupuytren's contracture. In some embodiments, regorafenib is administered to a mammal, particularly a human being, to treat Grave's disease. In some embodiments, regorafenib is administered to a mammal, particularly a human being, to treat Grave's hyperthyroidism. In some embodiments, regorafenib is administered to a mammal, particularly a human being, to treat chronic graft versus host disease. In some embodiments, regorafenib is administered to a mammal, particularly a human being, to treat Sjogren's syndrome. In some embodiments, regorafenib is administered to a mammal, particularly a human being, to treat systemic sclerosis. In some embodiments, regorafenib is administered to a mammal, particularly a human being, to treat systemic scleroderma.

In some embodiments, ponatinib is administered to a mammal, particularly a human being, to treat a dermal-related disorder. In some embodiments, ponatinib is administered to a mammal, particularly a human being, to treat a scar. In some embodiments, ponatinib is administered to a mammal, particularly a human being, to treat a skin scar. In some embodiments, ponatinib is administered to a mammal, particularly a human being, to treat a wrinkle. In some embodiments, ponatinib is administered to a mammal, particularly a human being, to treat cellulite. In some embodiments, ponatinib is administered to a mammal, particularly a human being, to treat dermal neoplastic fibrosis. In some embodiments, ponatinib is administered to a mammal, particularly a human being, to treat scarring alopecia. In some embodiments, ponatinib is administered to a mammal, particularly a human being, to treat vasculopathy. In some embodiments, ponatinib is administered to a mammal, particularly a human being, to treat vasculitis. In some embodiments, ponatinib is administered to a mammal, particularly a human being, for wound healing. In some embodiments, ponatinib is administered to a mammal, particularly a human being, for exuberant burn wound healing. In some embodiments, ponatinib is administered to a mammal, particularly a human being, to treat diabetic foot syndrome. In some embodiments, ponatinib is administered to a mammal, particularly a human being, to treat scleroderma. In some embodiments, ponatinib is administered to a mammal, particularly a human being, to treat arthrofibrosis. In some embodiments, ponatinib is administered to a mammal, particularly a human being, to treat Peyronie's disease. In some embodiments, ponatinib is administered to a mammal, particularly a human being, to treat Dupuytren's contracture. In some embodiments, ponatinib is administered to a mammal, particularly a human being, to treat adhesive capsulitis. In some embodiments, ponatinib is administered to a mammal, particularly a human being, to treat non-melanoma skin cancers. In some embodiments, ponatinib is administered to a mammal, particularly a human being, to treat melanoma. In some embodiments, ponatinib is administered to a mammal, particularly a human being, to treat actinic keratosis. In some embodiments, ponatinib is administered to a mammal, particularly a human being, to treat basal cell carcinoma. In some embodiments, ponatinib is administered to a mammal, particularly a human being, to treat squamous-cell carcinoma.

In some embodiments, ponatinib is administered to a mammal, particularly a human being, to treat benign prostate hyperplasia and/or its associated lower urinary tract symptoms. In some embodiments, ponatinib is administered to a mammal, particularly a human being, to treat fibrosis of ureters and/or of renal pelvis. In some embodiments, ponatinib is administered to a mammal, particularly a human being, to treat prostate adenoma. In some embodiments, ponatinib is administered to a mammal, particularly a human being, to treat to treat prostatic intraepithelial neoplasia.

In some embodiments, ponatinib is administered to a mammal, particularly a human being, to treat an eye-related disorder. In some embodiments, ponatinib is administered to a mammal, particularly a human being, to treat uveitis. In some embodiments, ponatinib is administered to a mammal, particularly a human being, to treat corneal transparency. In some embodiments, ponatinib is administered to a mammal, particularly a human being, to treat corneal scar formation. In some embodiments, ponatinib is administered to a mammal, particularly a human being, to treat secondary cataract formation. In some embodiments, ponatinib is administered to a mammal, particularly a human being, in conjunction with glaucoma filtration surgery. In some embodiments, ponatinib is administered to a mammal, particularly a human being, to treat ocular surgical procedures and implants. In some embodiments, ponatinib is administered to a mammal, particularly a human being, in conjunction with photorefractive keratectomy. In some embodiments, ponatinib is administered to a mammal, particularly a human being, in conjunction with laser in situ keratomileusis. In some embodiments, ponatinib is administered to a mammal, particularly a human being, to treat formation and contraction of pre- and epiretinal membranes. In some embodiments, ponatinib is administered to a mammal, particularly a human being, to treat proliferative vitreoretinopathy. In some embodiments, ponatinib is administered to a mammal, particularly a human being, to treat proliferative diabetic retinopathy. In some embodiments, ponatinib is administered to a mammal, particularly a human being, to treat diabetic macular edema. In some embodiments, ponatinib is administered to a mammal, particularly a human being, to treat subretinal fibrosis/scarring. In some embodiments, ponatinib is administered to a mammal, particularly a human being, to treat retinal gliosis. In some embodiments, ponatinib is administered to a mammal, particularly a human being, to treat and formation of choroidal membranes. In some embodiments, ponatinib is administered to a mammal, particularly a human being, to treat wet age-related macular degeneration. In some embodiments, ponatinib is administered to a mammal, particularly a human being, to treat atrophic or dry age-related macular degeneration. In some embodiments, ponatinib is administered to a mammal, particularly a human being, to treat retinal vein occlusion.

In some embodiments, ponatinib is administered to a mammal, particularly a human being, to treat rosacea. In some embodiments, ponatinib is administered to a mammal, particularly a human being, to treat psoriasis. In some embodiments, ponatinib is administered to a mammal, particularly a human being, to treat erythema multiforme. In some embodiments, ponatinib is administered to a mammal, particularly a human being, to treat bullous pemphigoid. In some embodiments, ponatinib is administered to a mammal, particularly a human being, to treat hereditary hemorrhagic telangiectasia. In some embodiments, ponatinib is administered to a mammal, particularly a human being, to treat rheumatoid arthritis. In some embodiments, ponatinib is administered to a mammal, particularly a human being, to treat atopic dermatitis. In some embodiments, ponatinib is administered to a mammal, particularly a human being, for dermal wound healing.

In some embodiments, ponatinib is administered to a mammal, particularly a human being, to treat uterine fibroids. In some embodiments, ponatinib is administered to a mammal, particularly a human being, to treat a uterine myoma. In some embodiments, ponatinib is administered to a mammal, particularly a human being, to treat a uterine parasitic myoma. In some embodiments, ponatinib is administered to a mammal, particularly a human being, to treat primary sclerosing cholangitis. In some embodiments, ponatinib is administered to a mammal, particularly a human being, for intra uterine surgery. In some embodiments, ponatinib is administered to a mammal, particularly a human being, to treat intra uterine synechiae. In some embodiments, ponatinib is administered to a mammal, particularly a human being, to treat Asherman's syndrome. In some embodiments, ponatinib is administered to a mammal, particularly a human being, to treat intrauterine adhesions. In some embodiments, ponatinib is administered to a mammal, particularly a human being, to treat intrauterine synechiae. In some embodiments, ponatinib is administered to a mammal, particularly a human being, to treat biliary duct fibrosis. In some embodiments, ponatinib is administered to a mammal, particularly a human being, to treat biliary duct sclerosis. In some embodiments, ponatinib is administered to a mammal, particularly a human being, to treat primary biliary cirrhosis. In some embodiments, ponatinib is administered to a mammal, particularly a human being, to treat fibrosis of ureters and/or renal pelvis. In some embodiments, ponatinib is administered to a mammal, particularly a human being, to treat retroperitoneal fibrosis. In some embodiments, ponatinib is administered to a mammal, particularly a human being, to treat adenomyosis. In some embodiments, ponatinib is administered to a mammal, particularly a human being, to treat uterine fibromyoma. In some embodiments, ponatinib is administered to a mammal, particularly a human being, to treat uterine fibroleiomyoma. In some embodiments, ponatinib is administered to a mammal, particularly a human being, to treat intrauterine adhesions. In some embodiments, ponatinib is administered to a mammal, particularly a human being, to treat intrauterine synachiae. In some embodiments, ponatinib is administered to a mammal, particularly a human being, to treat uterine fibroma, intramural fibroids. In some embodiments, ponatinib is administered to a mammal, particularly a human being, to treat subserosal fibroids. In some embodiments, ponatinib is administered to a mammal, particularly a human being, to treat submucosal fibroids. In some embodiments, ponatinib is administered to a mammal, particularly a human being, to treat pedunculated fibroids. In some embodiments, ponatinib is administered to a mammal, particularly a human being, to treat uterine leiomyomas. In some embodiments, ponatinib is administered to a mammal, particularly a human being, to treat cervical fibroids. In some embodiments, ponatinib is administered to a mammal, particularly a human being, to treat uterine synechiae.

In some embodiments, ponatinib is administered to a mammal, particularly a human being, to treat adhesion-related disorders. In some embodiments, ponatinib is administered to a mammal, particularly a human being, to treat post-surgical adhesion. In some embodiments, ponatinib is administered to a mammal, particularly a human being, to treat peritendinous adhesion. In some embodiments, ponatinib is administered to a mammal, particularly a human being, to treat carpal tunnel surgery. In some embodiments, ponatinib is administered to a mammal, particularly a human being, to treat intrauterine adhesion. In some embodiments, ponatinib is administered to a mammal, particularly a human being, to treat frozen shoulder. In some embodiments, ponatinib is administered to a mammal, particularly a human being, to treat adhesive capsulitis. In some embodiments, ponatinib is administered to a mammal, particularly a human being, to treat chronic transplant rejection. In some embodiments, ponatinib is administered to a mammal, particularly a human being, to treat fistula formation. In some embodiments, ponatinib is administered to a mammal, particularly a human being, to treat Dupuytren's contracture. In some embodiments, ponatinib is administered to a mammal, particularly a human being, to treat Grave's disease. In some embodiments, ponatinib is administered to a mammal, particularly a human being, to treat Grave's hyperthyroidism. In some embodiments, ponatinib is administered to a mammal, particularly a human being, to treat chronic graft versus host disease. In some embodiments, ponatinib is administered to a mammal, particularly a human being, to treat Sjogren's syndrome. In some embodiments, ponatinib is administered to a mammal, particularly a human being, to treat systemic sclerosis. In some embodiments, ponatinib is administered to a mammal, particularly a human being, to treat systemic scleroderma.

In some embodiments, pazopanib is administered to a mammal, particularly a human being, to treat a dermal-related disorder. In some embodiments, pazopanib is administered to a mammal, particularly a human being, to treat a scar. In some embodiments, pazopanib is administered to a mammal, particularly a human being, to treat a skin scar. In some embodiments, pazopanib is administered to a mammal, particularly a human being, to treat a wrinkle. In some embodiments, pazopanib is administered to a mammal, particularly a human being, to treat cellulite. In some embodiments, pazopanib is administered to a mammal, particularly a human being, to treat dermal neoplastic fibrosis. In some embodiments, pazopanib is administered to a mammal, particularly a human being, to treat scarring alopecia. In some embodiments, pazopanib is administered to a mammal, particularly a human being, to treat vasculopathy. In some embodiments, pazopanib is administered to a mammal, particularly a human being, to treat vasculitis. In some embodiments, pazopanib is administered to a mammal, particularly a human being, for wound healing. In some embodiments, pazopanib is administered to a mammal, particularly a human being, for exuberant burn wound healing. In some embodiments, pazopanib is administered to a mammal, particularly a human being, to treat diabetic foot syndrome. In some embodiments, pazopanib is administered to a mammal, particularly a human being, to treat scleroderma. In some embodiments, pazopanib is administered to a mammal, particularly a human being, to treat arthrofibrosis. In some embodiments, pazopanib is administered to a mammal, particularly a human being, to treat Peyronie's disease. In some embodiments, pazopanib is administered to a mammal, particularly a human being, to treat Dupuytren's contracture. In some embodiments, pazopanib is administered to a mammal, particularly a human being, to treat adhesive capsulitis. In some embodiments, pazopanib is administered to a mammal, particularly a human being, to treat non-melanoma skin cancers. In some embodiments, pazopanib is administered to a mammal, particularly a human being, to treat melanoma. In some embodiments, pazopanib is administered to a mammal, particularly a human being, to treat actinic keratosis. In some embodiments, pazopanib is administered to a mammal, particularly a human being, to treat basal cell carcinoma. In some embodiments, pazopanib is administered to a mammal, particularly a human being, to treat squamous-cell carcinoma.

In some embodiments, pazopanib is administered to a mammal, particularly a human being, to treat benign prostate hyperplasia and/or its associated lower urinary tract symptoms. In some embodiments, pazopanib is administered to a mammal, particularly a human being, to treat fibrosis of ureters and/or of renal pelvis. In some embodiments, pazopanib is administered to a mammal, particularly a human being, to treat prostate adenoma. In some embodiments, pazopanib is administered to a mammal, particularly a human being, to treat to treat prostatic intraepithelial neoplasia.

In some embodiments, pazopanib is administered to a mammal, particularly a human being, to treat an eye-related disorder. In some embodiments, pazopanib is administered to a mammal, particularly a human being, to treat uveitis. In some embodiments, pazopanib is administered to a mammal, particularly a human being, to treat corneal transparency. In some embodiments, pazopanib is administered to a mammal, particularly a human being, to treat corneal scar formation. In some embodiments, pazopanib is administered to a mammal, particularly a human being, to treat secondary cataract formation. In some embodiments, pazopanib is administered to a mammal, particularly a human being, in conjunction with glaucoma filtration surgery. In some embodiments, pazopanib is administered to a mammal, particularly a human being, to treat ocular surgical procedures and implants. In some embodiments, pazopanib is administered to a mammal, particularly a human being, in conjunction with photorefractive keratectomy. In some embodiments, pazopanib is administered to a mammal, particularly a human being, in conjunction with laser in situ keratomileusis. In some embodiments, pazopanib is administered to a mammal, particularly a human being, to treat formation and contraction of pre- and epiretinal membranes. In some embodiments, pazopanib is administered to a mammal, particularly a human being, to treat proliferative vitreoretinopathy. In some embodiments, pazopanib is administered to a mammal, particularly a human being, to treat proliferative diabetic retinopathy. In some embodiments, pazopanib is administered to a mammal, particularly a human being, to treat diabetic macular edema. In some embodiments, pazopanib is administered to a mammal, particularly a human being, to treat subretinal fibrosis/scarring. In some embodiments, pazopanib is administered to a mammal, particularly a human being, to treat retinal gliosis. In some embodiments, pazopanib is administered to a mammal, particularly a human being, to treat and formation of choroidal membranes. In some embodiments, pazopanib is administered to a mammal, particularly a human being, to treat wet age-related macular degeneration. In some embodiments, pazopanib is administered to a mammal, particularly a human being, to treat atrophic or dry age-related macular degeneration. In some embodiments, pazopanib is administered to a mammal, particularly a human being, to treat retinal vein occlusion.

In some embodiments, pazopanib is administered to a mammal, particularly a human being, to treat rosacea. In some embodiments, pazopanib is administered to a mammal, particularly a human being, to treat psoriasis. In some embodiments, pazopanib is administered to a mammal, particularly a human being, to treat erythema multiforme. In some embodiments, pazopanib is administered to a mammal, particularly a human being, to treat bullous pemphigoid. In some embodiments, pazopanib is administered to a mammal, particularly a human being, to treat hereditary hemorrhagic telangiectasia. In some embodiments, pazopanib is administered to a mammal, particularly a human being, to treat rheumatoid arthritis. In some embodiments, pazopanib is administered to a mammal, particularly a human being, to treat atopic dermatitis. In some embodiments, pazopanib is administered to a mammal, particularly a human being, for dermal wound healing.

In some embodiments, pazopanib is administered to a mammal, particularly a human being, to treat uterine fibroids. In some embodiments, pazopanib is administered to a mammal, particularly a human being, to treat a uterine myoma. In some embodiments, pazopanib is administered to a mammal, particularly a human being, to treat a uterine parasitic myoma. In some embodiments, pazopanib is administered to a mammal, particularly a human being, to treat primary sclerosing cholangitis. In some embodiments, pazopanib is administered to a mammal, particularly a human being, for intra uterine surgery. In some embodiments, pazopanib is administered to a mammal, particularly a human being, to treat intra uterine synechiae. In some embodiments, pazopanib is administered to a mammal, particularly a human being, to treat Asherman's syndrome. In some embodiments, pazopanib is administered to a mammal, particularly a human being, to treat intrauterine adhesions. In some embodiments, pazopanib is administered to a mammal, particularly a human being, to treat intrauterine synechiae. In some embodiments, pazopanib is administered to a mammal, particularly a human being, to treat biliary duct fibrosis. In some embodiments, pazopanib is administered to a mammal, particularly a human being, to treat biliary duct sclerosis. In some embodiments, pazopanib is administered to a mammal, particularly a human being, to treat primary biliary cirrhosis. In some embodiments, pazopanib is administered to a mammal, particularly a human being, to treat fibrosis of ureters and/or renal pelvis. In some embodiments, pazopanib is administered to a mammal, particularly a human being, to treat retroperitoneal fibrosis. In some embodiments, pazopanib is administered to a mammal, particularly a human being, to treat adenomyosis. In some embodiments, pazopanib is administered to a mammal, particularly a human being, to treat uterine fibromyoma. In some embodiments, pazopanib is administered to a mammal, particularly a human being, to treat uterine fibroleiomyoma. In some embodiments, pazopanib is administered to a mammal, particularly a human being, to treat intrauterine adhesions. In some embodiments, pazopanib is administered to a mammal, particularly a human being, to treat intrauterine synachiae. In some embodiments, pazopanib is administered to a mammal, particularly a human being, to treat uterine fibroma, intramural fibroids. In some embodiments, pazopanib is administered to a mammal, particularly a human being, to treat subserosal fibroids. In some embodiments, pazopanib is administered to a mammal, particularly a human being, to treat submucosal fibroids. In some embodiments, pazopanib is administered to a mammal, particularly a human being, to treat pedunculated fibroids. In some embodiments, pazopanib is administered to a mammal, particularly a human being, to treat uterine leiomyomas. In some embodiments, pazopanib is administered to a mammal, particularly a human being, to treat cervical fibroids. In some embodiments, pazopanib is administered to a mammal, particularly a human being, to treat uterine synechiae.

In some embodiments, pazopanib is administered to a mammal, particularly a human being, to treat adhesion-related disorders. In some embodiments, pazopanib is administered to a mammal, particularly a human being, to treat post-surgical adhesion. In some embodiments, pazopanib is administered to a mammal, particularly a human being, to treat peritendinous adhesion. In some embodiments, pazopanib is administered to a mammal, particularly a human being, to treat carpal tunnel surgery. In some embodiments, pazopanib is administered to a mammal, particularly a human being, to treat intrauterine adhesion. In some embodiments, pazopanib is administered to a mammal, particularly a human being, to treat frozen shoulder. In some embodiments, pazopanib is administered to a mammal, particularly a human being, to treat adhesive capsulitis. In some embodiments, pazopanib is administered to a mammal, particularly a human being, to treat chronic transplant rejection. In some embodiments, pazopanib is administered to a mammal, particularly a human being, to treat fistula formation. In some embodiments, pazopanib is administered to a mammal, particularly a human being, to treat Dupuytren's contracture. In some embodiments, pazopanib is administered to a mammal, particularly a human being, to treat Grave's disease. In some embodiments, pazopanib is administered to a mammal, particularly a human being, to treat Grave's hyperthyroidism. In some embodiments, pazopanib is administered to a mammal, particularly a human being, to treat chronic graft versus host disease. In some embodiments, pazopanib is administered to a mammal, particularly a human being, to treat Sjogren's syndrome. In some embodiments, pazopanib is administered to a mammal, particularly a human being, to treat systemic sclerosis. In some embodiments, pazopanib is administered to a mammal, particularly a human being, to treat systemic scleroderma.

In some embodiments, axitinib is administered to a mammal, particularly a human being, to treat rosacea. In some embodiments, axitinib is administered to a mammal, particularly a human being, to treat psoriasis. In some embodiments, axitinib is administered to a mammal, particularly a human being, to treat erythema multiforme. In some embodiments, axitinib is administered to a mammal, particularly a human being, to treat bullous pemphigoid. In some embodiments, axitinib is administered to a mammal, particularly a human being, to treat hereditary hemorrhagic telangiectasia. In some embodiments, axitinib is administered to a mammal, particularly a human being, to treat rheumatoid arthritis. In some embodiments, axitinib is administered to a mammal, particularly a human being, to treat atopic dermatitis. In some embodiments, axitinib is administered to a mammal, particularly a human being, to improve dermal wound healing. In some embodiments, axitinib is administered to a mammal, particularly a human being, to treat uveitis. In some embodiments, axitinib is administered to a mammal, particularly a human being, to treat atopic macular degeneration. In some embodiments, axitinib is administered to a mammal, particularly a human being, to treat dry age-related macular degeneration. In some embodiments, axitinib is administered to a mammal, particularly a human being, to treat uterine myomas (uterine parasitic myomas). In some embodiments, axitinib is administered to a mammal, particularly a human being, to treat adenomyosis. In some embodiments, axitinib is administered to a mammal, particularly a human being, to treat uterine fibromyoma. In some embodiments, axitinib is administered to a mammal, particularly a human being, to treat uterine fibroleiomyoma. In some embodiments, axitinib is administered to a mammal, particularly a human being, to treat intra uterine surgery. In some embodiments, axitinib is administered to a mammal, particularly a human being, to treat intra uterine synachiae. In some embodiments, axitinib is administered to a mammal, particularly a human being, to treat Asherman's syndrome. In some embodiments, axitinib is administered to a mammal, particularly a human being, to treat intrauterine adhesions. In some embodiments, axitinib is administered to a mammal, particularly a human being, to treat intrauterine synachiae.

In some embodiments, nintedanib is administered to a mammal, particularly a human being, to treat rosacea. In some embodiments, nintedanib is administered to a mammal, particularly a human being, to treat psoriasis. In some embodiments, nintedanib is administered to a mammal, particularly a human being, to treat erythema multiforme. In some embodiments, nintedanib is administered to a mammal, particularly a human being, to treat bullous pemphigoid. In some embodiments, nintedanib is administered to a mammal, particularly a human being, to treat hereditary hemorrhagic telangiectasia. In some embodiments, nintedanib is administered to a mammal, particularly a human being, to treat rheumatoid arthritis. In some embodiments, nintedanib is administered to a mammal, particularly a human being, to treat atopic dermatitis. In some embodiments, nintedanib is administered to a mammal, particularly a human being, to improve dermal wound healing. In some embodiments, nintedanib is administered to a mammal, particularly a human being, to treat uveitis. In some embodiments, nintedanib is administered to a mammal, particularly a human being, to treat atopic macular degeneration. In some embodiments, nintedanib is administered to a mammal, particularly a human being, to treat dry age-related macular degeneration. In some embodiments, nintedanib is administered to a mammal, particularly a human being, to treat uterine myomas (uterine parasitic myomas). In some embodiments, nintedanib is administered to a mammal, particularly a human being, to treat adenomyosis. In some embodiments, nintedanib is administered to a mammal, particularly a human being, to treat uterine fibromyoma. In some embodiments, nintedanib is administered to a mammal, particularly a human being, to treat uterine fibroleiomyoma. In some embodiments, nintedanib is administered to a mammal, particularly a human being, to treat intra uterine surgery. In some embodiments, nintedanib is administered to a mammal, particularly a human being, to treat intra uterine synachiae. In some embodiments, nintedanib is administered to a mammal, particularly a human being, to treat Asherman's syndrome. In some embodiments, nintedanib is administered to a mammal, particularly a human being, to treat intrauterine adhesions. In some embodiments, nintedanib is administered to a mammal, particularly a human being, to treat intrauterine synachiae.

In some embodiments, sunitinib is administered to a mammal, particularly a human being, to treat rosacea. In some embodiments, sunitinib is administered to a mammal, particularly a human being, to treat psoriasis. In some embodiments, sunitinib is administered to a mammal, particularly a human being, to treat erythema multiforme. In some embodiments, sunitinib is administered to a mammal, particularly a human being, to treat bullous pemphigoid. In some embodiments, sunitinib is administered to a mammal, particularly a human being, to treat hereditary hemorrhagic telangiectasia. In some embodiments, sunitinib is administered to a mammal, particularly a human being, to treat rheumatoid arthritis. In some embodiments, sunitinib is administered to a mammal, particularly a human being, to treat atopic dermatitis. In some embodiments, sunitinib is administered to a mammal, particularly a human being, to improve dermal wound healing. In some embodiments, sunitinib is administered to a mammal, particularly a human being, to treat uveitis. In some embodiments, sunitinib is administered to a mammal, particularly a human being, to treat atopic macular degeneration. In some embodiments, sunitinib is administered to a mammal, particularly a human being, to treat dry age-related macular degeneration. In some embodiments, sunitinib is administered to a mammal, particularly a human being, to treat uterine myomas (uterine parasitic myomas). In some embodiments, sunitinib is administered to a mammal, particularly a human being, to treat adenomyosis. In some embodiments, sunitinib is administered to a mammal, particularly a human being, to treat uterine fibromyoma. In some embodiments, sunitinib is administered to a mammal, particularly a human being, to treat uterine fibroleiomyoma. In some embodiments, sunitinib is administered to a mammal, particularly a human being, to treat intra uterine surgery. In some embodiments, sunitinib is administered to a mammal, particularly a human being, to treat intra uterine synachiae. In some embodiments, sunitinib is administered to a mammal, particularly a human being, to treat Asherman's syndrome. In some embodiments, sunitinib is administered to a mammal, particularly a human being, to treat intrauterine adhesions. In some embodiments, sunitinib is administered to a mammal, particularly a human being, to treat intrauterine synachiae.

In some embodiments, lenvatinib is administered to a mammal, particularly a human being, to treat rosacea. In some embodiments, lenvatinib is administered to a mammal, particularly a human being, to treat psoriasis. In some embodiments, lenvatinib is administered to a mammal, particularly a human being, to treat erythema multiforme. In some embodiments, lenvatinib is administered to a mammal, particularly a human being, to treat bullous pemphigoid. In some embodiments, lenvatinib is administered to a mammal, particularly a human being, to treat hereditary hemorrhagic telangiectasia. In some embodiments, lenvatinib is administered to a mammal, particularly a human being, to treat rheumatoid arthritis. In some embodiments, lenvatinib is administered to a mammal, particularly a human being, to treat atopic dermatitis. In some embodiments, lenvatinib is administered to a mammal, particularly a human being, to improve dermal wound healing. In some embodiments, lenvatinib is administered to a mammal, particularly a human being, to treat uveitis. In some embodiments, lenvatinib is administered to a mammal, particularly a human being, to treat dry age-related macular degeneration. In some embodiments, lenvatinib is administered to a mammal, particularly a human being, to treat uterine myomas (uterine parasitic myomas). In some embodiments, lenvatinib is administered to a mammal, particularly a human being, to treat adenomyosis. In some embodiments, lenvatinib is administered to a mammal, particularly a human being, to treat uterine fibromyoma. In some embodiments, lenvatinib is administered to a mammal, particularly a human being, to treat uterine fibroleiomyoma. In some embodiments, lenvatinib is administered to a mammal, particularly a human being, to treat intra uterine surgery. In some embodiments, lenvatinib is administered to a mammal, particularly a human being, to treat intra uterine synachiae. In some embodiments, lenvatinib is administered to a mammal, particularly a human being, to treat Asherman's syndrome. In some embodiments, lenvatinib is administered to a mammal, particularly a human being, to treat intrauterine adhesions. In some embodiments, lenvatinib is administered to a mammal, particularly a human being, to treat intrauterine synachiae.

In some embodiments, administering a multi-target, multi-phase modulator, or multi-kinase inhibitor, such as axitinib, nintedanib, pirfenidone, riociguat, sorafenib, sunitinib, lenvatinib, regorafenib, ponatinib, or pazopanib, is effective in reducing the volume or weight of the affected tissue by at least about 1%, at least about 2%, at least about 3%, at least about 4%, at least about 5%, at least about 6%, at least about 7%, at least about 8%, at least about 9%, at least about 10%, at least about 12%, at least about 15%, or at least about 20%.

In some embodiments, administering a multi-target inhibitor, multi-phase modulator, or multi-kinase inhibitor, such as axitinib, nintedanib, pirfenidone, riociguat, sorafenib, sunitinib, lenvatinib, regorafenib, ponatinib, or pazopanib, is effective in reducing the hyperplasia score of the affected tissue by at least about 1%, at least about 5%, at least about 10%, at least about 15%, at least about 20%, at least about 25%, at least about 30%, at least about 35%, or at least about 40%.

In some embodiments, administering a multi-target inhibitor, multi-phase modulator, or multi-kinase inhibitor, such as axitinib, nintedanib, pirfenidone, riociguat, sorafenib, sunitinib, lenvatinib, regorafenib, ponatinib, or pazopanib, is effective in reducing blood vessel area or volume of the affected tissue to less than 70%, less than 50%, less than 25%, less than 20%, less than 15%, or less than 10% of its original blood vessel area or volume.

The therapeutic activity of multi-kinase inhibitors may be correlated with their inhibition of certain growth factors and cytokines, such as VEGF, PDGF, and TGF beta. Furthermore, some multi-kinase inhibitors demonstrated an effect of reducing inflammation and CD4+ and CD8+ lymphocytes.

In some embodiments, administering a multi-target inhibitor, multi-phase modulator, or multi-kinase inhibitor, such as axitinib, nintedanib, pirfenidone, riociguat, sorafenib, sunitinib, lenvatinib, regorafenib, ponatinib, or pazopanib, is effective in inhibiting the activity of a VEGF by at least about 1%, at least about 5%, at least about 10%, at least about 20%, at least about 30%, at least about 40%, at least about 50%, at least about 60%, at least about 70%, at least about 80%, at least about 90%, at least about 95%, at least about 98%, or at least about 99%.

In some embodiments, administering a multi-target inhibitor, multi-phase modulator, or multi-kinase inhibitor, such as axitinib, nintedanib, pirfenidone, riociguat, sorafenib, sunitinib, lenvatinib, regorafenib, ponatinib, or pazopanib, is effective in inhibiting the activity of a PDGF by at least about 1%, at least about 5%, at least about 10%, at least about 20%, at least about 30%, at least about 40%, at least about 50%, at least about 60%, at least about 70%, at least about 80%, at least about 90%, at least about 95%, at least about 98%, or at least about 99%.

In some embodiments, administering a multi-target inhibitor, multi-phase modulator, or multi-kinase inhibitor, such as axitinib, nintedanib, pirfenidone, riociguat, sorafenib, sunitinib, lenvatinib, regorafenib, ponatinib, or pazopanib, is effective in inhibiting the activity of a TGF beta, such as TGF-β1 mRNA expression, by at least about 1%, at least about 5%, at least about 10%, at least about 20%, at least about 30%, at least about 40%, at least about 50%, at least about 60%, at least about 70%, at least about 80%, at least about 90%, at least about 95%, at least about 98%, or at least about 99%.

In some embodiments, administering a multi-target inhibitor, multi-phase modulator, or multi-kinase inhibitor, such as axitinib, nintedanib, pirfenidone, riociguat, sorafenib, sunitinib, lenvatinib, regorafenib, ponatinib, or pazopanib, is effective in reducing inflammation by at least about 1%, at least about 5%, at least about 10%, at least about 20%, at least about 30%, at least about 40%, at least about 50%, at least about 60%, at least about 70%, at least about 80%, at least about 90%, at least about 95%, at least about 98%, or at least about 99%.

In some embodiments, administering a multi-target inhibitor, multi-phase modulator, or multi-kinase inhibitor, such as axitinib, nintedanib, pirfenidone, riociguat, sorafenib, sunitinib, lenvatinib, regorafenib, ponatinib, or pazopanib, is effective in reducing CD4+ lymphocytes by at least about 1%, at least about 5%, at least about 10%, at least about 20%, at least about 30%, at least about 40%, at least about 50%, at least about 60%, at least about 70%, at least about 80%, at least about 90%, at least about 95%, at least about 98%, or at least about 99%.

In some embodiments, administering a multi-target inhibitor, multi-phase modulator, or multi-kinase inhibitor, such as axitinib, nintedanib, pirfenidone, riociguat, sorafenib, sunitinib, lenvatinib, regorafenib, ponatinib, or pazopanib, is effective in reducing CD8+ lymphocytes by at least about 1%, at least about 5%, at least about 10%, at least about 20%, at least about 30%, at least about 40%, at least about 50%, at least about 60%, at least about 70%, at least about 80%, at least about 90%, at least about 95%, at least about 98%, or at least about 99%.

In some embodiments, administering a multi-target inhibitor, multi-phase modulator, or multi-kinase inhibitor, such as axitinib, nintedanib, pirfenidone, riociguat, sorafenib, sunitinib, lenvatinib, regorafenib, ponatinib, or pazopanib, is effective in reducing neovascularization by at least about 1%, at least about 5%, at least about 10%, at least about 20%, at least about 30%, at least about 40%, at least about 50%, at least about 60%, at least about 70%, at least about 80%, at least about 90%, at least about 95%, at least about 98%, or at least about 99%.

In some embodiments, administering a multi-target inhibitor, multi-phase modulator, or multi-kinase inhibitor, such as axitinib, nintedanib, pirfenidone, riociguat, sorafenib, sunitinib, lenvatinib, regorafenib, ponatinib, or pazopanib, is effective in reducing fibroplasia by at least about 1%, at least about 5%, at least about 10%, at least about 20%, at least about 30%, at least about 40%, at least about 50%, at least about 60%, at least about 70%, at least about 80%, at least about 90%, at least about 95%, at least about 98%, or at least about 99%.

In some embodiments, administering a multi-target inhibitor, multi-phase modulator, or multi-kinase inhibitor, such as axitinib, nintedanib, pirfenidone, riociguat, sorafenib, sunitinib, lenvatinib, regorafenib, ponatinib, or pazopanib, is effective in reducing collagen density by at least about 1%, at least about 5%, at least about 10%, at least about 20%, at least about 30%, at least about 40%, at least about 50%, at least about 60%, at least about 70%, at least about 80%, at least about 90%, at least about 95%, at least about 98%, or at least about 99%.

In some embodiments, administering a multi-target inhibitor, multi-phase modulator, or multi-kinase inhibitor, such as axitinib, nintedanib, pirfenidone, riociguat, sorafenib, sunitinib, lenvatinib, regorafenib, ponatinib, or pazopanib, is effective in reducing smooth muscle actin by at least about 1%, at least about 5%, at least about 10%, at least about 20%, at least about 30%, at least about 40%, at least about 50%, at least about 60%, at least about 70%, at least about 80%, at least about 90%, at least about 95%, at least about 98%, or at least about 99%.

In some embodiments, administering a multi-target inhibitor, multi-phase modulator, or multi-kinase inhibitor, such as axitinib, nintedanib, pirfenidone, riociguat, sorafenib, sunitinib, lenvatinib, regorafenib, ponatinib, or pazopanib, is effective in improving bleb survival by at least about 1%, at least about 5%, at least about 10%, at least about 20%, at least about 30%, at least about 40%, at least about 50%, at least about 60%, at least about 70%, at least about 80%, at least about 90%, at least about 95%, at least about 98%, or at least about 99%.

In some embodiments, administering a multi-target inhibitor, multi-phase modulator, or multi-kinase inhibitor, such as axitinib, nintedanib, pirfenidone, riociguat, sorafenib, sunitinib, lenvatinib, regorafenib, ponatinib, or pazopanib, is effective in reducing subretinal fibrosis by at least about 1%, at least about 5%, at least about 10%, at least about 20%, at least about 30%, at least about 40%, at least about 50%, at least about 60%, at least about 70%, at least about 80%, at least about 90%, at least about 95%, at least about 98%, or at least about 99%.

In some embodiments, administering a multi-target inhibitor, multi-phase modulator, or multi-kinase inhibitor, such as axitinib, nintedanib, pirfenidone, riociguat, sorafenib, sunitinib, lenvatinib, regorafenib, ponatinib, or pazopanib, is effective in reducing prostate hyperplasia by at least about 1%, at least about 5%, at least about 10%, at least about 20%, at least about 30%, at least about 40%, at least about 50%, at least about 60%, at least about 70%, at least about 80%, at least about 90%, at least about 95%, at least about 98%, or at least about 99%.

In some embodiments, administering a multi-target inhibitor, multi-phase modulator, or multi-kinase inhibitor, such as axitinib, nintedanib, pirfenidone, riociguat, sorafenib, sunitinib, lenvatinib, regorafenib, ponatinib, or pazopanib, is effective in reducing epithelial hyperplasia by at least about 1%, at least about 5%, at least about 10%, at least about 20%, at least about 30%, at least about 40%, at least about 50%, at least about 60%, at least about 70%, at least about 80%, at least about 90%, at least about 95%, at least about 98%, or at least about 99%.

In some embodiments, administering a multi-target inhibitor, multi-phase modulator, or multi-kinase inhibitor, such as axitinib, nintedanib, pirfenidone, riociguat, sorafenib, sunitinib, lenvatinib, regorafenib, ponatinib, or pazopanib, is effective in reducing glandular hyperplasia by at least about 1%, at least about 5%, at least about 10%, at least about 20%, at least about 30%, at least about 40%, at least about 50%, at least about 60%, at least about 70%, at least about 80%, at least about 90%, at least about 95%, at least about 98%, or at least about 99%.

In some embodiments, administering a multi-target inhibitor, multi-phase modulator, or multi-kinase inhibitor, such as axitinib, nintedanib, pirfenidone, riociguat, sorafenib, sunitinib, lenvatinib, regorafenib, ponatinib, or pazopanib, is effective in reducing fibrosis by at least about 1%, at least about 5%, at least about 10%, at least about 20%, at least about 30%, at least about 40%, at least about 50%, at least about 60%, at least about 70%, at least about 80%, at least about 90%, at least about 95%, at least about 98%, or at least about 99%.

In some embodiments, administering a multi-target inhibitor, multi-phase modulator, or multi-kinase inhibitor, such as axitinib, nintedanib, pirfenidone, riociguat, sorafenib, sunitinib, lenvatinib, regorafenib, ponatinib, or pazopanib, is effective in reducing angeogenesis by at least about 1%, at least about 5%, at least about 10%, at least about 20%, at least about 30%, at least about 40%, at least about 50%, at least about 60%, at least about 70%, at least about 80%, at least about 90%, at least about 95%, at least about 98%, or at least about 99%.

For ocular rosacea, patients that are at least about 40 years of age, at least about 50 years of age, at least about 60 years of age, at least about 70 years of age, at least about 80 years of age, or at least about 90 years of age may be of particular interest.

In some embodiments, a multi-target inhibitor, multi-phase modulator, or multi-kinase inhibitor, such as axitinib, nintedanib, pirfenidone, riociguat, sorafenib, sunitinib, lenvatinib, regorafenib, ponatinib, or pazopanib, may be administered by intralesional, paralesional, or intra-tissue injection. Compounds may also be administered orally (e.g., capsules, sustained release capsules, tablets, sustained release tablets, chewable tablets, sublingual tablets, effervescent tablets, pills, suspensions, powders, granules, etc.). A multi-target inhibitor, multi-phase modulator, or multi-kinase inhibitor, such as axitinib, nintedanib, pirfenidone, riociguat, sorafenib, sunitinib, lenvatinib, regorafenib, ponatinib, or pazopanib, may also be administered by topical formulations (e.g., cream, ointment, solution, emulsion, medical plaster, local delivery forms, etc.).

Intradermal injection or subcutaneous injection may be useful for treating conditions affecting the skin. Typically, the injection can contain about 0.01-4%, about 0.01-2%, about 2-4%, about 0.01-0.5%, about 0.5-1%, about 1-1.5%, about 1.5-2%, about 0.01-1%, about 1-2%, about 2-3%, or about 3-4% of the multi-kinase inhibitor by weight. The volume of the injection is typically about 0.01-4 mL, about 0.05-2 mL, about 2-4 mL, about 0.01-0.5 mL, about 0.5-1 mL, about 1-1.5 mL, about 1.5-2 mL, about 0.01-1 mL, about 1-2 mL, about 2-3 mL, or about 3-4 mL, per about 5-10 $cm^2$, per about 5-7 $cm^2$, per about 7-10 $cm^2$, per about 5-6 $cm^2$, per about 6-7 $cm^2$, per about 7-8 $cm^2$, per about 8-9 $cm^2$, or per about 9-10 $cm^2$ of skin area.

A multi-kinase inhibitor may be administered by intradermal injection or subcutaneous injection (such as in an amount in the immediately preceding paragraph) as needed, or at an interval of approximately weekly to approximately every 2 years, such as at an interval of about 1 week, about 2 weeks, about 3 weeks, about 4 weeks, about 5 weeks, about 6 weeks, about 7 weeks, about 8 weeks, about 9 weeks, about 10 weeks, about 11 weeks, about 12 weeks, about 13 weeks, about 14 weeks, about 15 weeks, about 16 weeks, about 17 weeks, about 18 weeks, about 19 weeks, about 20 weeks, about 21 weeks, about 22 weeks, about 23 weeks, about 24 weeks, about 25 weeks, about 26 weeks, about 27 weeks, about 28 weeks, about 29 weeks, about 30 weeks, about 31 weeks, about 32 weeks, about 33 weeks, about 34 weeks, about 35 weeks, about 36 weeks, about 37 weeks, about 38 weeks, about 39 weeks, about 40 weeks, about 41 weeks, about 42 weeks, about 43 weeks, about 44 weeks, about 45 weeks, about 46 weeks, about 47 weeks, about 48 weeks, about 49 weeks, about 50 weeks, about 51 weeks, about 52 weeks, about 1 month, about 2 months, about 3 months, about 4 months, about 5 months, about 6 months, about 7 months, about 8 months, about 9 months, about 10 months, about 11 months, about 12 months, about 18 months, about 24 months, etc.

The treatment in the immediately preceding paragraph may be continued for as long as needed, such as only once, or for at least about 2 weeks, at least about 3 weeks, at least about 4 weeks, at least about 5 weeks, at least about 2 months, at least about 3 months, at least about 6 months, at least about 9 months, at least about 12 months, at least about 2 years, at least about 3 years, at least about 4 years, at least about 5 years, at least about 10 years, or at least about 20 years.

For subcutaneous or intradermal injections of axitinib, e.g. for treating conditions affecting the skin, an injection can contain about 0.01-4%, about 0.01-2%, about 2-4%, about 0.01-0.2%, about 0.2-0.3%, about 0.3-0.4%, about 0.4-0.5%, about 0.5-0.6%, about 0.6-0.7%, about 0.7-0.8%, about 0.8-0.9%, about 0.9-1%, about 1-1.1%, about 1.1-1.2%, about 1.2-1.3%, about 1.3-1.4%, about 1.4-1.5%, about 1.5-1.6%, about 1.6-1.7%, about 1.7-1.8%, about 1.8-1.9%, about 1.9-2%, about 0.01-0.5%, about 0.5-1%, about 1-1.5%, about 1.5-2%, about 0.01-1%, about 1-2%, about 2-3%, or about 3-4% of the axitinib by weight. The volume of the injection is typically about 0.01-4 mL, about 0.05-2 mL, about 2-4 mL, about 0.01-0.5 mL, about 0.5-1 mL, about 1-1.5 mL, about 1.5-2 mL, about 0.01-1 mL, about 1-2 mL, about 2-3 mL, or about 3-4 mL, per about 5 cm$^2$, per about 10 cm$^2$, per about 5-10 cm$^2$, per about 5-7 cm$^2$, per about 7-10 cm$^2$, per about 5-6 cm$^2$, per about 6-7 cm$^2$, per about 7-8 cm$^2$, per about 8-9 cm$^2$, or per about 9-10 cm$^2$ of skin area. The dose of axitinib referred to above may be continued as needed, or may be administered about weekly, about twice a month, about monthly, about every other month, about semi-annually, or about yearly. Treatment may occur once, or may be continued for at least about 1 month, at least about 2 months, at least about 3 months, at least about 6 months, at least about 1 year, at least about 2 years, or at least about 5 years.

For subcutaneous or intradermal injections of nintedanib, e.g. for treating conditions affecting the skin, an injection can contain about 0.01-4%, about 0.01-2%, about 2-4%, about 0.01-0.2%, about 0.2-0.3%, about 0.3-0.4%, about 0.4-0.5%, about 0.5-0.6%, about 0.6-0.7%, about 0.7-0.8%, about 0.8-0.9%, about 0.9-1%, about 1-1.1%, about 1.1-1.2%, about 1.2-1.3%, about 1.3-1.4%, about 1.4-1.5%, about 1.5-1.6%, about 1.6-1.7%, about 1.7-1.8%, about 1.8-1.9%, about 1.9-2%, about 0.01-0.5%, about 0.5-1%, about 1-1.5%, about 1.5-2%, about 0.01-1%, about 1-2%, about 2-3%, or about 3-4% of the nintedanib by weight. The volume of the injection is typically about 0.01-4 mL, about 0.05-2 mL, about 2-4 mL, about 0.01-0.5 mL, about 0.5-1 mL, about 1-1.5 mL, about 1.5-2 mL, about 0.01-1 mL, about 1-2 mL, about 2-3 mL, or about 3-4 mL, per about 5 cm$^2$, per about 10 cm$^2$, per about 5-10 cm$^2$, per about 5-7 cm$^2$, per about 7-10 cm$^2$, per about 5-6 cm$^2$, per about 6-7 cm$^2$, per about 7-8 cm$^2$, per about 8-9 cm$^2$, or per about 9-10 cm$^2$ of skin area. The dose of nintedanib referred to above may be continued as needed, or may be administered about weekly, about twice a month, about monthly, about every other month, about semi-annually, or about yearly. Treatment may occur once, or may be continued for at least about 1 month, at least about 2 months, at least about 3 months, at least about 6 months, at least about 1 year, at least about 2 years, or at least about 5 years.

For subcutaneous or intradermal injections of pirfenidone, e.g. for treating conditions affecting the skin, an injection can contain about 0.01-4%, about 0.01-2%, about 2-4%, about 0.01-0.2%, about 0.2-0.3%, about 0.3-0.4%, about 0.4-0.5%, about 0.5-0.6%, about 0.6-0.7%, about 0.7-0.8%, about 0.8-0.9%, about 0.9-1%, about 1-1.1%, about 1.1-1.2%, about 1.2-1.3%, about 1.3-1.4%, about 1.4-1.5%, about 1.5-1.6%, about 1.6-1.7%, about 1.7-1.8%, about 1.8-1.9%, about 1.9-2%, about 0.01-0.5%, about 0.5-1%, about 1-1.5%, about 1.5-2%, about 0.01-1%, about 1-2%, about 2-3%, or about 3-4% of the pirfenidone by weight. The volume of the injection is typically about 0.01-4 mL, about 0.05-2 mL, about 2-4 mL, about 0.01-0.5 mL, about 0.5-1 mL, about 1-1.5 mL, about 1.5-2 mL, about 0.01-1 mL, about 1-2 mL, about 2-3 mL, or about 3-4 mL, per about 5 cm$^2$, per about 10 cm$^2$, per about 5-10 cm$^2$, per about 5-7 cm$^2$, per about 7-10 cm$^2$, per about 5-6 cm$^2$, per about 6-7 cm$^2$, per about 7-8 cm$^2$, per about 8-9 cm$^2$, or per about 9-10 cm$^2$ of skin area. The dose of pirfenidone referred to above may be continued as needed, or may be administered about weekly, about twice a month, about monthly, about every other month, about semi-annually, or about yearly. Treatment may occur once, or may be continued for at least about 1 month, at least about 2 months, at least about 3 months, at least about 6 months, at least about 1 year, at least about 2 years, or at least about 5 years.

For subcutaneous or intradermal injections of riociguat, e.g. for treating conditions affecting the skin, an injection can contain about 0.01-4%, about 0.01-2%, about 2-4%, about 0.01-0.2%, about 0.2-0.3%, about 0.3-0.4%, about 0.4-0.5%, about 0.5-0.6%, about 0.6-0.7%, about 0.7-0.8%, about 0.8-0.9%, about 0.9-1%, about 1-1.1%, about 1.1-1.2%, about 1.2-1.3%, about 1.3-1.4%, about 1.4-1.5%, about 1.5-1.6%, about 1.6-1.7%, about 1.7-1.8%, about 1.8-1.9%, about 1.9-2%, about 0.01-0.5%, about 0.5-1%, about 1-1.5%, about 1.5-2%, about 0.01-1%, about 1-2%, about 2-3%, or about 3-4% of the riociguat by weight. The volume of the injection is typically about 0.01-4 mL, about 0.05-2 mL, about 2-4 mL, about 0.01-0.5 mL, about 0.5-1 mL, about 1-1.5 mL, about 1.5-2 mL, about 0.01-1 mL, about 1-2 mL, about 2-3 mL, or about 3-4 mL, per about 5 cm$^2$, per about 10 cm$^2$, per about 5-10 cm$^2$, per about 5-7 cm$^2$, per about 7-10 cm$^2$, per about 5-6 cm$^2$, per about 6-7 cm$^2$, per about 7-8 cm$^2$, per about 8-9 cm$^2$, or per about 9-10 cm$^2$ of skin area. The dose of riociguat referred to above may be continued as needed, or may be administered about weekly, about twice a month, about monthly, about every other month, about semi-annually, or about yearly. Treatment may occur once, or may be continued for at least about 1 month, at least about 2 months, at least about 3 months, at least about 6 months, at least about 1 year, at least about 2 years, or at least about 5 years.

For subcutaneous or intradermal injections of sorafenib, e.g. for treating conditions affecting the skin, an injection can contain about 0.01-4%, about 0.01-2%, about 2-4%, about 0.01-0.2%, about 0.2-0.3%, about 0.3-0.4%, about 0.4-0.5%, about 0.5-0.6%, about 0.6-0.7%, about 0.7-0.8%, about 0.8-0.9%, about 0.9-1%, about 1-1.1%, about 1.1-1.2%, about 1.2-1.3%, about 1.3-1.4%, about 1.4-1.5%, about 1.5-1.6%, about 1.6-1.7%, about 1.7-1.8%, about 1.8-1.9%, about 1.9-2%, about 0.01-0.5%, about 0.5-1%, about 1-1.5%, about 1.5-2%, about 0.01-1%, about 1-2%, about 2-3%, or about 3-4% of the sorafenib by weight. The volume of the injection is typically about 0.01-4 mL, about 0.05-2 mL, about 2-4 mL, about 0.01-0.5 mL, about 0.5-1 mL, about 1-1.5 mL, about 1.5-2 mL, about 0.01-1 mL, about 1-2 mL, about 2-3 mL, or about 3-4 mL, per about 5 cm$^2$, per about 10 cm$^2$, per about 5-10 cm$^2$, per about 5-7 cm$^2$, per about 7-10 cm$^2$, per about 5-6 cm$^2$, per about 6-7 cm$^2$, per about 7-8 cm$^2$, per about 8-9 cm$^2$, or per about 9-10 cm$^2$ of skin area. The dose of sorafenib referred to above may be continued as needed, or may be administered about weekly, about twice a month, about monthly, about every other month, about semi-annually, or about yearly. Treatment may occur once, or may be continued for at least about 1 month, at least about 2 months, at least about 3 months, at least about 6 months, at least about 1 year, at least about 2 years, or at least about 5 years.

For subcutaneous or intradermal injections of sunitinib, e.g. for treating conditions affecting the skin, an injection can contain about 0.01-4%, about 0.01-2%, about 2-4%, about 0.01-0.2%, about 0.2-0.3%, about 0.3-0.4%, about 0.4-0.5%, about 0.5-0.6%, about 0.6-0.7%, about 0.7-0.8%, about 0.8-0.9%, about 0.9-1%, about 1-1.1%, about 1.1-1.2%, about 1.2-1.3%, about 1.3-1.4%, about 1.4-1.5%, about 1.5-1.6%, about 1.6-1.7%, about 1.7-1.8%, about 1.8-1.9%, about 1.9-2%, about 0.01-0.5%, about 0.5-1%, about 1-1.5%, about 1.5-2%, about 0.01-1%, about 1-2%, about 2-3%, or about 3-4% of the sunitinib by weight. The volume of the injection is typically about 0.01-4 mL, about 0.05-2 mL, about 2-4 mL, about 0.01-0.5 mL, about 0.5-1 mL, about 1-1.5 mL, about 1.5-2 mL, about 0.01-1 mL, about 1-2 mL, about 2-3 mL, or about 3-4 mL, per about 5 cm$^2$, per about 10 cm$^2$, per about 5-10 cm$^2$, per about 5-7 cm$^2$, per about 7-10 cm$^2$, per about 5-6 cm$^2$, per about 6-7 cm², per about 7-8 cm², per about 8-9 cm², or per about 9-10 cm² of skin area. The dose of sunitinib referred to above may be continued as needed, or may be administered about weekly, about twice a month, about monthly, about every other month, about semi-annually, or about yearly. Treatment may occur once, or may be continued for at least about 1 month, at least about 2 months, at least about 3 months, at least about 6 months, at least about 1 year, at least about 2 years, or at least about 5 years.

For subcutaneous or intradermal injections of lenvatinib, e.g. for treating conditions affecting the skin, an injection can contain about 0.01-4%, about 0.01-2%, about 2-4%, about 0.01-0.2%, about 0.2-0.3%, about 0.3-0.4%, about 0.4-0.5%, about 0.5-0.6%, about 0.6-0.7%, about 0.7-0.8%, about 0.8-0.9%, about 0.9-1%, about 1-1.1%, about 1.1-1.2%, about 1.2-1.3%, about 1.3-1.4%, about 1.4-1.5%, about 1.5-1.6%, about 1.6-1.7%, about 1.7-1.8%, about 1.8-1.9%, about 1.9-2%, about 0.01-0.5%, about 0.5-1%, about 1-1.5%, about 1.5-2%, about 0.01-1%, about 1-2%, about 2-3%, or about 3-4% of the lenvatinib by weight. The volume of the injection is typically about 0.01-4 mL, about 0.05-2 mL, about 2-4 mL, about 0.01-0.5 mL, about 0.5-1 mL, about 1-1.5 mL, about 1.5-2 mL, about 0.01-1 mL, about 1-2 mL, about 2-3 mL, or about 3-4 mL, per about 5 cm², per about 10 cm², per about 5-10 cm², per about 5-7 cm², per about 7-10 cm², per about 5-6 cm², per about 6-7 cm², per about 7-8 cm², per about 8-9 cm², or per about 9-10 cm² of skin area. The dose of lenvatinib referred to above may be continued as needed, or may be administered about weekly, about twice a month, about monthly, about every other month, about semi-annually, or about yearly. Treatment may occur once, or may be continued for at least about 1 month, at least about 2 months, at least about 3 months, at least about 6 months, at least about 1 year, at least about 2 years, or at least about 5 years.

For subcutaneous or intradermal injections of regorafenib, e.g. for treating conditions affecting the skin, an injection can contain about 0.01-4%, about 0.01-2%, about 2-4%, about 0.01-0.2%, about 0.2-0.3%, about 0.3-0.4%, about 0.4-0.5%, about 0.5-0.6%, about 0.6-0.7%, about 0.7-0.8%, about 0.8-0.9%, about 0.9-1%, about 1-1.1%, about 1.1-1.2%, about 1.2-1.3%, about 1.3-1.4%, about 1.4-1.5%, about 1.5-1.6%, about 1.6-1.7%, about 1.7-1.8%, about 1.8-1.9%, about 1.9-2%, about 0.01-0.5%, about 0.5-1%, about 1-1.5%, about 1.5-2%, about 0.01-1%, about 1-2%, about 2-3%, or about 3-4% of the regorafenib by weight. The volume of the injection is typically about 0.01-4 mL, about 0.05-2 mL, about 2-4 mL, about 0.01-0.5 mL, about 0.5-1 mL, about 1-1.5 mL, about 1.5-2 mL, about 0.01-1 mL, about 1-2 mL, about 2-3 mL, or about 3-4 mL, per about 5 cm², per about 10 cm², per about 5-10 cm², per about 5-7 cm², per about 7-10 cm², per about 5-6 cm², per about 6-7 cm², per about 7-8 cm², per about 8-9 cm², or per about 9-10 cm² of skin area. The dose of regorafenib referred to above may be continued as needed, or may be administered about weekly, about twice a month, about monthly, about every other month, about semi-annually, or about yearly. Treatment may occur once, or may be continued for at least about 1 month, at least about 2 months, at least about 3 months, at least about 6 months, at least about 1 year, at least about 2 years, or at least about 5 years.

For subcutaneous or intradermal injections of ponatinib, e.g. for treating conditions affecting the skin, an injection can contain about 0.01-4%, about 0.01-2%, about 2-4%, about 0.01-0.2%, about 0.2-0.3%, about 0.3-0.4%, about 0.4-0.5%, about 0.5-0.6%, about 0.6-0.7%, about 0.7-0.8%, about 0.8-0.9%, about 0.9-1%, about 1-1.1%, about 1.1-1.2%, about 1.2-1.3%, about 1.3-1.4%, about 1.4-1.5%, about 1.5-1.6%, about 1.6-1.7%, about 1.7-1.8%, about 1.8-1.9%, about 1.9-2%, about 0.01-0.5%, about 0.5-1%, about 1-1.5%, about 1.5-2%, about 0.01-1%, about 1-2%, about 2-3%, or about 3-4% of the ponatinib by weight. The volume of the injection is typically about 0.01-4 mL, about 0.05-2 mL, about 2-4 mL, about 0.01-0.5 mL, about 0.5-1 mL, about 1-1.5 mL, about 1.5-2 mL, about 0.01-1 mL, about 1-2 mL, about 2-3 mL, or about 3-4 mL, per about 5 cm², per about 10 cm², per about 5-10 cm², per about 5-7 cm², per about 7-10 cm², per about 5-6 cm², per about 6-7 cm², per about 7-8 cm², per about 8-9 cm², or per about 9-10 cm² of skin area. The dose of ponatinib referred to above may be continued as needed, or may be administered about weekly, about twice a month, about monthly, about every other month, about semi-annually, or about yearly. Treatment may occur once, or may be continued for at least about 1 month, at least about 2 months, at least about 3 months, at least about 6 months, at least about 1 year, at least about 2 years, or at least about 5 years.

For subcutaneous or intradermal injections of pazopanib, e.g. for treating conditions affecting the skin, an injection can contain about 0.01-4%, about 0.01-2%, about 2-4%, about 0.01-0.2%, about 0.2-0.3%, about 0.3-0.4%, about 0.4-0.5%, about 0.5-0.6%, about 0.6-0.7%, about 0.7-0.8%, about 0.8-0.9%, about 0.9-1%, about 1-1.1%, about 1.1-1.2%, about 1.2-1.3%, about 1.3-1.4%, about 1.4-1.5%, about 1.5-1.6%, about 1.6-1.7%, about 1.7-1.8%, about 1.8-1.9%, about 1.9-2%, about 0.01-0.5%, about 0.5-1%, about 1-1.5%, about 1.5-2%, about 0.01-1%, about 1-2%, about 2-3%, or about 3-4% of the pazopanib by weight. The volume of the injection is typically about 0.01-4 mL, about 0.05-2 mL, about 2-4 mL, about 0.01-0.5 mL, about 0.5-1 mL, about 1-1.5 mL, about 1.5-2 mL, about 0.01-1 mL, about 1-2 mL, about 2-3 mL, or about 3-4 mL, per about 5 cm², per about 10 cm², per about 5-10 cm², per about 5-7 cm², per about 7-10 cm², per about 5-6 cm², per about 6-7 cm², per about 7-8 cm², per about 8-9 cm², or per about 9-10 cm² of skin area. The dose of pazopanib referred to above may be continued as needed, or may be administered about weekly, about twice a month, about monthly, about every other month, about semi-annually, or about yearly. Treatment may occur once, or may be continued for at least about 1 month, at least about 2 months, at least about 3 months, at least about 6 months, at least about 1 year, at least about 2 years, or at least about 5 years.

A cream or an ointment which is topically applied may be useful for treating conditions affecting the skin. Typically, the cream or ointment can contain about 0.01-5%, about 0.01-1%, about 1-2%, about 2-3%, about 3-4%, about 4-5%, about 5-6%, about 6-7%, about 7-8%, about 8-9%, about 9-10%, about 0.01-3%, about 3-5%, about 5-7%, about 7-9%, or about 9-11% of the multi-kinase inhibitor by weight. The volume of the cream applied topically to the skin is typically about 0.01-4 mL, about 0.05-2 mL, about 2-4 mL, about 0.01-0.5 mL, about 0.5-1 mL, about 1-1.5 mL, about 1.5-2 mL, 0.1-0.2 mL, about 0.2-0.3 mL, about 0.3-0.4 mL, about 0.4-0.5 mL, about 0.5-0.6 mL, about 0.6-0.7 mL, about 0.7-0.8 mL, about 0.8-0.9 mL, about 0.9-1 mL, about 1-1.1 mL, about 1.1-1.2 mL, about 1.2-1.3 mL, about 1.3-1.4 mL, about 1.4-1.5 mL, about 1.5-1.6 mL, about 1.6-1.7 mL, about 1.7-1.8 mL, about 1.8-1.9 mL, or about 1.9-2 mL, per about 5-10 cm², per about 5-7 cm², per about 7-10 cm², per about 5-6 cm², per about 6-7 cm², per about 7-8 cm², per about 8-9 cm², or per about 9-10 cm² of skin area. A dressing or patch may also be applied which contains a cream, ointment, or other suitable vehicle in an amount described above.

A multi-kinase inhibitor may be administered topically, such as by cream, ointment, dressing or patch (such as in an amount in the immediately preceding paragraph), as needed, or about twice daily to about weekly, e.g. about twice daily, about once daily, about every 2 days, about every 3 days, about every 4 days, about every 5 days, about every 6 days, about once weekly, about every 7 days, about every 8 days, about every 9 days, etc.

The treatment in the immediately preceding paragraph may be continued for as long as needed, such as only once, or for at least about 2 weeks, at least about 3 weeks, at least about 4 weeks, at least about 5 weeks, at least about 2 months, at least about 3 months, at least about 6 months, at least about 9 months, at least about 12 months, at least about 2 years, at least about 3 years, at least about 4 years, at least about 5 years, at least about 10 years, or at least about 20 years.

A cream or an ointment or other dosage form containing axitinib which is topically applied, e.g. for treating conditions affecting the skin, may contain about 0.01-5%, about 0.01-0.5%, about 0.5-1%, about 1-1.5%, about 1.5-2%, about 2-2.5%, about 2.5-3%, about 3-3.5%, about 3.5-4%, about 4-4.5%, about 4.5-5%, about 0.01-1%, about 1-2%, about 2-3%, about 3-4%, about 4-5%, about 5-6%, about 6-7%, about 7-8%, about 8-9%, about 9-10%, about 0.01-3%, about 3-5%, about 5-7%, about 7-9%, or about 9-11% of the axitinib by weight. The volume of the cream applied topically to the skin is typically about 0.01-4 mL, about 0.05-2 mL, about 2-4 mL, about 0.01-0.5 mL, about 0.5-1 mL, about 1-1.5 mL, about 1.5-2 mL, 0.1-0.2 mL, about 0.2-0.3 mL, about 0.3-0.4 mL, about 0.4-0.5 mL, about 0.5-0.6 mL, about 0.6-0.7 mL, about 0.7-0.8 mL, about 0.8-0.9 mL, about 0.9-1 mL, about 1-1.1 mL, about 1.1-1.2 mL, about 1.2-1.3 mL, about 1.3-1.4 mL, about 1.4-1.5 mL, about 1.5-1.6 mL, about 1.6-1.7 mL, about 1.7-1.8 mL, about 1.8-1.9 mL, or about 1.9-2 mL, per about 5-10 $cm^2$, per about 5-7 $cm^2$, per about 7-10 $cm^2$, per about 5-6 $cm^2$, per about 6-7 $cm^2$, per about 7-8 $cm^2$, per about 8-9 $cm^2$, or per about 9-10 $cm^2$ of skin area. A dressing or patch may also be applied which contains a cream, ointment, or other suitable vehicle in an amount described above.

A cream or ointment or other dosage form nintedanib which is topically applied, e.g. for treating conditions affecting the skin, may contain about 0.01-5%, about 0.01-0.5%, about 0.5-1%, about 1-1.5%, about 1.5-2%, about 2-2.5%, about 2.5-3%, about 3-3.5%, about 3.5-4%, about 4-4.5%, about 4.5-5%, about 0.01-1%, about 1-2%, about 2-3%, about 3-4%, about 4-5%, about 5-6%, about 6-7%, about 7-8%, about 8-9%, about 9-10%, about 0.01-3%, about 3-5%, about 5-7%, about 7-9%, or about 9-11% of the nintedanib by weight. The volume of the cream applied topically to the skin is typically about 0.01-4 mL, about 0.05-2 mL, about 2-4 mL, about 0.01-0.5 mL, about 0.5-1 mL, about 1-1.5 mL, about 1.5-2 mL, 0.1-0.2 mL, about 0.2-0.3 mL, about 0.3-0.4 mL, about 0.4-0.5 mL, about 0.5-0.6 mL, about 0.6-0.7 mL, about 0.7-0.8 mL, about 0.8-0.9 mL, about 0.9-1 mL, about 1-1.1 mL, about 1.1-1.2 mL, about 1.2-1.3 mL, about 1.3-1.4 mL, about 1.4-1.5 mL, about 1.5-1.6 mL, about 1.6-1.7 mL, about 1.7-1.8 mL, about 1.8-1.9 mL, or about 1.9-2 mL, per about 5-10 $cm^2$, per about 5-7 $cm^2$, per about 7-10 $cm^2$, per about 5-6 $cm^2$, per about 6-7 $cm^2$, per about 7-8 $cm^2$, per about 8-9 $cm^2$, or per about 9-10 $cm^2$ of skin area. A dressing or patch may also be applied which contains a cream, ointment, or other suitable vehicle in an amount described above.

A cream or ointment or other dosage form pirfenidone which is topically applied, e.g. for treating conditions affecting the skin, may contain about 0.01-5%, about 0.01-0.5%, about 0.5-1%, about 1-1.5%, about 1.5-2%, about 2-2.5%, about 2.5-3%, about 3-3.5%, about 3.5-4%, about 4-4.5%, about 4.5-5%, about 0.01-1%, about 1-2%, about 2-3%, about 3-4%, about 4-5%, about 5-6%, about 6-7%, about 7-8%, about 8-9%, about 9-10%, about 0.01-3%, about 3-5%, about 5-7%, about 7-9%, or about 9-11% of the pirfenidone by weight. The volume of the cream applied topically to the skin is typically about 0.01-4 mL, about 0.05-2 mL, about 2-4 mL, about 0.01-0.5 mL, about 0.5-1 mL, about 1-1.5 mL, about 1.5-2 mL, 0.1-0.2 mL, about 0.2-0.3 mL, about 0.3-0.4 mL, about 0.4-0.5 mL, about 0.5-0.6 mL, about 0.6-0.7 mL, about 0.7-0.8 mL, about 0.8-0.9 mL, about 0.9-1 mL, about 1-1.1 mL, about 1.1-1.2 mL, about 1.2-1.3 mL, about 1.3-1.4 mL, about 1.4-1.5 mL, about 1.5-1.6 mL, about 1.6-1.7 mL, about 1.7-1.8 mL, about 1.8-1.9 mL, or about 1.9-2 mL, per about 5-10 $cm^2$, per about 5-7 $cm^2$, per about 7-10 $cm^2$, per about 5-6 $cm^2$, per about 6-7 $cm^2$, per about 7-8 $cm^2$, per about 8-9 $cm^2$, or per about 9-10 $cm^2$ of skin area. A dressing or patch may also be applied which contains a cream, ointment, or other suitable vehicle in an amount described above.

A cream or ointment or other dosage form riociguat which is topically applied, e.g. for treating conditions affecting the skin, may contain about 0.01-5%, about 0.01-0.5%, about 0.5-1%, about 1-1.5%, about 1.5-2%, about 2-2.5%, about 2.5-3%, about 3-3.5%, about 3.5-4%, about 4-4.5%, about 4.5-5%, about 0.01-1%, about 1-2%, about 2-3%, about 3-4%, about 4-5%, about 5-6%, about 6-7%, about 7-8%, about 8-9%, about 9-10%, about 0.01-3%, about 3-5%, about 5-7%, about 7-9%, or about 9-11% of the riociguat by weight. The volume of the cream applied topically to the skin is typically about 0.01-4 mL, about 0.05-2 mL, about 2-4 mL, about 0.01-0.5 mL, about 0.5-1 mL, about 1-1.5 mL, about 1.5-2 mL, 0.1-0.2 mL, about 0.2-0.3 mL, about 0.3-0.4 mL, about 0.4-0.5 mL, about 0.5-0.6 mL, about 0.6-0.7 mL, about 0.7-0.8 mL, about 0.8-0.9 mL, about 0.9-1 mL, about 1-1.1 mL, about 1.1-1.2 mL, about 1.2-1.3 mL, about 1.3-1.4 mL, about 1.4-1.5 mL, about 1.5-1.6 mL, about 1.6-1.7 mL, about 1.7-1.8 mL, about 1.8-1.9 mL, or about 1.9-2 mL, per about 5-10 $cm^2$, per about 5-7 $cm^2$, per about 7-10 $cm^2$, per about 5-6 $cm^2$, per about 6-7 $cm^2$, per about 7-8 $cm^2$, per about 8-9 $cm^2$, or per about 9-10 $cm^2$ of skin area. A dressing or patch may also be applied which contains a cream, ointment, or other suitable vehicle in an amount described above.

A cream or ointment or other dosage form sorafenib which is topically applied, e.g. for treating conditions affecting the skin, may contain about 0.01-5%, about 0.01-0.5%, about 0.5-1%, about 1-1.5%, about 1.5-2%, about 2-2.5%, about 2.5-3%, about 3-3.5%, about 3.5-4%, about 4-4.5%, about 4.5-5%, about 0.01-1%, about 1-2%, about 2-3%, about 3-4%, about 4-5%, about 5-6%, about 6-7%, about 7-8%, about 8-9%, about 9-10%, about 0.01-3%, about 3-5%, about 5-7%, about 7-9%, or about 9-11% of the sorafenib by weight. The volume of the cream applied topically to the skin is typically about 0.01-4 mL, about 0.05-2 mL, about 2-4 mL, about 0.01-0.5 mL, about 0.5-1 mL, about 1-1.5 mL, about 1.5-2 mL, 0.1-0.2 mL, about 0.2-0.3 mL, about 0.3-0.4 mL, about 0.4-0.5 mL, about 0.5-0.6 mL, about 0.6-0.7 mL, about 0.7-0.8 mL, about 0.8-0.9 mL, about 0.9-1 mL, about 1-1.1 mL, about 1.1-1.2 mL, about 1.2-1.3 mL, about 1.3-1.4 mL, about 1.4-1.5 mL, about 1.5-1.6 mL, about 1.6-1.7 mL, about 1.7-1.8 mL, about 1.8-1.9 mL, or about 1.9-2 mL, per about 5-10 cm², per about 5-7 cm², per about 7-10 cm², per about 5-6 cm², per about 6-7 cm², per about 7-8 cm², per about 8-9 cm², or per about 9-10 cm² of skin area. A dressing or patch may also be applied which contains a cream, ointment, or other suitable vehicle in an amount described above.

A cream or ointment or other dosage form sunitinib which is topically applied, e.g. for treating conditions affecting the skin, may contain about 0.01-5%, about 0.01-0.5%, about 0.5-1%, about 1-1.5%, about 1.5-2%, about 2-2.5%, about 2.5-3%, about 3-3.5%, about 3.5-4%, about 4-4.5%, about 4.5-5%, about 0.01-1%, about 1-2%, about 2-3%, about 3-4%, about 4-5%, about 5-6%, about 6-7%, about 7-8%, about 8-9%, about 9-10%, about 0.01-3%, about 3-5%, about 5-7%, about 7-9%, or about 9-11% of the sunitinib by weight. The volume of the cream applied topically to the skin is typically about 0.01-4 mL, about 0.05-2 mL, about 2-4 mL, about 0.01-0.5 mL, about 0.5-1 mL, about 1-1.5 mL, about 1.5-2 mL, 0.1-0.2 mL, about 0.2-0.3 mL, about 0.3-0.4 mL, about 0.4-0.5 mL, about 0.5-0.6 mL, about 0.6-0.7 mL, about 0.7-0.8 mL, about 0.8-0.9 mL, about 0.9-1 mL, about 1-1.1 mL, about 1.1-1.2 mL, about 1.2-1.3 mL, about 1.3-1.4 mL, about 1.4-1.5 mL, about 1.5-1.6 mL, about 1.6-1.7 mL, about 1.7-1.8 mL, about 1.8-1.9 mL, or about 1.9-2 mL, per about 5-10 cm², per about 5-7 cm², per about 7-10 cm², per about 5-6 cm², per about 6-7 cm², per about 7-8 cm², per about 8-9 cm², or per about 9-10 cm² of skin area. A dressing or patch may also be applied which contains a cream, ointment, or other suitable vehicle in an amount described above.

A cream or ointment or other dosage form lenvatinib which is topically applied, e.g. for treating conditions affecting the skin, may contain about 0.01-5%, about 0.01-0.5%, about 0.5-1%, about 1-1.5%, about 1.5-2%, about 2-2.5%, about 2.5-3%, about 3-3.5%, about 3.5-4%, about 4-4.5%, about 4.5-5%, about 0.01-1%, about 1-2%, about 2-3%, about 3-4%, about 4-5%, about 5-6%, about 6-7%, about 7-8%, about 8-9%, about 9-10%, about 0.01-3%, about 3-5%, about 5-7%, about 7-9%, or about 9-11% of the lenvatinib by weight. The volume of the cream applied topically to the skin is typically about 0.01-4 mL, about 0.05-2 mL, about 2-4 mL, about 0.01-0.5 mL, about 0.5-1 mL, about 1-1.5 mL, about 1.5-2 mL, 0.1-0.2 mL, about 0.2-0.3 mL, about 0.3-0.4 mL, about 0.4-0.5 mL, about 0.5-0.6 mL, about 0.6-0.7 mL, about 0.7-0.8 mL, about 0.8-0.9 mL, about 0.9-1 mL, about 1-1.1 mL, about 1.1-1.2 mL, about 1.2-1.3 mL, about 1.3-1.4 mL, about 1.4-1.5 mL, about 1.5-1.6 mL, about 1.6-1.7 mL, about 1.7-1.8 mL, about 1.8-1.9 mL, or about 1.9-2 mL, per about 5-10 cm², per about 5-7 cm², per about 7-10 cm², per about 5-6 cm², per about 6-7 cm², per about 7-8 cm², per about 8-9 cm², or per about 9-10 cm² of skin area. A dressing or patch may also be applied which contains a cream, ointment, or other suitable vehicle in an amount described above.

A cream or an ointment containing regorafenib which is topically applied, e.g. for treating conditions affecting the skin, may contain about 0.01-5%, about 0.01-0.5%, about 0.5-1%, about 1-1.5%, about 1.5-2%, about 2-2.5%, about 2.5-3%, about 3-3.5%, about 3.5-4%, about 4-4.5%, about 4.5-5%, about 0.01-1%, about 1-2%, about 2-3%, about 3-4%, about 4-5%, about 5-6%, about 6-7%, about 7-8%, about 8-9%, about 9-10%, about 0.01-3%, about 3-5%, about 5-7%, about 7-9%, or about 9-11% of the regorafenib by weight. The volume of the cream applied topically to the skin is typically about 0.01-4 mL, about 0.05-2 mL, about 2-4 mL, about 0.01-0.5 mL, about 0.5-1 mL, about 1-1.5 mL, about 1.5-2 mL, 0.1-0.2 mL, about 0.2-0.3 mL, about 0.3-0.4 mL, about 0.4-0.5 mL, about 0.5-0.6 mL, about 0.6-0.7 mL, about 0.7-0.8 mL, about 0.8-0.9 mL, about 0.9-1 mL, about 1-1.1 mL, about 1.1-1.2 mL, about 1.2-1.3 mL, about 1.3-1.4 mL, about 1.4-1.5 mL, about 1.5-1.6 mL, about 1.6-1.7 mL, about 1.7-1.8 mL, about 1.8-1.9 mL, or about 1.9-2 mL, per about 5-10 cm², per about 5-7 cm², per about 7-10 cm², per about 5-6 cm², per about 6-7 cm², per about 7-8 cm², per about 8-9 cm², or per about 9-10 cm² of skin area. A dressing or patch may also be applied which contains a cream, ointment, or other suitable vehicle in an amount described above.

A cream or an ointment containing ponatinib which is topically applied, e.g. for treating conditions affecting the skin, may contain about 0.01-5%, about 0.01-0.5%, about 0.5-1%, about 1-1.5%, about 1.5-2%, about 2-2.5%, about 2.5-3%, about 3-3.5%, about 3.5-4%, about 4-4.5%, about 4.5-5%, about 0.01-1%, about 1-2%, about 2-3%, about 3-4%, about 4-5%, about 5-6%, about 6-7%, about 7-8%, about 8-9%, about 9-10%, about 0.01-3%, about 3-5%, about 5-7%, about 7-9%, or about 9-11% of the ponatinib by weight. The volume of the cream applied topically to the skin is typically about 0.01-4 mL, about 0.05-2 mL, about 2-4 mL, about 0.01-0.5 mL, about 0.5-1 mL, about 1-1.5 mL, about 1.5-2 mL, 0.1-0.2 mL, about 0.2-0.3 mL, about 0.3-0.4 mL, about 0.4-0.5 mL, about 0.5-0.6 mL, about 0.6-0.7 mL, about 0.7-0.8 mL, about 0.8-0.9 mL, about 0.9-1 mL, about 1-1.1 mL, about 1.1-1.2 mL, about 1.2-1.3 mL, about 1.3-1.4 mL, about 1.4-1.5 mL, about 1.5-1.6 mL, about 1.6-1.7 mL, about 1.7-1.8 mL, about 1.8-1.9 mL, or about 1.9-2 mL, per about 5-10 cm², per about 5-7 cm², per about 7-10 cm², per about 5-6 cm², per about 6-7 cm², per about 7-8 cm², per about 8-9 cm², or per about 9-10 cm² of skin area. A dressing or patch may also be applied which contains a cream, ointment, or other suitable vehicle in an amount described above.

A cream or an ointment containing pazopanib which is topically applied, e.g. for treating conditions affecting the skin, may contain about 0.01-5%, about 0.01-0.5%, about 0.5-1%, about 1-1.5%, about 1.5-2%, about 2-2.5%, about 2.5-3%, about 3-3.5%, about 3.5-4%, about 4-4.5%, about 4.5-5%, about 0.01-1%, about 1-2%, about 2-3%, about 3-4%, about 4-5%, about 5-6%, about 6-7%, about 7-8%, about 8-9%, about 9-10%, about 0.01-3%, about 3-5%, about 5-7%, about 7-9%, or about 9-11% of the pazopanib by weight. The volume of the cream applied topically to the skin is typically about 0.01-4 mL, about 0.05-2 mL, about 2-4 mL, about 0.01-0.5 mL, about 0.5-1 mL, about 1-1.5 mL, about 1.5-2 mL, 0.1-0.2 mL, about 0.2-0.3 mL, about 0.3-0.4 mL, about 0.4-0.5 mL, about 0.5-0.6 mL, about 0.6-0.7 mL, about 0.7-0.8 mL, about 0.8-0.9 mL, about 0.9-1 mL, about 1-1.1 mL, about 1.1-1.2 mL, about 1.2-1.3 mL, about 1.3-1.4 mL, about 1.4-1.5 mL, about 1.5-1.6 mL, about 1.6-1.7 mL, about 1.7-1.8 mL, about 1.8-1.9 mL, or about 1.9-2 mL, per about 5-10 cm², per about 5-7 cm², per about 7-10 cm², per about 5-6 cm², per about 6-7 cm², per about 7-8 cm², per about 8-9 cm², or per about 9-10 cm² of skin area. A dressing or patch may also be applied which contains a cream, ointment, or other suitable vehicle in an amount described above.

The area of skin to be treated depends upon the area of skin affected by the condition. Typically, about 0.5-40 cm², 1-20 cm², about 20-40 cm², about 0.5-10 cm², about 10-20 cm², about 20-30 cm², about 30-40 cm², about 1-5 cm², about 5-10 cm², about 10-15 cm², about 15-20 cm², about 20-25 cm², about 25-30 cm², about 30-35 cm², about 35-40 cm², about 1-100 cm², 100-500 cm², 500-1000 cm², 1000-

1,500 cm², 1,500-2,000 cm², 2,000-2,500 cm², 2,500-3,000 cm², 3,000-3,500 cm², 3,500-4,000 cm², 4,000-4,500 cm², 4,500-5,000 cm², 5,000-5,500 cm², 5,500-6,000 cm², 6,000-6,500 cm², 6,500-7,000 cm², 7,000-7,500 cm², 7,500-8,000 cm², 8,000-8,500 cm², 8,500-9,000 cm², 9,000-9,500 cm², 9,500-1,0000 cm², 1,0000-10,500 cm², 10,500-11,000 cm², 11,000-11,500 cm², 11,500-12,000 cm², 12,000-12,500 cm², 12,500-13,000 cm², 13,000-13,500 cm², 13,500-14,000 cm², 14,000-14,500 cm², 14,500-1,5000 cm², 1,5000-15,500 cm², 15,500-16,000 cm², 16,000-16,500 cm², 16,500-17,000 cm², 17,000-17,500 cm², 17,500-18,000 cm², 18,000-18,500 cm², 18,500-19,000 cm², 19,000-19,500 cm², or 19,500-20,000 cm², of the skin may be treated.

Particular targets for treatment include the face, chest, and back, and injection or topical application can be made to any of these areas, as well any affected skin on other parts of the body.

Treatment of the entire face would involve treatment of about 700-1000 cm², so for skin conditions affecting the face, about 10-1000 cm², about 1-50 cm², about 50-100 cm², about 100-150 cm², about 150-200 cm², about 200-250 cm², about 250-300 cm², about 300-350 cm², about 350-400 cm², about 400-450 cm², about 450-500 cm², about 500-550 cm², about 550-600 cm², about 600-650 cm², about 650-700 cm², about 700-750 cm², about 750-800 cm², about 800-850 cm², about 850-900 cm², about 900-950 cm², about 950-1,000 cm², about 1,000-1,050 cm², about 1,050-1,100 cm², about 10-100 cm², about 100-300 cm², about 300-500 cm², about 500-700 cm², about 700-900 cm², about 900-1100 cm², about 1-500 cm², about 500-1,000 cm², or 1,000-1,500 cm² of skin area may be treated.

Treatment of the entirety of the chest and back would involve treatment of about 6,000-8,000 cm², so for skin conditions affecting the chest and back, about 1-500 cm², about 500-1,000 cm², about 1,000-1,500 cm², about 1,500-2,000 cm², about 2,000-2,500 cm², about 2,500-3,000 cm², about 3,000-3,500 cm², about 3,500-4,000 cm², about 4,000-4,500 cm², about 4,500-5,000 cm², about 5,000-5,500 cm², about 5,500-6,000 cm², about 6,000-6,500 cm², about 6,500-7,000 cm², about 7,000-7,500 cm², about 7,500-8,000 cm², about 1-1,000 cm², about 1,000-3,000 cm², about 3,000-5,000 cm², about 5,000-7,000 cm², or about 7,000-9,000 cm² of skin may be treated.

For treatment of conditions having lesions or fibroids, such as conditions associated with uterine lesions or fibroids, the multi-kinase inhibitor may be administered by focal injection into the lesions/fibroids or their surrounding or adjacent tissues where the multi-kinase inhibitor is administered by injection into the lesion or fibroid. For this type of treatment, the amount of the multi-kinase inhibitor administered will depend upon the size of the lesion or fibroid being treated. For example, about 0.0001-100 mg, about 0.001-10 mg, 0.0005-0.002 mg, about 0.002-0.003 mg, about 0.003-0.004 mg, about 0.004-0.005 mg, about 0.005-0.006 mg, about 0.006-0.007 mg, about 0.007-0.008 mg, about 0.008-0.009 mg, about 0.009-0.01 mg, about 0.01-0.011 mg, about 0.1-0.5 mg, about 0.5-1 mg, about 1-1.5 mg, about 1.5-2 mg, about 2-2.5 mg, about 2.5-3 mg, about 3-3.5 mg, about 3.5-4 mg, about 4-4.5 mg, about 4.5-5 mg, about 5-5.5 mg, about 5.5-6 mg, about 6-6.5 mg, about 6.5-7 mg, about 7-7.5 mg, about 7.5-8 mg, about 8-8.5 mg, about 8.5-9 mg, about 9-9.5 mg, about 9.5-10 mg, about 10-10.5 mg, about 10.5-11 mg, about 11-11.5 mg, about 11.5-12 mg, about 12-12.5 mg, about 12.5-13 mg, about 13-13.5 mg, about 13.5-14 mg, about 14-14.5 mg, about 14.5-15 mg, about 15-15.5 mg, about 15.5-16 mg, about 16-16.5 mg, about 16.5-17 mg, about 17-17.5 mg, about 17.5-18 mg, about 18-18.5 mg, about 18.5-19 mg, about 19-19.5 mg, about 19.5-20 mg, about 1-3 mg, about 3-5 mg, about 5-7 mg, about 7-9 mg, about 9-11 mg, about 11-13 mg, about 13-15 mg, about 15-17 mg, about 17-19 mg, about 19-21 mg, about 1-5 mg, about 5-10 mg, about 10-15 mg, or about 15-20 mg of the multi-kinase inhibitor may be administered per about lesion.

These amounts in the immediately preceding paragraph may be administered as needed, or at an interval of about 1 week, about 2 weeks, about 3 weeks, about 4 weeks, about 5 weeks, about 6 weeks, about 7 weeks, about 8 weeks, about 9 weeks, about 10 weeks, about 11 weeks, about 12 weeks, about 13 weeks, about 14 weeks, about 15 weeks, about 16 weeks, about 17 weeks, about 18 weeks, about 19 weeks, about 20 weeks, about 21 weeks, about 22 weeks, about 23 weeks, about 24 weeks, about 25 weeks, about 26 weeks, about 27 weeks, about 28 weeks, about 29 weeks, about 30 weeks, about 31 weeks, about 32 weeks, about 33 weeks, about 34 weeks, about 35 weeks, about 36 weeks, about 37 weeks, about 38 weeks, about 39 weeks, about 40 weeks, about 41 weeks, about 42 weeks, about 43 weeks, about 44 weeks, about 45 weeks, about 46 weeks, about 47 weeks, about 48 weeks, about 49 weeks, about 50 weeks, about 51 weeks, about 52 weeks, about 1 month, about 2 months, about 3 months, about 4 months, about 5 months, about 6 months, about 7 months, about 8 months, about 9 months, about 10 months, about 11 months, or about 12 months.

The treatment in the immediately preceding paragraph may be continued for as long as needed, such as only once, or for at least about 2 weeks, at least about 3 weeks, at least about 4 weeks, at least about 5 weeks, at least about 2 months, at least about 3 months, at least about 6 months, at least about 9 months, at least about 12 months, at least about 2 years, at least about 3 years, at least about 4 years, at least about 5 years, at least about 10 years, or at least about 20 years.

For treatments where the multi-kinase inhibitor is axitinib, about 0.0001-100 mg, about 0.001-10 mg, 0.0005-0.002 mg, about 0.002-0.003 mg, about 0.003-0.004 mg, about 0.004-0.005 mg, about 0.005-0.006 mg, about 0.006-0.007 mg, about 0.007-0.008 mg, about 0.008-0.009 mg, about 0.009-0.01 mg, about 0.01-0.011 mg, about 0.1-0.5 mg, about 0.5-1 mg, about 1-1.5 mg, about 1.5-2 mg, about 2-2.5 mg, about 2.5-3 mg, about 3-3.5 mg, about 3.5-4 mg, about 4-4.5 mg, about 4.5-5 mg, about 5-5.5 mg, about 5.5-6 mg, about 6-6.5 mg, about 6.5-7 mg, about 7-7.5 mg, about 7.5-8 mg, about 8-8.5 mg, about 8.5-9 mg, about 9-9.5 mg, about 9.5-10 mg, about 10-10.5 mg, about 10.5-11 mg, about 11-11.5 mg, about 11.5-12 mg, about 12-12.5 mg, about 12.5-13 mg, about 13-13.5 mg, about 13.5-14 mg, about 14-14.5 mg, about 14.5-15 mg, about 15-15.5 mg, about 15.5-16 mg, about 16-16.5 mg, about 16.5-17 mg, about 17-17.5 mg, about 17.5-18 mg, about 18-18.5 mg, about 18.5-19 mg, about 19-19.5 mg, about 19.5-20 mg, about 1-3 mg, about 3-5 mg, about 5-7 mg, about 7-9 mg, about 9-11 mg, about 11-13 mg, about 13-15 mg, about 15-17 mg, about 17-19 mg, about 19-21 mg, about 1-5 mg, about 5-10 mg, about 10-15 mg, or about 15-20 mg of axitinib may be administered per about lesion. The dose of axitinib referred to above may be continued as needed, or may be administered about weekly, about twice a month, about monthly, about every other month, about semi-annually, or about yearly. Treatment may occur once, or may be continued for at least about 1 month, at least about 2 months, at least about 3 months, at least about 6 months, at least about 1 year, at least about 2 years, or at least about 5 years.

For treatments where the multi-kinase inhibitor is nintedanib, about 0.0001-100 mg, about 0.001-10 mg, 0.0005-0.002 mg, about 0.002-0.003 mg, about 0.003-0.004 mg, about 0.004-0.005 mg, about 0.005-0.006 mg, about 0.006-0.007 mg, about 0.007-0.008 mg, about 0.008-0.009 mg, about 0.009-0.01 mg, about 0.01-0.011 mg, about 0.1-0.5 mg, about 0.5-1 mg, about 1-1.5 mg, about 1.5-2 mg, about 2-2.5 mg, about 2.5-3 mg, about 3-3.5 mg, about 3.5-4 mg, about 4-4.5 mg, about 4.5-5 mg, about 5-5.5 mg, about 5.5-6 mg, about 6-6.5 mg, about 6.5-7 mg, about 7-7.5 mg, about 7.5-8 mg, about 8-8.5 mg, about 8.5-9 mg, about 9-9.5 mg, about 9.5-10 mg, about 10-10.5 mg, about 10.5-11 mg, about 11-11.5 mg, about 11.5-12 mg, about 12-12.5 mg, about 12.5-13 mg, about 13-13.5 mg, about 13.5-14 mg, about 14-14.5 mg, about 14.5-15 mg, about 15-15.5 mg, about 15.5-16 mg, about 16-16.5 mg, about 16.5-17 mg, about 17-17.5 mg, about 17.5-18 mg, about 18-18.5 mg, about 18.5-19 mg, about 19-19.5 mg, about 19.5-20 mg, about 1-3 mg, about 3-5 mg, about 5-7 mg, about 7-9 mg, about 9-11 mg, about 11-13 mg, about 13-15 mg, about 15-17 mg, about 17-19 mg, about 19-21 mg, about 1-5 mg, about 5-10 mg, about 10-15 mg, or about 15-20 mg of nintedanib may be administered per about lesion. The dose of nintedanib referred to above may be continued as needed, or may be administered about weekly, about twice a month, about monthly, about every other month, about semi-annually, or about yearly. Treatment may occur once, or may be continued for at least about 1 month, at least about 2 months, at least about 3 months, at least about 6 months, at least about 1 year, at least about 2 years, or at least about 5 years.

For treatments where the multi-kinase inhibitor is pirfenidone, about 0.0001-100 mg, about 0.001-10 mg, 0.0005-0.002 mg, about 0.002-0.003 mg, about 0.003-0.004 mg, about 0.004-0.005 mg, about 0.005-0.006 mg, about 0.006-0.007 mg, about 0.007-0.008 mg, about 0.008-0.009 mg, about 0.009-0.01 mg, about 0.01-0.011 mg, about 0.1-0.5 mg, about 0.5-1 mg, about 1-1.5 mg, about 1.5-2 mg, about 2-2.5 mg, about 2.5-3 mg, about 3-3.5 mg, about 3.5-4 mg, about 4-4.5 mg, about 4.5-5 mg, about 5-5.5 mg, about 5.5-6 mg, about 6-6.5 mg, about 6.5-7 mg, about 7-7.5 mg, about 7.5-8 mg, about 8-8.5 mg, about 8.5-9 mg, about 9-9.5 mg, about 9.5-10 mg, about 10-10.5 mg, about 10.5-11 mg, about 11-11.5 mg, about 11.5-12 mg, about 12-12.5 mg, about 12.5-13 mg, about 13-13.5 mg, about 13.5-14 mg, about 14-14.5 mg, about 14.5-15 mg, about 15-15.5 mg, about 15.5-16 mg, about 16-16.5 mg, about 16.5-17 mg, about 17-17.5 mg, about 17.5-18 mg, about 18-18.5 mg, about 18.5-19 mg, about 19-19.5 mg, about 19.5-20 mg, about 1-3 mg, about 3-5 mg, about 5-7 mg, about 7-9 mg, about 9-11 mg, about 11-13 mg, about 13-15 mg, about 15-17 mg, about 17-19 mg, about 19-21 mg, about 1-5 mg, about 5-10 mg, about 10-15 mg, or about 15-20 mg of pirfenidone may be administered per about lesion. The dose of pirfenidone referred to above may be continued as needed, or may be administered about weekly, about twice a month, about monthly, about every other month, about semi-annually, or about yearly. Treatment may occur once, or may be continued for at least about 1 month, at least about 2 months, at least about 3 months, at least about 6 months, at least about 1 year, at least about 2 years, or at least about 5 years.

For treatments where the multi-kinase inhibitor is riociguat, about 0.0001-100 mg, about 0.001-10 mg, 0.0005-0.002 mg, about 0.002-0.003 mg, about 0.003-0.004 mg, about 0.004-0.005 mg, about 0.005-0.006 mg, about 0.006-0.007 mg, about 0.007-0.008 mg, about 0.008-0.009 mg, about 0.009-0.01 mg, about 0.01-0.011 mg, about 0.1-0.5 mg, about 0.5-1 mg, about 1-1.5 mg, about 1.5-2 mg, about 2-2.5 mg, about 2.5-3 mg, about 3-3.5 mg, about 3.5-4 mg, about 4-4.5 mg, about 4.5-5 mg, about 5-5.5 mg, about 5.5-6 mg, about 6-6.5 mg, about 6.5-7 mg, about 7-7.5 mg, about 7.5-8 mg, about 8-8.5 mg, about 8.5-9 mg, about 9-9.5 mg, about 9.5-10 mg, about 10-10.5 mg, about 10.5-11 mg, about 11-11.5 mg, about 11.5-12 mg, about 12-12.5 mg, about 12.5-13 mg, about 13-13.5 mg, about 13.5-14 mg, about 14-14.5 mg, about 14.5-15 mg, about 15-15.5 mg, about 15.5-16 mg, about 16-16.5 mg, about 16.5-17 mg, about 17-17.5 mg, about 17.5-18 mg, about 18-18.5 mg, about 18.5-19 mg, about 19-19.5 mg, about 19.5-20 mg, about 1-3 mg, about 3-5 mg, about 5-7 mg, about 7-9 mg, about 9-11 mg, about 11-13 mg, about 13-15 mg, about 15-17 mg, about 17-19 mg, about 19-21 mg, about 1-5 mg, about 5-10 mg, about 10-15 mg, or about 15-20 mg of riociguat may be administered per about lesion. The dose of riociguat referred to above may be continued as needed, or may be administered about weekly, about twice a month, about monthly, about every other month, about semi-annually, or about yearly. Treatment may occur once, or may be continued for at least about 1 month, at least about 2 months, at least about 3 months, at least about 6 months, at least about 1 year, at least about 2 years, or at least about 5 years.

For treatments where the multi-kinase inhibitor is sorafenib, about 0.0001-100 mg, about 0.001-10 mg, 0.0005-0.002 mg, about 0.002-0.003 mg, about 0.003-0.004 mg, about 0.004-0.005 mg, about 0.005-0.006 mg, about 0.006-0.007 mg, about 0.007-0.008 mg, about 0.008-0.009 mg, about 0.009-0.01 mg, about 0.01-0.011 mg, about 0.1-0.5 mg, about 0.5-1 mg, about 1-1.5 mg, about 1.5-2 mg, about 2-2.5 mg, about 2.5-3 mg, about 3-3.5 mg, about 3.5-4 mg, about 4-4.5 mg, about 4.5-5 mg, about 5-5.5 mg, about 5.5-6 mg, about 6-6.5 mg, about 6.5-7 mg, about 7-7.5 mg, about 7.5-8 mg, about 8-8.5 mg, about 8.5-9 mg, about 9-9.5 mg, about 9.5-10 mg, about 10-10.5 mg, about 10.5-11 mg, about 11-11.5 mg, about 11.5-12 mg, about 12-12.5 mg, about 12.5-13 mg, about 13-13.5 mg, about 13.5-14 mg, about 14-14.5 mg, about 14.5-15 mg, about 15-15.5 mg, about 15.5-16 mg, about 16-16.5 mg, about 16.5-17 mg, about 17-17.5 mg, about 17.5-18 mg, about 18-18.5 mg, about 18.5-19 mg, about 19-19.5 mg, about 19.5-20 mg, about 1-3 mg, about 3-5 mg, about 5-7 mg, about 7-9 mg, about 9-11 mg, about 11-13 mg, about 13-15 mg, about 15-17 mg, about 17-19 mg, about 19-21 mg, about 1-5 mg, about 5-10 mg, about 10-15 mg, or about 15-20 mg of sorafenib may be administered per about lesion. The dose of sorafenib referred to above may be continued as needed, or may be administered about weekly, about twice a month, about monthly, about every other month, about semi-annually, or about yearly. Treatment may occur once, or may be continued for at least about 1 month, at least about 2 months, at least about 3 months, at least about 6 months, at least about 1 year, at least about 2 years, or at least about 5 years.

For treatments where the multi-kinase inhibitor is sunitinib, about 0.0001-100 mg, about 0.001-10 mg, 0.0005-0.002 mg, about 0.002-0.003 mg, about 0.003-0.004 mg, about 0.004-0.005 mg, about 0.005-0.006 mg, about 0.006-0.007 mg, about 0.007-0.008 mg, about 0.008-0.009 mg, about 0.009-0.01 mg, about 0.01-0.011 mg, about 0.1-0.5 mg, about 0.5-1 mg, about 1-1.5 mg, about 1.5-2 mg, about 2-2.5 mg, about 2.5-3 mg, about 3-3.5 mg, about 3.5-4 mg, about 4-4.5 mg, about 4.5-5 mg, about 5-5.5 mg, about 5.5-6 mg, about 6-6.5 mg, about 6.5-7 mg, about 7-7.5 mg, about 7.5-8 mg, about 8-8.5 mg, about 8.5-9 mg, about 9-9.5 mg, about 9.5-10 mg, about 10-10.5 mg, about 10.5-11 mg, about 11-11.5 mg, about 11.5-12 mg, about 12-12.5 mg, about 12.5-13 mg, about 13-13.5 mg, about 13.5-14 mg, about 14-14.5 mg, about 14.5-15 mg, about 15-15.5 mg, about 15.5-16 mg, about 16-16.5 mg, about 16.5-17 mg, about 17-17.5 mg, about 17.5-18 mg, about 18-18.5 mg, about 18.5-19 mg, about 19-19.5 mg, about 19.5-20 mg, about 1-3 mg, about 3-5 mg, about 5-7 mg, about 7-9 mg, about 9-11 mg, about 11-13 mg, about 13-15 mg, about 15-17 mg, about 17-19 mg, about 19-21 mg, about 1-5 mg, about 5-10 mg, about 10-15 mg, or about 15-20 mg of sunitinib may be administered per about lesion. The dose of sunitinib referred to above may be continued as needed, or may be administered about weekly, about twice a month, about monthly, about every other month, about semi-annually, or about yearly. Treatment may occur once, or may be continued for at least about 1 month, at least about 2 months, at least about 3 months, at least about 6 months, at least about 1 year, at least about 2 years, or at least about 5 years.

For treatments where the multi-kinase inhibitor is lenvatinib, about 0.0001-100 mg, about 0.001-10 mg, 0.0005-0.002 mg, about 0.002-0.003 mg, about 0.003-0.004 mg, about 0.004-0.005 mg, about 0.005-0.006 mg, about 0.006-0.007 mg, about 0.007-0.008 mg, about 0.008-0.009 mg, about 0.009-0.01 mg, about 0.01-0.011 mg, about 0.1-0.5 mg, about 0.5-1 mg, about 1-1.5 mg, about 1.5-2 mg, about 2-2.5 mg, about 2.5-3 mg, about 3-3.5 mg, about 3.5-4 mg, about 4-4.5 mg, about 4.5-5 mg, about 5-5.5 mg, about 5.5-6 mg, about 6-6.5 mg, about 6.5-7 mg, about 7-7.5 mg, about 7.5-8 mg, about 8-8.5 mg, about 8.5-9 mg, about 9-9.5 mg, about 9.5-10 mg, about 10-10.5 mg, about 10.5-11 mg, about 11-11.5 mg, about 11.5-12 mg, about 12-12.5 mg, about 12.5-13 mg, about 13-13.5 mg, about 13.5-14 mg, about 14-14.5 mg, about 14.5-15 mg, about 15-15.5 mg, about 15.5-16 mg, about 16-16.5 mg, about 16.5-17 mg, about 17-17.5 mg, about 17.5-18 mg, about 18-18.5 mg, about 18.5-19 mg, about 19-19.5 mg, about 19.5-20 mg, about 1-3 mg, about 3-5 mg, about 5-7 mg, about 7-9 mg, about 9-11 mg, about 11-13 mg, about 13-15 mg, about 15-17 mg, about 17-19 mg, about 19-21 mg, about 1-5 mg, about 5-10 mg, about 10-15 mg, or about 15-20 mg of lenvatinib may be administered per about lesion. The dose of lenvatinib referred to above may be continued as needed, or may be administered about weekly, about twice a month, about monthly, about every other month, about semi-annually, or about yearly. Treatment may occur once, or may be continued for at least about 1 month, at least about 2 months, at least about 3 months, at least about 6 months, at least about 1 year, at least about 2 years, or at least about 5 years.

For treatments where the multi-kinase inhibitor is regorafenib, about 0.0001-100 mg, about 0.001-10 mg, 0.0005-0.002 mg, about 0.002-0.003 mg, about 0.003-0.004 mg, about 0.004-0.005 mg, about 0.005-0.006 mg, about 0.006-0.007 mg, about 0.007-0.008 mg, about 0.008-0.009 mg, about 0.009-0.01 mg, about 0.01-0.011 mg, about 0.1-0.5 mg, about 0.5-1 mg, about 1-1.5 mg, about 1.5-2 mg, about 2-2.5 mg, about 2.5-3 mg, about 3-3.5 mg, about 3.5-4 mg, about 4-4.5 mg, about 4.5-5 mg, about 5-5.5 mg, about 5.5-6 mg, about 6-6.5 mg, about 6.5-7 mg, about 7-7.5 mg, about 7.5-8 mg, about 8-8.5 mg, about 8.5-9 mg, about 9-9.5 mg, about 9.5-10 mg, about 10-10.5 mg, about 10.5-11 mg, about 11-11.5 mg, about 11.5-12 mg, about 12-12.5 mg, about 12.5-13 mg, about 13-13.5 mg, about 13.5-14 mg, about 14-14.5 mg, about 14.5-15 mg, about 15-15.5 mg, about 15.5-16 mg, about 16-16.5 mg, about 16.5-17 mg, about 17-17.5 mg, about 17.5-18 mg, about 18-18.5 mg, about 18.5-19 mg, about 19-19.5 mg, about 19.5-20 mg, about 1-3 mg, about 3-5 mg, about 5-7 mg, about 7-9 mg, about 9-11 mg, about 11-13 mg, about 13-15 mg, about 15-17 mg, about 17-19 mg, about 19-21 mg, about 1-5 mg, about 5-10 mg, about 10-15 mg, or about 15-20 mg of regorafenib may be administered per about lesion. The dose of regorafenib referred to above may be continued as needed, or may be administered about weekly, about twice a month, about monthly, about every other month, about semi-annually, or about yearly. Treatment may occur once, or may be continued for at least about 1 month, at least about 2 months, at least about 3 months, at least about 6 months, at least about 1 year, at least about 2 years, or at least about 5 years.

For treatments where the multi-kinase inhibitor is ponatinib, about 0.0001-100 mg, about 0.001-10 mg, 0.0005-0.002 mg, about 0.002-0.003 mg, about 0.003-0.004 mg, about 0.004-0.005 mg, about 0.005-0.006 mg, about 0.006-0.007 mg, about 0.007-0.008 mg, about 0.008-0.009 mg, about 0.009-0.01 mg, about 0.01-0.011 mg, about 0.1-0.5 mg, about 0.5-1 mg, about 1-1.5 mg, about 1.5-2 mg, about 2-2.5 mg, about 2.5-3 mg, about 3-3.5 mg, about 3.5-4 mg, about 4-4.5 mg, about 4.5-5 mg, about 5-5.5 mg, about 5.5-6 mg, about 6-6.5 mg, about 6.5-7 mg, about 7-7.5 mg, about 7.5-8 mg, about 8-8.5 mg, about 8.5-9 mg, about 9-9.5 mg, about 9.5-10 mg, about 10-10.5 mg, about 10.5-11 mg, about 11-11.5 mg, about 11.5-12 mg, about 12-12.5 mg, about 12.5-13 mg, about 13-13.5 mg, about 13.5-14 mg, about 14-14.5 mg, about 14.5-15 mg, about 15-15.5 mg, about 15.5-16 mg, about 16-16.5 mg, about 16.5-17 mg, about 17-17.5 mg, about 17.5-18 mg, about 18-18.5 mg, about 18.5-19 mg, about 19-19.5 mg, about 19.5-20 mg, about 1-3 mg, about 3-5 mg, about 5-7 mg, about 7-9 mg, about 9-11 mg, about 11-13 mg, about 13-15 mg, about 15-17 mg, about 17-19 mg, about 19-21 mg, about 1-5 mg, about 5-10 mg, about 10-15 mg, or about 15-20 mg of ponatinib may be administered per about lesion. The dose of ponatinib referred to above may be continued as needed, or may be administered about weekly, about twice a month, about monthly, about every other month, about semi-annually, or about yearly. Treatment may occur once, or may be continued for at least about 1 month, at least about 2 months, at least about 3 months, at least about 6 months, at least about 1 year, at least about 2 years, or at least about 5 years.

For treatments where the multi-kinase inhibitor is pazopanib, about 0.0001-100 mg, about 0.001-10 mg, 0.0005-0.002 mg, about 0.002-0.003 mg, about 0.003-0.004 mg, about 0.004-0.005 mg, about 0.005-0.006 mg, about 0.006-0.007 mg, about 0.007-0.008 mg, about 0.008-0.009 mg, about 0.009-0.01 mg, about 0.01-0.011 mg, about 0.1-0.5 mg, about 0.5-1 mg, about 1-1.5 mg, about 1.5-2 mg, about 2-2.5 mg, about 2.5-3 mg, about 3-3.5 mg, about 3.5-4 mg, about 4-4.5 mg, about 4.5-5 mg, about 5-5.5 mg, about 5.5-6 mg, about 6-6.5 mg, about 6.5-7 mg, about 7-7.5 mg, about 7.5-8 mg, about 8-8.5 mg, about 8.5-9 mg, about 9-9.5 mg, about 9.5-10 mg, about 10-10.5 mg, about 10.5-11 mg, about 11-11.5 mg, about 11.5-12 mg, about 12-12.5 mg, about 12.5-13 mg, about 13-13.5 mg, about 13.5-14 mg, about 14-14.5 mg, about 14.5-15 mg, about 15-15.5 mg, about 15.5-16 mg, about 16-16.5 mg, about 16.5-17 mg, about 17-17.5 mg, about 17.5-18 mg, about 18-18.5 mg, about 18.5-19 mg, about 19-19.5 mg, about 19.5-20 mg, about 1-3 mg, about 3-5 mg, about 5-7 mg, about 7-9 mg, about 9-11 mg, about 11-13 mg, about 13-15 mg, about 15-17 mg, about 17-19 mg, about 19-21 mg, about 1-5 mg, about 5-10 mg, about 10-15 mg, or about 15-20 mg of pazopanib may be administered per about lesion. The dose of pazopanib referred to above may be continued as needed, or may be administered about weekly, about twice a month, about monthly, about every other month, about semi-annually, or about yearly. Treatment may occur once, or may be continued for at least about 1 month, at least about 2 months, at least about 3 months, at least about 6 months, at least about 1 year, at least about 2 years, or at least about 5 years.

For treatments of ocular conditions, the multi-kinase inhibitor may be administered topically or by injection into the eye.

An eye drop which is topically applied may contain about 0.01-5%, about 0.01-0.1%, about 0.1-0.2%, about 0.2-0.3%, about 0.3-0.4%, about 0.4-0.5%, about 0.5-0.6%, about 0.6-0.7%, about 0.7-0.8%, about 0.8-0.9%, about 0.9-1%, about 0.01-0.3%, about 0.3-0.5%, about 0.5-0.7%, about 0.7-0.9%, or about 0.9-1.1% of the multi-kinase inhibitor by weight. The volume of the eye drop applied is typically about 1-50 µL, about 5-10 µL, about 10-20 µL, or about 20-40 µL.

A multi-kinase inhibitor may be administered in an eye drop, as needed, or about twice daily to about weekly, e.g. about three times daily, about twice daily, about once daily, about every 2 days, about every 3 days, about every 4 days, about every 5 days, about every 6 days, about once weekly, about every 7 days, about every 8 days, about every 9 days, etc.

The treatment in the immediately preceding paragraph may be continued for as long as needed, such as only once, or for at least about 2 weeks, at least about 3 weeks, at least about 4 weeks, at least about 5 weeks, at least about 2 months, at least about 3 months, at least about 6 months, at least about 9 months, at least about 12 months, at least about 2 years, at least about 3 years, at least about 4 years, at least about 5 years, at least about 10 years, or at least about 20 years. An eye drop containing axitinib which is topically applied may contain about 0.01-5%, about 0.01-0.1%, about 0.1-0.2%, about 0.2-0.3%, about 0.3-0.4%, about 0.4-0.5%, about 0.5-0.6%, about 0.6-0.7%, about 0.7-0.8%, about 0.8-0.9%, about 0.9-1%, about 0.01-0.3%, about 0.3-0.5%, about 0.5-0.7%, about 0.7-0.9%, or about 0.9-1.1% of the axitinib by weight. The volume of the eye drop applied is typically about 1-50 µL, about 5-10 µL, about 10-20 µL, or about 20-40 µL. The drop may be administered as needed, or three times daily, twice daily, once daily, about weekly, about every other week, about once monthly, about once every 2 months, about once every three months, about once every six months, or about once yearly. This treatment may be administered only once, or may be continued for one week, two weeks, three weeks, four weeks, about 1 month, about 2 months, about 3 months, about 6 months, about 1 year, about 2 years, about 5 years, or more.

An eye drop containing nintedanib which is topically applied may contain about 0.01-5%, about 0.01-0.1%, about 0.1-0.2%, about 0.2-0.3%, about 0.3-0.4%, about 0.4-0.5%, about 0.5-0.6%, about 0.6-0.7%, about 0.7-0.8%, about 0.8-0.9%, about 0.9-1%, about 0.01-0.3%, about 0.3-0.5%, about 0.5-0.7%, about 0.7-0.9%, or about 0.9-1.1% of the nintedanib by weight. The volume of the eye drop applied is typically about 1-50 µL, about 5-10 µL, about 10-20 µL, or about 20-40 µL. The drop may be administered as needed, or three times daily, twice daily, once daily, about weekly, about every other week, about once monthly, about once every 2 months, about once every three months, about once every six months, or about once yearly. This treatment may be administered only once, or may be continued for one week, two weeks, three weeks, four weeks, about 1 month, about 2 months, about 3 months, about 6 months, about 1 year, about 2 years, about 5 years, or more.

An eye drop containing pirfenidone which is topically applied may contain about 0.01-5%, about 0.01-0.1%, about 0.1-0.2%, about 0.2-0.3%, about 0.3-0.4%, about 0.4-0.5%, about 0.5-0.6%, about 0.6-0.7%, about 0.7-0.8%, about 0.8-0.9%, about 0.9-1%, about 0.01-0.3%, about 0.3-0.5%, about 0.5-0.7%, about 0.7-0.9%, or about 0.9-1.1% of the pirfenidone by weight. The volume of the eye drop applied is typically about 1-50 µL, about 5-10 µL, about 10-20 µL, or about 20-40 µL. The drop may be administered as needed, or three times daily, twice daily, once daily, about weekly, about every other week, about once monthly, about once every 2 months, about once every three months, about once every six months, or about once yearly. This treatment may be administered only once, or may be continued for one week, two weeks, three weeks, four weeks, about 1 month, about 2 months, about 3 months, about 6 months, about 1 year, about 2 years, about 5 years, or more.

An eye drop containing riociguat which is topically applied may contain about 0.01-5%, about 0.01-0.1%, about 0.1-0.2%, about 0.2-0.3%, about 0.3-0.4%, about 0.4-0.5%, about 0.5-0.6%, about 0.6-0.7%, about 0.7-0.8%, about 0.8-0.9%, about 0.9-1%, about 0.01-0.3%, about 0.3-0.5%, about 0.5-0.7%, about 0.7-0.9%, or about 0.9-1.1% of the riociguat by weight. The volume of the eye drop applied is typically about 1-50 µL, about 5-10 µL, about 10-20 µL, or about 20-40 µL. The drop may be administered as needed, or three times daily, twice daily, once daily, about weekly, about every other week, about once monthly, about once every 2 months, about once every three months, about once every six months, or about once yearly. This treatment may be administered only once, or may be continued for one week, two weeks, three weeks, four weeks, about 1 month, about 2 months, about 3 months, about 6 months, about 1 year, about 2 years, about 5 years, or more.

An eye drop containing sorafenib which is topically applied may contain about 0.01-5%, about 0.01-0.1%, about 0.1-0.2%, about 0.2-0.3%, about 0.3-0.4%, about 0.4-0.5%, about 0.5-0.6%, about 0.6-0.7%, about 0.7-0.8%, about 0.8-0.9%, about 0.9-1%, about 0.01-0.3%, about 0.3-0.5%, about 0.5-0.7%, about 0.7-0.9%, or about 0.9-1.1% of the sorafenib by weight. The volume of the eye drop applied is typically about 1-50 µL, about 5-10 µL, about 10-20 µL, or about 20-40 µL. The drop may be administered as needed, or three times daily, twice daily, once daily, about weekly, about every other week, about once monthly, about once every 2 months, about once every three months, about once every six months, or about once yearly. This treatment may be administered only once, or may be continued for one week, two weeks, three weeks, four weeks, about 1 month, about 2 months, about 3 months, about 6 months, about 1 year, about 2 years, about 5 years, or more.

An eye drop containing sunitinib which is topically applied may contain about 0.01-5%, about 0.01-0.1%, about 0.1-0.2%, about 0.2-0.3%, about 0.3-0.4%, about 0.4-0.5%, about 0.5-0.6%, about 0.6-0.7%, about 0.7-0.8%, about 0.8-0.9%, about 0.9-1%, about 0.01-0.3%, about 0.3-0.5%, about 0.5-0.7%, about 0.7-0.9%, or about 0.9-1.1% of the sunitinib by weight. The volume of the eye drop applied is typically about 1-50 µL, about 5-10 µL, about 10-20 µL, or about 20-40 µL. The drop may be administered as needed, or three times daily, twice daily, once daily, about weekly, about every other week, about once monthly, about once every 2 months, about once every three months, about once every six months, or about once yearly. This treatment may be administered only once, or may be continued for one week, two weeks, three weeks, four weeks, about 1 month, about 2 months, about 3 months, about 6 months, about 1 year, about 2 years, about 5 years, or more.

An eye drop containing lenvatinib which is topically applied may contain about 0.01-5%, about 0.01-0.1%, about 0.1-0.2%, about 0.2-0.3%, about 0.3-0.4%, about 0.4-0.5%, about 0.5-0.6%, about 0.6-0.7%, about 0.7-0.8%, about 0.8-0.9%, about 0.9-1%, about 0.01-0.3%, about 0.3-0.5%, about 0.5-0.7%, about 0.7-0.9%, or about 0.9-1.1% of the lenvatinib by weight. The volume of the eye drop applied is typically about 1-50 µL, about 5-10 µL, about 10-20 µL, or about 20-40 µL. The drop may be administered as needed, or three times daily, twice daily, once daily, about weekly, about every other week, about once monthly, about once every 2 months, about once every three months, about once every six months, or about once yearly. This treatment may be administered only once, or may be continued for one week, two weeks, three weeks, four weeks, about 2 months, about 3 months, about 6 months, about 1 year, about 2 years, about 5 years, or more.

An eye drop containing regorafenib which is topically applied may contain about 0.01-5%, about 0.01-0.1%, about 0.1-0.2%, about 0.2-0.3%, about 0.3-0.4%, about 0.4-0.5%, about 0.5-0.6%, about 0.6-0.7%, about 0.7-0.8%, about 0.8-0.9%, about 0.9-1%, about 0.01-0.3%, about 0.3-0.5%, about 0.5-0.7%, about 0.7-0.9%, or about 0.9-1.1% of the regorafenib by weight. The volume of the eye drop applied is typically about 1-50 µL, about 5-10 µL, about 10-20 µL, or about 20-40 µL. The drop may be administered as needed, or three times daily, twice daily, once daily, about weekly, about every other week, about once monthly, about once every 2 months, about once every three months, about once every six months, or about once yearly. This treatment may be administered only once, or may be continued for one week, two weeks, three weeks, four weeks, about 1 month, about 2 months, about 3 months, about 6 months, about 1 year, about 2 years, about 5 years, or more.

An eye drop containing ponatinib which is topically applied may contain about 0.01-5%, about 0.01-0.1%, about 0.1-0.2%, about 0.2-0.3%, about 0.3-0.4%, about 0.4-0.5%, about 0.5-0.6%, about 0.6-0.7%, about 0.7-0.8%, about 0.8-0.9%, about 0.9-1%, about 0.01-0.3%, about 0.3-0.5%, about 0.5-0.7%, about 0.7-0.9%, or about 0.9-1.1% of the ponatinib by weight. The volume of the eye drop applied is typically about 1-50 µL, about 5-10 µL, about 10-20 µL, or about 20-40 µL. The drop may be administered as needed, or three times daily, twice daily, once daily, about weekly, about every other week, about once monthly, about once every 2 months, about once every three months, about once every six months, or about once yearly. This treatment may be administered only once, or may be continued for one week, two weeks, three weeks, four weeks, about 1 month, about 2 months, about 3 months, about 6 months, about 1 year, about 2 years, about 5 years, or more.

An eye drop containing pazopanib which is topically applied may contain about 0.01-5%, about 0.01-0.1%, about 0.1-0.2%, about 0.2-0.3%, about 0.3-0.4%, about 0.4-0.5%, about 0.5-0.6%, about 0.6-0.7%, about 0.7-0.8%, about 0.8-0.9%, about 0.9-1%, about 0.01-0.3%, about 0.3-0.5%, about 0.5-0.7%, about 0.7-0.9%, or about 0.9-1.1% of the pazopanib by weight. The volume of the eye drop applied is typically about 1-50 µL, about 5-10 µL, about 10-20 µL, or about 20-40 µL. The drop may be administered as needed, or three times daily, twice daily, once daily, about weekly, about every other week, about once monthly, about once every 2 months, about once every three months, about once every six months, or about once yearly. This treatment may be administered only once, or may be continued for one week, two weeks, three weeks, four weeks, about 1 month, about 2 months, about 3 months, about 6 months, about 1 year, about 2 years, about 5 years, or more. For injection of a multi-kinase inhibitor into the eye, a single injection may contain about 0.001-10 mg, about 0.001-1 mg, about 1-2 mg, about 2-3 mg, about 3-4 mg, about 4-5 mg, about 5-6 mg, about 6-7 mg, about 7-8 mg, about 8-9 mg, about 9-10 mg, about 0.1-3 mg, about 3-5 mg, about 5-7 mg, about 7-9 mg, or about 9-11 mg of the kinase inhibitor. The kinase inhibitor may be injected as needed, about once a month to about once every five years. This treatment may be done only once, or may be continued for about 3 months, about 6 months, about 1 year, about 2 years, about 3 years, about 4 years, about 5 years, or more.

For injection of axitinib into the eye, a single injection may contain about 0.001-10 mg, about 0.001-0.2 mg, about 0.2-0.4 mg, about 0.4-0.6 mg, about 0.6-0.8 mg, about 0.8-1 mg, about 1-1.2 mg, about 1.2-1.4 mg, about 1.4-1.6 mg, about 1.6-1.8 mg, about 1.8-2.0 mg, about 0.001-1 mg, about 1-2 mg, about 2-3 mg, about 3-4 mg, about 4-5 mg, about 5-6 mg, about 6-7 mg, about 7-8 mg, about 8-9 mg, about 9-10 mg, about 0.1-3 mg, about 3-5 mg, about 5-7 mg, about 7-9 mg, or about 9-11 mg of the axitinib. The axitinib may be injected as needed, about once a month to about once every five years. This treatment may be done only once, or may be continued for about 3 months, about 6 months, about 1 year, about 2 years, about 3 years, about 4 years, about 5 years, or more.

For injection of nintedanib into the eye, a single injection may contain about 0.001-10 mg, about 0.001-0.2 mg, about 0.2-0.4 mg, about 0.4-0.6 mg, about 0.6-0.8 mg, about 0.8-1 mg, about 1-1.2 mg, about 1.2-1.4 mg, about 1.4-1.6 mg, about 1.6-1.8 mg, about 1.8-2.0 mg, about 0.001-1 mg, about 1-2 mg, about 2-3 mg, about 3-4 mg, about 4-5 mg, about 5-6 mg, about 6-7 mg, about 7-8 mg, about 8-9 mg, about 9-10 mg, about 0.1-3 mg, about 3-5 mg, about 5-7 mg, about 7-9 mg, or about 9-11 mg of the nintedanib. The nintedanib may be injected as needed, about once a month to about once every five years. This treatment may be done only once, or may be continued for about 3 months, about 6 months, about 1 year, about 2 years, about 3 years, about 4 years, about 5 years, or more.

For injection of sunitinib into the eye, a single injection may contain about 0.001-10 mg, about 0.001-1 mg, about 1-2 mg, about 2-3 mg, about 3-4 mg, about 4-5 mg, about 5-6 mg, about 6-7 mg, about 7-8 mg, about 8-9 mg, about 9-10 mg, about 0.1-3 mg, about 3-5 mg, about 5-7 mg, about 7-9 mg, or about 9-11 mg of the sunitinib. The sunitinib may be injected as needed, about once a month to about once every five years. This treatment may be done only once, or may be continued for about 3 months, about 6 months, about 1 year, about 2 years, about 3 years, about 4 years, about 5 years, or more.

For injection of lenvatinib into the eye, a single injection may contain about 0.001-10 mg, about 0.001-0.2 mg, about 0.2-0.4 mg, about 0.4-0.6 mg, about 0.6-0.8 mg, about 0.8-1 mg, about 1-1.2 mg, about 1.2-1.4 mg, about 1.4-1.6 mg, about 1.6-1.8 mg, about 1.8-2.0 mg, about 0.001-1 mg, about 1-2 mg, about 2-3 mg, about 3-4 mg, about 4-5 mg, about 5-6 mg, about 6-7 mg, about 7-8 mg, about 8-9 mg, about 9-10 mg, about 0.1-3 mg, about 3-5 mg, about 5-7 mg, about 7-9 mg, or about 9-11 mg of the lenvatinib. The lenvatinib may be injected as needed, about once a month to about once every five years. This treatment may be done only once, or may be continued for about 3 months, about 6 months, about 1 year, about 2 years, about 3 years, about 4 years, about 5 years, or more.

As an alternative to traditional eye drops or injections into the eye, a multi-kinase inhibitor may be administered using punctal plugs, mucoadhesives, depots, gels, or other delivery options. These options may offer reduced dosing frequencies as compared to eye drops, such as about weekly to about yearly, such as about weekly, about every two weeks, about every three weeks, about every four weeks, about once a month, about once every two months, about once every three months, about once every six months, or longer. These dosing options may target a daily dose of about 1-500 µg, about 500-1,000 µg, about 1-100 µg, about 100-200 µg, about 200-300 µg, about 300-400 µg, about 400-500 µg, about 500-800 µg, or about 800-1,200 µg. This treatment may be done only once, or may be continued for about 1 month, about 2 months, about 3 months, about 6 months, about 1 year, about 2 years, about 3 years, about 4 years, about 5 years, or more.

In some embodiments, axitinib may be administered using punctal plugs, mucoadhesives, depots, gels, or other delivery options. In some embodiments, administration is about weekly to about yearly, such as about weekly, about every two weeks, about every three weeks, about every four weeks, about once a month, about once every two months, about once every three months, about once every six months, or longer. In some embodiments, a daily dose of about 1-500 µg, about 500-1,000 µg, about 1-100 µg, about 100-200 µg, about 200-300 µg, about 300-400 µg, about 400-500 µg, about 500-800 µg, or about 800-1,200 µg of axitinib is targeted. The axitinib may be administered only once, or treatment may continue for about 1 month, about 2 months, about 3 months, about 6 months, about 1 year, about 2 years, about 3 years, about 4 years, about 5 years, or more.

In some embodiments, nintedanib may be administered using punctal plugs, mucoadhesives, depots, gels, or other delivery options. In some embodiments, administration is about weekly to about yearly, such as about weekly, about every two weeks, about every three weeks, about every four weeks, about once a month, about once every two months, about once every three months, about once every six months, or longer. In some embodiments, a daily dose of about 1-500 µg, about 500-1,000 µg, about 1-100 µg, about 100-200 µg, about 200-300 µg, about 300-400 µg, about 400-500 µg, about 500-800 µg, or about 800-1,200 µg of nintedanib is targeted. The nintedanib may be administered only once, or treatment may continue for about 1 month, about 2 months, about 3 months, about 6 months, about 1 year, about 2 years, about 3 years, about 4 years, about 5 years, or more.

In some embodiments, pirfenidone may be administered using punctal plugs, mucoadhesives, depots, gels, or other delivery options. In some embodiments, administration is about weekly to about yearly, such as about weekly, about every two weeks, about every three weeks, about every four weeks, about once a month, about once every two months, about once every three months, about once every six months, or longer. In some embodiments, a daily dose of about 1-500 µg, about 500-1,000 µg, about 1-100 µg, about 100-200 µg, about 200-300 µg, about 300-400 µg, about 400-500 µg, about 500-800 µg, or about 800-1,200 µg of pirfenidone is targeted. The pirfenidone may be administered only once, or treatment may continue for about 1 month, about 2 months, about 3 months, about 6 months, about 1 year, about 2 years, about 3 years, about 4 years, about 5 years, or more.

In some embodiments, riociguat may be administered using punctal plugs, mucoadhesives, depots, gels, or other delivery options. In some embodiments, administration is about weekly to about yearly, such as about weekly, about every two weeks, about every three weeks, about every four weeks, about once a month, about once every two months, about once every three months, about once every six months, or longer. In some embodiments, a daily dose of about 1-500 µg, about 500-1,000 µg, about 1-100 µg, about 100-200 µg, about 200-300 µg, about 300-400 µg, about 400-500 µg, about 500-800 µg, or about 800-1,200 µg of riociguat is targeted. The riociguat may be administered only once, or treatment may continue for about 1 month, about 2 months, about 3 months, about 6 months, about 1 year, about 2 years, about 3 years, about 4 years, about 5 years, or more.

In some embodiments, sorafenib may be administered using punctal plugs, mucoadhesives, depots, gels, or other delivery options. In some embodiments, administration is about weekly to about yearly, such as about weekly, about every two weeks, about every three weeks, about every four weeks, about once a month, about once every two months, about once every three months, about once every six months, or longer. In some embodiments, a daily dose of about 1-500 µg, about 500-1,000 µg, about 1-100 µg, about 100-200 µg, about 200-300 µg, about 300-400 µg, about 400-500 µg, about 500-800 µg, or about 800-1,200 µg of sorafenib is targeted. The sorafenib may be administered only once, or treatment may continue for about 1 month, about 2 months, about 3 months, about 6 months, about 1 year, about 2 years, about 3 years, about 4 years, about 5 years, or more.

In some embodiments, sunitinib may be administered using punctal plugs, mucoadhesives, depots, gels, or other delivery options. In some embodiments, administration is about weekly to about yearly, such as about weekly, about every two weeks, about every three weeks, about every four weeks, about once a month, about once every two months, about once every three months, about once every six months, or longer. In some embodiments, a daily dose of about 1-500 µg, about 500-1,000 µg, about 1-100 µg, about 100-200 µg, about 200-300 µg, about 300-400 µg, about 400-500 µg, about 500-800 µg, or about 800-1,200 µg of sunitinib is targeted. The sunitinib may be administered only once, or treatment may continue for about 1 month, about 2 months, about 3 months, about 6 months, about 1 year, about 2 years, about 3 years, about 4 years, about 5 years, or more.

In some embodiments, lenvatinib may be administered using punctal plugs, mucoadhesives, depots, gels, or other delivery options. In some embodiments, administration is about weekly to about yearly, such as about weekly, about every two weeks, about every three weeks, about every four weeks, about once a month, about once every two months, about once every three months, about once every six months, or longer. In some embodiments, a daily dose of about 1-500 µg, about 500-1,000 µg, about 1-100 µg, about 100-200 µg, about 200-300 µg, about 300-400 µg, about 400-500 µg, about 500-800 µg, or about 800-1,200 µg of lenvatinib is targeted. The lenvatinib may be administered only once, or treatment may continue for about 1 month, about 2 months, about 3 months, about 6 months, about 1 year, about 2 years, about 3 years, about 4 years, about 5 years, or more.

In some embodiments, regorafenib may be administered using punctal plugs, mucoadhesives, depots, gels, or other delivery options. In some embodiments, administration is about weekly to about yearly, such as about weekly, about every two weeks, about every three weeks, about every four weeks, about once a month, about once every two months, about once every three months, about once every six months, or longer. In some embodiments, a daily dose of about 1-500 µg, about 500-1,000 µg, about 1-100 µg, about 100-200 µg, about 200-300 µg, about 300-400 µg, about 400-500 µg, about 500-800 µg, or about 800-1,200 µg of regorafenib is targeted. The regorafenib may be administered only once, or treatment may continue for about 1 month, about 2 months, about 3 months, about 6 months, about 1 year, about 2 years, about 3 years, about 4 years, about 5 years, or more.

In some embodiments, ponatinib may be administered using punctal plugs, mucoadhesives, depots, gels, or other delivery options. In some embodiments, administration is about weekly to about yearly, such as about weekly, about every two weeks, about every three weeks, about every four weeks, about once a month, about once every two months, about once every three months, about once every six months, or longer. In some embodiments, a daily dose of about 1-500 µg, about 500-1,000 µg, about 1-100 µg, about 100-200 µg, about 200-300 µg, about 300-400 µg, about 400-500 µg, about 500-800 µg, or about 800-1,200 µg of ponatinib is targeted. The ponatinib may be administered only once, or treatment may continue for about 1 month, about 2 months, about 3 months, about 6 months, about 1 year, about 2 years, about 3 years, about 4 years, about 5 years, or more.

In some embodiments, pazopanib may be administered using punctal plugs, mucoadhesives, depots, gels, or other delivery options. In some embodiments, administration is about weekly to about yearly, such as about weekly, about every two weeks, about every three weeks, about every four weeks, about once a month, about once every two months, about once every three months, about once every six months, or longer. In some embodiments, a daily dose of about 1-500 µg, about 500-1,000 µg, about 1-100 µg, about 100-200 µg, about 200-300 µg, about 300-400 µg, about 400-500 µg, about 500-800 µg, or about 800-1,200 µg of pazopanib is targeted. The pazopanib may be administered only once, or treatment may continue for about 1 month, about 2 months, about 3 months, about 6 months, about 1 year, about 2 years, about 3 years, about 4 years, about 5 years, or more.

In some embodiments, a multi-target inhibitor, multi-phase modulator, or multi-kinase inhibitor, such as axitinib, nintedanib, pirfenidone, riociguat, sorafenib, sunitinib, lenvatinib, regorafenib, ponatinib, or pazopanib, may be used in conjunction with any of the vehicles and excipients commonly employed in pharmaceutical preparations including polymers.

The preparation of pharmaceutical compositions described herein can be conducted in accordance with generally accepted procedures for the preparation of pharmaceutical preparations. See, for example, Remington's Pharmaceutical Sciences 18th Edition (1990), E. W. Martin ed., Mack Publishing Co., PA. Liquid forms for administration by injection, include aqueous solutions, aqueous or oil suspensions, emulsions, microbeads, etc. Creams or ointments may include aqueous solutions, aqueous or oil suspensions, emulsions, microbeads, etc. Suitable excipients may include solvents and/or co-solvents; solubilizing, wetting, suspending, emulsifying or thickening agents; chelating agents; antioxidants and reducing agents; antimicrobial preservatives; buffers and/or pH adjusting agents; bulking agents; protectants; tonicity adjustors; etc. The dosage form may be stored as a liquid or reconstituted for use.

Some embodiments include a kit comprising a compound described herein, such as axitinib, nintedanib, pirfenidone, riociguat, sorafenib, sunitinib, lenvatinib, regorafenib, ponatinib, or pazopanib, in a composition or dosage form described herein, and written instructions directing, describing, or otherwise suggesting the use of the compound or composition as described herein.

Some embodiments are illustrated in the following examples. One skilled in the art would appreciate that these examples are for illustration only and are not intended to limit the scope of the present disclosure because one skilled in the art would appreciate that modifications and variations are possible without departing from the scope of the present disclosure.

Example 1. Some Multi-Kinase Inhibitors Reduce Dermal Inflammation in Mice after LL-37 Challenge Recent studies show a link between triggers of rosacea (including *Demodex folliculorum*, UV radiation, stress, etc.) and induced cellular and tissue responses. It has been suggested that an altered innate immune response is involved in the disease pathogenesis (Yamasaki, K and Gallo, R., J Dermatol Sci., 55: 77-81, 2009).

Triggering the innate immune system normally results in a controlled increase in cytokines and antimicrobial peptides, such as cathelicidins, in the skin. Some forms of cathelicidin peptides have the capacity to be both proinflammatory and vasoactive. Individuals with rosacea not only express high levels of cathelicidin, but also produce forms of cathelicidin peptides which promote leukocyte chemotaxis, angiogenesis, and expression of extracellular matrix components. It has been shown that injection of these peptides into the skin of mice results in skin inflammation resembling pathological changes seen in rosacea patients. A cathelicidin derived peptide LL-37 has been used to induce rosacea-like responses in mice. (Yamasaki, K. et al., Nature Medicine 13: 975-980, 2007; Kim, M. et al., Experimental Dermatology 24: 680-685, 2015).

In our study, mice were injected subcutaneously with 40 µl of LL-37 (3.3 mg/mL) to induce inflammatory reactions. Immediately following the LL-37 injection, axitinib, nintedanib, sunitinib, or lenvatinib were individually administered as a single intradermal injection (1.6 mg). LL-37 injection was repeated every 12 hours for a total of 4 injections. Endotoxin-free water and dexamethasone (3 mg/kg by intraperitoneal injection, twice), respectively, were used as negative and positive control groups.

At 48 hours after the initial LL-37 injection, the dorsal skin was photographed, and the severity of skin lesions were scored for redness and measured for areas of involvement. Mice were then anaesthetized, and tissue samples of lesion sites were excised and fixed for H&E stainings and immunohistochemical analysis. Markers for inflammation (CD4 and CD8) were determined using specific antibodies. TGF beta levels are measured by mRNA expression using qPCR.

As shown in FIG. 1, among all treatment groups, lenvatinib showed the lowest TGF-β1 mRNA expression. The TGFb1 mRNA expression in mice induced with LL37 and treated with lenvatinib was 79% of that challenged with LL37 alone (i.e., without treatment).

The tissue samples were analyzed for inflammation characteristics. Histopathology endpoints included inflammation, and CD4+ and CD8+T-lymphocyte immunostaining. For inflammation scores, tissues were examined histologically and scored for inflammatory cell infiltrate. As shown in FIG. 2, Axitinib, nintedanib, sunitinib, or lenvatinib showed prominent reductions in the scores of inflammation. These results indicate that some multi-kinase inhibitors will be effective therapeutic agents for preventing or treating diseases that are caused by or associated with inflammation, such as rosacea, psoriasis, and rheumatoid arthritis.

As shown in FIG. 3, multi-kinase inhibitors of axitinib, nintedanib, and lenvatinib, are also effective in the reduction of CD4+ lymphocyte scores in the mice model of inflammation induced by intradermal LL37 injections. The reductions range from about 30% to about 40%.

Similarly, as shown in FIG. 4, multi-kinase inhibitors axitinib, nintedanib, and lenvatinib, are also effective in the reduction of CD8+ lymphocyte scores in the mice model of inflammation induced by intradermal LL37 injections. The reductions range from about 40% to about 55%.

In summary, some multi-kinase inhibitors have demonstrated inhibitory effects in LL37-induced inflammation. In addition, these compounds also regulate TGF beta mRNA expression. These results support the notion that these compounds possess an inhibitory profile necessary for the prevention and treatment of diseases characterized by chronic inflammation, such as rosacea, atopic dermatitis, psoriasis, rheumatoid arthritis, uveitis, wet macular degeneration, and dry age-related macular degeneration.

Example 2. Some Multi-Kinase Inhibitors Reduce Dermal Levels of TGFb1 Following Wound-Induced Inflammation in Minipigs The purpose of this study was to evaluate the topical effects of axitinib, nintedanib, sorafenib and lenvatinib when administered via intradermal injection to the dorsal skin along linear incisions of minipigs. Linear incisional wound was made to elicit inflammatory and wound healing process in the skin. After dosing, mammals were observed post dose for 9 days to assess the levels of TGFb1 expressions in the skin.

Three male Gottingen Minipigs® dosed once via intradermal injection along the edges of each of the linear incision wound sites for each mammal (wounds on the dorsum, perpendicular to the spine, approximately 3 cm in length and 3 cm distance from the spine). Each incisional wound received approximately 16 mg of the test compound intradermally once along both sides of the linear wound.

On days of 4, 7, and 9 post-dosing, one 4 mm dermal punch biopsy was collected for each incisional wound and processed for TGF-beta 1 analysis with ELISA, using a commercial kit (e.g., the kit from Thermo Fisher or other vendors). The effects of these test compounds on the dermal expression levels of TGFb1 are shown in FIG. 5.

As shown in FIG. 5, the multi-kinase inhibitors axitinib, nintedanib, sunitinib, or lenvatinib, are very effective in suppressing the expression of TGF beta 1 in a time-dependent manner. In contrast, another kinase inhibitor, sorafenib, is not as effective. These results indicate that not all kinase inhibitors are equal and that multi-kinase inhibitors having a specific spectrum of kinase inhibition are needed for methods described herein.

Multiple growth factors and cytokines have been shown to regulate dermal inflammation and wound healing. TGF-beta1 and TGFbeta2, in particular, are important in all phases of the wound healing process (Pakyari M. et al. Advances in Wound Care, 2: 215-224, 2013). The inhibition of TGFbeta1 levels in this wound healing and inflammation study by axitinib, nintedanib, sunitinib, or lenvatinib strongly suggests therapeutic roles for these multi-kinase inhibitors in the regulation of dermal inflammation. Inhibition of TGFbeta1 by axitinib, nintedanib, sunitinib, or lenvatinib are especially important for chronic inflammatory diseases given that previous studies have demonstrated that blocking TGF beta signaling has a positive effect in mammal models of psoriasis and atopic dermatitis (Han G, et al., J Invest Dermatol 130: 371-377, 2010; Lan C C, et al. J Eur Acad Dermatol Venereol 28: 204-215, 2014).

Furthermore, inhibitions of TGF beta1 early in the wound healing response by these multi-kinase inhibitors (days 7 & 9) parallel previous findings, in which early application of neutralizing antibodies to TGF beta 1 & 2 during dermal wound healing produced the best outcome (Ferguson M W and O'Kane S, Phil Trans R Soc London B 359: 839-850, 2004). These observations would suggest that axitinib, nintedanib, sunitinib, or lenvatinib are expected to provide better therapeutic values than other multi-kinase inhibitors.

Example 3. Some Multi-Kinase Inhibitors Reduce the Expression of TGF Beta in a Rabbit Ear Injury Model The objective of this study was to examine the effect of test compounds on wound healing and TGF beta expression after dermal injury in a rabbit ear hypertrophic scar model.

In New Zealand white rabbits, maintained under a surgical plane of anesthesia, trauma stimulation of the skin on the ventral surface of both ears is initiated on Day 1. Trauma sites are evaluated on Days 8, 15, 22, 29, 36, and 43. On days 15 and 29, each site is dosed with test compounds (e.g., 1% w/w, 100 µl) by intradermal or intralesional injections.

Mammals are euthanized on Day 43, and the trauma sites are harvested and frozen for TGF beta analysis using quantitative RT-PCR (qRT-PCR) (e.g., A. K. Johnson et al., Dev. Comp. Immunol., 2006; 30(5): 473-84). TGF beta1 mRNA expression levels in treated trauma samples are compared to the expression level in the untreated trauma sample.

As shown in FIG. 6, the mean folds of TGF beta mRNA expression in axitinib, nintedanib, sorafenib, sunitinib, and lenvatinib-treated samples are lower than the expression level in the untreated wound sample.

At necropsy, each treatment site was harvested and preserved for hematoxylin and erosion and Mason's trichrome stainings. Each lesion was examined histologically and graded for neovascularization, fibrosis and re-epithelization using a five-step/severity grading system (minimal, mild, moderate, marked, and severe). The average total score is an aggregation of these microscopic findings relating to an inflammatory response. The histopathology data for axitinib and nintedanib-treated trauma sites show decreased angiogenesis and fibrosis, as revealed by these stainings. In contrast, samples from sorafenib or sunitinib do not show any reduction in angiogenesis.

Axitinib (Table 1) had less neovascularization than untreated wounds. The average total score of the test wounds was about 1.3-fold lower than the untreated wounds. The histopathology data for axitinib treated trauma sites show decreased angiogenesis and fibrosis.

TABLE 1

Histopathology Findings of Rabbit Ear Wound Treated with Intradermal Dosing of 1 wt. % Axitinib

|  | Neovascularization | Fibrosis/Collagen | Re-epithelization | Total Score |
| --- | --- | --- | --- | --- |
| Treated Mean | 1 | 3.3 | 0.3 | 4.6 |
| Untreated Control | 3 | 3 | 0 | 6 |

Nintedanib (Table 2) produced much less neovascularization and about the same fibrosis as untreated wounds. The average total score of the test wounds was about 1.33-fold lower than untreated wounds. Overall, the test sites have less scar formation, as compared with the control sites.

TABLE 2

Histopathology Findings of Rabbit Ear Wound Treated
with Intradermal Dosing of 1 wt. % Nintedanib

|  | Neovascularization | Fibrosis/ Collagen | Re-epithelization | Total Score |
| --- | --- | --- | --- | --- |
| Treated Mean | 1 | 3 | 0.5 | 4.5 |
| Untreated Control | 3 | 3 | 0 | 6 |

Sorafenib (Table 3) produced slightly increased neovascularization, and similar or slightly increased fibrosis, as compared to the control sites.

TABLE 3

Histopathology Findings of Rabbit Ear Wound Treated
with Intradermal Dosing of 1 wt. % Sorafenib

|  | Neovascularization | Fibrosis/ Collagen | Re-epithelization | Total Score |
| --- | --- | --- | --- | --- |
| Treated Mean | 3 | 2.5 | 0.3 | 5.8 |
| Untreated Control | 2 | 2 | 0 | 4 |

These data support the fact that some multi-kinase inhibitors possess a certain spectrum of multi-kinase inhibition activities necessary to treat diseases and disorders characterized by angiogenesis, fibrotic repair, and inflammation. The certain spectrum of multi-kinases may be involved in the signaling pathways of VEGF and TGF beta.

The above data demonstrates that axitinib, nintedanib and lenvatinib are able to significantly reduce inflammation in a well-recognized mammal model of rosacea. Furthermore, in the mammal model, axitinib, nintedanib and lenvatinib inhibited the tissue infiltration of CD4+ and CD8+T-lymphocytes, contributors of innate immune responses related to the pathogenesis of rosacea. In addition, the regulatory profiles of axitinib, nintedanib and lenvatinib in modulating growth factors and cytokines, such as PDGF, VEGF and TGF beta, support their roles as effective therapeutic agents for treating chronic dermal inflammatory diseases, such as rosacea, psoriasis and atopic dermatitis.

Example 4. Some Multi-Kinase Inhibitors Will be Effective Inhibitors of Ocular Fibrosis in a Rabbit Model In order to investigate the anti-fibrotic effect of test compounds following wounding in the eye, a suture-induced ocular fibrosis model was used. Suture was placed intrastromally under a microscope in the cornea of rabbits. In each eye, one 9.0 silk suture was placed, in a vertical position, temporal to the corneal center and a second suture was placed nasal to the corneal center. Each suture had two stromal incursions approximately 2 mm from the limbus. Test compounds having certain spectrum of multikinase inhibition activities and/or vehicle were topically instilled (35 uL/eye) in the eyes three times daily for 10 days the day following surgery. The treatment groups include vehicle, nintedanib (0.3%, w/v), pirfenidone (1%, w/v), riociguat (0.3%, w/v), sorafenib (0.3%, w/v) and lenvatinib (0.3%, w/v). Six left eyes were used per treatment group.

During the in-life phase, gross ocular observations of very slight to moderate conjunctival congestion and swelling were similar among groups (including the control), with the exception of the riociguat group which tended to have a slightly more severe reaction over the course of the 10-day observation period. The animals were sacrificed on Day 11 and the eyes enucleated and dissected for histopathological evaluation.

The results show that lenvatinib and nintedanib were efficacious in reducing the areas of neovascularization on the corneal surface (FIG. 7). In addition, nintedanib and lenvatinib significantly reduced fibroplasia and/or collagen density as evidenced by histological staining (FIG. 8). In addition, nintedanib and lenvatinib significantly reduced alpha SMA (smooth muscle actin) staining by immunohistochemistry staining (FIG. 8).

Results from this study show that some multikinase inhibitors will be effective inhibitors of ocular fibrosis.

Example 5. Some Multi-Kinase Inhibitors Will be Effective Inhibitors of Ocular Fibrosis in Models of Subconjunctival Scarring Associated with Ocular Surgeries In order to investigate the anti-scarring effect of topically applied test compounds following ocular surgeries, glaucoma filtration surgery was performed on rabbit eyes. Postoperative subconjunctival wound healing is a major cause of late bleb failure after glaucoma filtration surgery in humans. Select multikinase inhibitors were tested for effect on bleb survival over time. Inhibition of subconjunctival fibrosis following surgery will improve bleb survival. Vehicle was used as a negative control and pirfenidone was used a positive control.

A scleral tract was created in the left eyes superiorly by tunneling a beveled 22-gauge intravenous cannula through the sclera, beginning behind the limbus and continuing until the cannula is visible in the anterior chamber. The cannula was flushed with sodium heparin (1000 units) prior to placement. The cannula needle was withdrawn and the cannula advanced beyond the pupillary margin to prevent iris blockage of the tube. The cannula was trimmed approximately 2 mm and secured to the sclera using suture. Both the Tenon's and the conjunctiva were sutured with 9-0 Prolene. Six rabbits were used per group and the left eye of each rabbit underwent glaucoma filtration surgery. The treatment groups include vehicle control, pirfenidone (1%, w/v) as a positive control, sorafenib (0.3%, w/v), and lenvatinib (0.3%, w/v). Eyedrops (35 uL) were topically applied to the eyes following surgery three times day for 30 days. All animals were sacrificed on Day 30.

Ophthalmic examinations showed a high total ocular examination score (based on a modified Hackett and McDonald ocular grading system) in the surgery eyes. Bleb was monitored throughout the study. Bleb volumes were measured with the use of calibrated calipers. Overall bleb volumes were uniformly increased at Day 2, with a large reduction of volume at Day 4. There were differences noted between groups at Day 7, and the majority of blebs were gone by Day 14 through Day 30 indicating bleb failure due to subconjunctival scarring. Results of the vehicle and pirfenidone groups were similar to those reported in the literature (Zhong H et al., Invest Ophthalmol Vis Sci, 52: 3136-3142, 2011). FIG. 9 shows a representative bleb on Day 4 in an eye treated with 0.3% sorafenib three times daily.

When the blebs were monitored over time, pirfenidone (the positive control) and lenvatinib treatments kept bleb survival on Day 7 as compared to the vehicle and sorafenib groups (FIG. 10).

On Day 14, all of the sorafenib treated eyes demonstrated bleb failure. On Day 30, all of the eyes treated with vehicle and pirfenidone demonstrated bleb failure while the lenvatinib treatment group still had bleb remaining (1 of 6 animals).

These results show that treatment with certain multikinase inhibitors, such as lenvatinib, are able to inhibit ocular fibrosis in models of subconjunctival scarring associated with ocular surgeries.

Example 6. Some Multi-Kinase Inhibitors can be Used to Treat Subretinal Fibrosis Associated with Proliferative Retinal Diseases The anti-fibrotic effects of test compounds were also evaluated in a subretinal fibrosis model in C57BL/6 mice. Three to five lesions were generated in the Bruch's membrane of the study eye using laser photocoagulation (75-μm spot size, 0.1-s duration, 90 mW, OcuLight TX 532 nm). Subretinal fibrosis started to form 5-7 days post laser application. Test compounds having certain spectrum of multikinase inhibition activities or vehicle were intravitreally injected on the day of laser application. The dosing concentration of the test compounds was 1% (w/w) of nintedanib and lenvatinib. The control groups were vehicle and mouse VEGF164 antibody. There were 12 mice per treatment group. Approximately, 1 μL each of the test compounds, vehicle, or positive control was injected intravitreally to the right eye of each animal. On Days 15 and 35, the eyes were examined with fluorescein angiography, followed by enucleation. Immunostaining on the dissected choroid was used to assess subretinal fibrosis (e.g., collagen 1, isolectin B4 and/or DAPI). The primary antibodies used were fluorescence conjugated isolectin B4 (FITC-conjugated isolectin B4) and anti-collagen type I antibody. Representative images of fluorescein fundus angiography, isolectin B4 and DAPI are shown in FIG. 11. Treatment of anti-VEGF did not have any notable effect on subretinal fibrosis, as compared to the vehicle treatment group. Both nintedanib and lenvatinib produced marked reductions in neovascular lesion sizes. Study results showed that lenvatinib and nintedanib have therapeutic effects in the treatment of subretinal fibrosis. Thus, these compounds can be used to treat subretinal fibrosis associated with proliferative retinal diseases.

Example 7. Distribution in Ocular Tissue after Topical Instillation of Sorafenib and Lenvatinib as Ophthalmic Eyedrop in Rabbit Eyes The objective of this study was to assess the local tolerance and ocular distribution of sorafenib and lenvatinib (0.3% w/w) when administered by topical ocular instillation in the eyes. Five to six male New Zealand White rabbits were used per treatment group. Each right eye received a 35 μL eyedrop of the vehicle, sorafenib (0.3% w/w), or lenvatinib (0.3% w/w) three times daily for 5 days. On Dosing Day 5, the animals were sacrificed and eyes were enucleated, and plasma and the ocular tissues were collected. Tissue and plasma concentrations of the compounds were measured by LC-MS/MS.

Animals among the study groups displayed normal body weight gains over the course of the study. Ocular examinations of the right eye did not show significant findings. Average overall examination scores of all animals in all groups were close to the baseline values for the duration of the study. Intraocular pressure (IOP) was measured using a Tonovet probe. Six consecutive measurements were obtained and the average IOP shown on the display was recorded. IOPs in the right eye remained near to slightly above the baseline values for the duration of the experiment in all groups.

The ocular tissue concentrations for these drugs are listed in Tables 4 and 5. Topical instillation of 0.3% w/w sorafenib and lenvatinib delivered high drug concentrations to the anterior tissues of conjunctiva, sclera and cornea and significant concentrations in the choroid and retina of rabbits.

TABLE 4

Ocular Tissue Concentration of Sorafenib in ng/gm After Topical Instillation of 0.3% Sorafenib Three Times Daily for Five Days in Rabbit Eyes

| Sorafenib | Mean | SEM | N |
| --- | --- | --- | --- |
| Conjunctiva | 859.8 | 528.9 | 6 |
| Cornea | 131.4 | 10.0 | 6 |
| Sclera | 16.36 | 4.00 | 6 |
| Aqueous Humor | 0 | 0 | 6 |
| Iris Ciliary Body | 3.337 | 0.408 | 6 |
| Vitreous Humor | 0.11 | 0.08 | 6 |
| Retina | 17.36 | 2.41 | 6 |
| Choroid | 8.191 | 0.702 | 6 |

TABLE 5

Ocular Tissue Concentration of Lenvatinib in ng/gm After Topical Instillation of 0.3% Lenvatinib Three Times Daily for Five Days in Rabbit Eyes

| Lenvatinib | Mean | SEM | N |
| --- | --- | --- | --- |
| Conjunctiva | 299.7 | 141.9 | 6 |
| Cornea | 178.0 | 41.2 | 6 |
| Sclera | 49.05 | 7.11 | 6 |
| Aqueous Humor | 5.49 | 1.14 | 6 |
| Iris Ciliary Body | 18.24 | 2.04 | 6 |
| Vitreous Humor | 0.619 | 0.09 | 6 |
| Retina | 23.53 | 2.91 | 6 |
| Choroid | 38.00 | 3.66 | 6 |

The plasma concentrations, mean (±SD), on Day 5 of dosing were 5.09 (±1.27) ng/mL for sorafenib, and 131 (±24) ng/mL for lenvatinib.

The concentrations of both sorafenib and lenvatinib in anterior segment tissues, including conjunctiva and cornea, were high and essentially equal. These results support the conclusion that any differences in animal efficacy model by topical administration to eyes are due to differences in their pharmacological activity and not to their pharmacokinetic profiles.

Example 8. Some Multi-Kinase Inhibitors would be Effective in the Treatment of Benign Prostate Hyperplasia (BPH) and Proliferative and Fibrotic Disorders of the Genitourinary Tract Despite morphological and anatomical differences between prostate glands in humans and rodents, there are many similarities with regard to their pharmacology and histochemistry that make study of BPH in rats a useful investigative approach. The prostate gland in both humans and rats is innervated by fine networks surrounding the glandular elements. Most of these neural structures are catecholaminergic and contain different subtypes of adrenergic receptors.

Because of the potential effect of adrenergic innervation on the growth of prostatic cells, the effects of phenylephrine administration on the prostate in rats have been examined. At a dose of 1 mg/kg per day, phenylephrine induces irregular ducts with intraluminal projections. The epithelium becomes thicker and there are even focal "piling-up" of cells. The stroma, in turn, demonstrates hyperplasia and hypertrophy of fibrocytes and smooth muscle cells. These changes correspond to the entity of benign prostatic hyperplasia in humans. In addition, phenylephrine has a dual role in the development of PIN lesions affecting both epithelial and stromal constituents of the rat prostate.

BPH is a true hyperplastic process. Histologic studies have documented an increase in cell number. A study was conducted, therefore, to determine the effects of test compounds and vehicle on testosterone (TE) and phenylephrine (PE) induced benign prostate hyperplasia in rats. Male Wistar rats were induced with testosterone (2 mg/kg) plus phenylephrine (5 mg/kg) administered daily by subcutaneous injection on days 5 through 32. Vehicle or test compounds (all at 1% w/w), nintedanib, sunitinib, lenvatinib, and 0.5% doxazosin mesylate, were administered by intraprostate injection (0.4 ml) in dorsolateral and ventral lobes on days 1 and 18. Animals were euthanized on day 32. Body weights were determined and prostate glands were harvested. The experimental design is outlined in Table 6.

TABLE 6

Study Design Outline

| Group* (Test Article) | Dose (mg) | Route of Administration | Day(s) of Administration | Animal Numbers |
|---|---|---|---|---|
| 1 (Vehicle) | 0 | Intra-prostate | 1, 18 | 6 |
| 2 (nintedanib) | 4 | Intra-prostate | 1, 18 | 6 |
| 3 (sunitinib) | 4 | Intra-prostate | 1, 18 | 6 |
| 4 (lenvatinib) | 4 | Intra-prostate | 1, 18 | 6 |
| 5 (doxazosin) | 2 | Intra-prostate | 1, 18 | 6 |
| 6 (Vehicle) | 0 | Intra-prostate | 1, 18 | 6 |

*All animals received testosterone (TE) and phenylephrine (PE), except Group 1.

At necropsy, the ventral and dorsolateral lobes of the prostate were separated and then cut into halves. The left halves were fixed in 10% neutral buffered formalin, sectioned, and stained with Hematoxylin and Eosin (H&E). Histological changes in these sections were scored. Epithelial hyperplasia was recognized as an increase in epithelial cells within normal-appearing gland profiles, primarily reflected by stratification of epithelial cells and increased presence of epithelial tufting and papillary projections. A severity grade of 0 (not present) through 5 (severe) was assigned to each sample. Representative images are presented in FIGS. 12 and 13. The mean scores (+/−SD) are shown in FIGS. 14 and 15.

FIG. 12 shows representative images from dorsolateral prostate at 100× magnifications. Panel (A) is a vehicle-treated sample, showing a normal (score=0) glandular profile. Panel (B) is a testosterone (TE) and phenylephrine (PE) induced and vehicle-treated sample, showing marked (score=4) epithelial hyperplasia. Panel (C) is a testosterone (TE) and phenylephrine (PE) induced and nintedanib-treated sample, showing moderate (score=3) epithelial hyperplasia. Panel (D) is a testosterone (TE) and phenylephrine (PE) induced and sunitinib-treated sample, showing moderate (score=3) epithelial hyperplasia. Panel (E) is a testosterone (TE) and phenylephrine (PE) induced and lenvatinib-treated sample, showing slight (score=2) epithelial hyperplasia. Panel (F) is a testosterone (TE) and phenylephrine (PE) induced and doxazosin-treated sample, showing moderate (score=3) epithelial hyperplasia.

FIG. 13 shows representative images from ventral prostate at 100× magnification. Panel (A) is a vehicle-treated sample, showing a normal (score=0) glandular profile. Panel (B) is testosterone (TE) and phenylephrine (PE) induced and vehicle-treated sample, showing marked (score=4) epithelial hyperplasia. Panel (C) is testosterone (TE) and phenylephrine (PE) induced and nintedanib-treated sample, showing moderate (score=3) epithelial hyperplasia. Panel (D) is testosterone (TE) and phenylephrine (PE) induced and sunitinib-treated sample, showing moderate (score=3) epithelial hyperplasia. Panel (E) is testosterone (TE) and phenylephrine (PE) induced and lenvatinib-treated sample, showing slight (score=3) epithelial hyperplasia. Panel (F) is testosterone (TE) and phenylephrine (PE) induced and doxazosin-treated sample, showing moderate (score=3) epithelial hyperplasia.

The study results indicate histological changes of glandular hyperplasia after TE and PE induction in rats, which were observed in human prostate hyperplasia and adenoma, i.e., glandular hyperplasia forming papillary structures toward lumen Test compounds of nintedanib, Sunitinib, lenvatinib, and doxazosin demonstrated reduction of glandular hyperplasia as compared to the untreated TE/PE induced prostates (FIGS. 12B and 13B). Inhibition of benign prostate hyperplasia in this model by nintedanib, sunitinib, lenvatinib and doxazosin indicates that these compounds would be effective in the treatment of benign prostate hyperplasia (BPH) and/or proliferative and fibrotic disorders of the genitourinary tract.

Example 9. Some Multi-Kinase Inhibitors May be Used to Reduce Undesired Fibrosis, Such as Scar Formation Porcine skin resembles human skin in many aspects. Both species have a relatively thick epidermis, distinct rete pegs, dermal papillae, and dense elastic fibers in the dermis. Furthermore, unlike rodents and rabbits, porcine skin is adherent to the subcutaneous structures, similar to human skin. Because of these anatomical similarities and other parallelisms in wound healing, porcine models have emerged as important foundations for the study of pathophysiology and potential treatment paradigms for abnormal wound healing. It has also been observed in porcine full-thickness wound healing in Yucatan Minipigs that the spatial and temporal expressions of TGF-B1, PDGF and VEGF were similar to the patterns for the growth factors described above. Therefore, the full-thickness excision models in Yucatan minipigs are the models for human wound healing studies.

In this experiment, multiple full-thickness excision wounds were made to the dorsum of Yucatan minipigs, and the wound sites were allowed to be re-epithelialized adequately. At four weeks post-wound, the wound sites had normal to pink vascularity and had pliability. Epidermal hyperplasia was observed, as expected for regenerative responses in the full-thickness wounds.

On Day 28 post-wound, a dose (e.g., 1%) of axitinib, nintedanib, riociguat, sorafenib, sunitinib, and/or lenvatinib was administered into the dermal tissue at or around the wound sites, once every two weeks on two occasions. One wound site was left untreated as the control for each pig. Please note that the particular parameters in this example are only for illustration. One skilled in the art would appreciate that the dosages, administration methods, treatment regimen, and the administration sites may be varied to achieve similar results.

On Day 59 post wound, the minipigs were sacrificed and dermal tissues were collected for qualitative and quantitative evaluation using hematoxylin and eosin, and Mason's Trichrome staining. Dermal fibroplasia was characterized by increased numbers of fibroblasts in the dermis suspended in variable amounts of collagen in wounds.

In addition, total mRNA was isolated from skin biopsies of the treated wound sites and the untreated unwounded sites of the pigs. The mRNA samples were used to prepare cDNA and analyzed via qRT-PCR. The TGF-β1 expression levels were assessed using beta actin as a reference gene.

Transforming-growth-factor (TGF)-β expression, following inflammatory responses, results in increased production of extracellular matrix (ECM) components, as well as mesenchymal cell proliferation, migration, and accumulation.

dermal fibroplasia, as assessed by histopathologic examinations of the treated wounds relative to the untreated wound (Table. 7).

FIG. 17 shows exemplary hematoxylin and eosin stainings of pig dermal tissues from treated and untreated wound sites. Panel (A) show a staining from an unwounded skin as a control. Panel (B) shows a staining of a sample from a wounded site without treatment with any compound of the present disclosure. It is evident that the wounded tissue has substantial neovascularization and fibrosis. Panel (C) shows a staining of a sample from a wounded site treated with axitinib. Axitinib treatment results in significantly reduced neovascularization and reduced fibrosis, as compared with the untreated wound (see Panel (B)). These results clearly show that compounds of the present disclosure are effective in reducing neovascularization and fibrosis at the wounded sites. As a result, compounds of the present disclosure may be used to reduce undesired fibrosis, such as scar formation.

TABLE 7

Qualitative assessments of dermal fibroplasia and neovascularization at wound sites after two doses. (minimal = 1, mild = 2, moderate = 3, marked = 4, and severe = 5)

| Finding | Individual Scores & Average Scores (bolded) | | | | | | |
|---|---|---|---|---|---|---|---|
| | axitinib | nintedanib | riociguat | sorafenib | sunitinib | lenvatinib | untreated |
| Fibroplasia; dermis | 2, 2, 3 (2.33) | 3, 2, 2 (2.33) | 3, 2, 3 (2.67) | 3, 3, 3 (3.00) | 3, 3, 2 (2.67) | 3, 3, 3 (3.00) | 3, 3, 4 (3.33) |
| Neovascularization; dermis | 1, 2, 2 (1.67) | 2, 2, 1 (1.67) | 3, 2, 3 (2.67) | 2, 2, 3 (2.33) | 2, 3, 2 (2.33) | 2, 3, 2 (2.33) | 3, 1, 3 (2.33) |

As shown in Table 8, compounds of the present disclosure also resulted in reduction of TGF-β1 mRNA expression levels at the treated wounds, as compared to the expression level in unwounded normal skin, suggesting that compounds of the present disclosure can be used to control the exuberant fibrosis. Among these compounds, axitinib, nintedanib, riociguat, sorafenib, and sunitinib are the most effective.

TABLE 8

TGF-β1 mRNA expression in Yucatan pig skin wound sites after treatments

| Animal Number | Duplicate Set | TGF-β1 mRNA Expression Fold Relative to Untreated Unwounded Control | | | | | |
|---|---|---|---|---|---|---|---|
| | | axitinib | nintedanib | riociguat | sorafenib | sunitinib | lenvatinib |
| 7369 | 1 | 0.37 | 0.56 | 0.39 | 0.43 | 0.45 | 0.38 |
| | 2 | 0.68 | 0.63 | 0.49 | 0.55 | 0.64 | 0.69 |
| 7370 | 1 | 0.78 | 0.87 | 0.8 | 0.89 | 1.86 | 2.02 |
| | 2 | 0.89 | 0.70 | 0.60 | 0.84 | 0.50 | 2.27 |
| 7371 | 1 | 0.68 | 0.66 | 0.76 | 0.60 | 0.53 | 0.62 |
| | 2 | 0.64 | 0.55 | 0.87 | 0.53 | 0.48 | 0.89 |

Therefore, TGF-β has been found to induce fibrosis associated with chronic phases of inflammatory diseases. As shown in FIG. 16, compounds of the present disclosure significantly reduced the expression levels of TGF-β1, suggesting that compounds of the present disclosure can be used to control undesired fibrosis.

The histologic evaluation results, shown in Table 7, indicate that these compounds are effective in controlling the undesirable neovascular and fibrotic formation.

Among the various test compounds administered as two biweekly treatments, axitinib and nintedanib noticeably reduced neovascularization with a corresponding reduced These data are consistent with the previous studies described above. Certain multikinase inhibitors, including axitinib, nintedanib and lenvatinib, are shown to be effective regulators of cell proliferation and fibrosis. Further, their activities are correlated with their inhibition of certain growth factors, such as TGF beta.

Unless otherwise indicated, all numbers expressing quantities or properties such as dose amount, hyperplasia score, and etc. used in herein are to be understood as being modified in all instances by the term "about." Each numerical parameter should at least be construed in light of the number of reported significant digits and by applying ordinary rounding techniques. Accordingly, unless indicated to the contrary, the numerical parameters may be modified according to the desired properties sought to be achieved, and should, therefore, be considered as part of the disclosure. At the very least, the examples shown herein are for illustration only, not as an attempt to limit the scope of the disclosure.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

What is claimed is:

1. A method of treating macular edema, comprising administering from 3 mg to 8 mg of lenvatinib at a frequency of once a month or less frequently to a mammal in need thereof, wherein the administration is by periocular injection.

2. The method of claim 1, wherein the mammal is a human being.

3. A method of treating macular edema, comprising administering from 3 mg to 8 mg of lenvatinib at a frequency of once a month or less frequently to a mammal in need thereof, wherein the administration is by ocular injection.

4. The method of claim 3, wherein the mammal is a human being.

* * * * *